US008658412B2

(12) United States Patent
Choban et al.

(10) Patent No.: US 8,658,412 B2
(45) Date of Patent: Feb. 25, 2014

(54) ALTERING THE INTERFACE OF HYDROCARBON-COATED SURFACES

(75) Inventors: Eric R. Choban, Williamstown, NJ (US); Robert D. Fallon, Elkton, MD (US); Edwin R. Hendrickson, Hockessin, DE (US); Scott Christopoher Jackson, Wilmington, DE (US); Abigail K. Luckring, West Chester, PA (US); Michael P. Perry, Landenberg, PA (US); David Alan Suchanec, Wilmington, DE (US); Sheryl M. Anzek, Elkton, MD (US)

(73) Assignee: E I du Pont de Nemours and Company, Wilmington, DE (US)

( * ) Notice: Subject to any disclaimer, the term of this patent is extended or adjusted under 35 U.S.C. 154(b) by 689 days.

(21) Appl. No.: 12/784,518

(22) Filed: May 21, 2010

(65) Prior Publication Data
US 2011/0030956 A1  Feb. 10, 2011

Related U.S. Application Data

(60) Provisional application No. 61/180,529, filed on May 22, 2009, provisional application No. 61/180,445, filed on May 22, 2009.

(51) Int. Cl.
*C12N 1/20* (2006.01)
(52) U.S. Cl.
USPC ............... 435/252.1; 435/252.34; 424/93.4
(58) Field of Classification Search
None
See application file for complete search history.

(56) References Cited

U.S. PATENT DOCUMENTS

| | | | |
|---|---|---|---|
| 5,877,014 A | 3/1999 | Shetty et al. |
| 6,087,155 A | 7/2000 | York et al. |
| 6,110,372 A | 8/2000 | Perriello |
| 6,150,155 A | 11/2000 | Wildung et al. |
| 6,244,346 B1 | 6/2001 | Perriello |
| 6,245,235 B1 | 6/2001 | Perriello |
| 6,350,605 B1 | 2/2002 | Mita et al. |
| 6,573,087 B2 | 6/2003 | Lehr |
| 6,719,902 B1 | 4/2004 | Alvarez et al. |
| 6,923,914 B2 | 8/2005 | Perriello |
| 7,740,063 B2 | 6/2010 | Fallon et al. |
| 7,776,795 B2 | 8/2010 | Keeler et al. |
| 2006/0216811 A1 | 9/2006 | Cunningham et al. |
| 2007/0092930 A1 | 4/2007 | Lal et al. |
| 2009/0082227 A1 | 3/2009 | Hnatow et al. |
| 2009/0263887 A1 | 10/2009 | Keeler et al. |

FOREIGN PATENT DOCUMENTS

| EP | 1189843 A | 3/2002 |
|---|---|---|
| WO | WO2006115199 | * 11/2006 |

OTHER PUBLICATIONS

Morris et al. (Biochem J. V 302, pp. 587-593, 1994.*
Bagge, Dorthe et al., *Shewanella putrefaciens* Adhesion and Biofilm Formation on Food Processing Surfaces, Applied and Environmental Microbiology, May 2001, pp. 2319-2325, vol. 67, No. 5, American Society for Microbiology.
Banat, I. M., Biosurfactants Production and Possible Uses in Microbial Enhanced Oil Recovery and Oil Pollution Remediation: A Review, Bioresource Technology, 1995, pp. 1-12, vol. 51, Elsevier Science Limited.
Desai, Jitendra D. et al., Microbial Production of Surfactants and Their Commerical Potential, Microbiology and Molecular Biology Reviews, Mar. 1997, pp. 47-64, vol. 61, No. 1, American Society for Microbiology.
Doong, Ruey-An et al., Solubilization and mineralization of polycyclic aromatic hydrocarbons by *Pseudomonas putida* in the presence of surfactant, Journal of Hazardous Materials, 2003, pp. 15-27, vol. B96, Elsevier Science B.V.
McInerney, M. J. et al., Development of microorganisms with improved transport and biosurfactant activity for enhanced oil recovery, Annual Report DE-FC-02NT15321, DOE, Jun. 26, 2003.
Bico, Jose et al., Wetting of textured surfaces, Colloids and Surfaces, 2002, pp. 41-46, vol. 206, Elsevier Science B.V.
Kuyukina, Maria S. et al., Effect of biosurfactants on crude oil desorption and mobilization in a soil system, Environment International, 2005, pp. 155-161, vol. 31, Elsevier Ltd.
Mulligan, Catherine N., Environmental applications for biosurfactants, Environmental Pollution, 2005, pp. 183-198, vol. 133, Elsevier Ltd.
Frederickson, James K., Towards environmental systems biology of *Shewanella*, Nature Reviews Microbiology, Aug. 2008, pp. 592-603, vol. 6.
Hau, Heidi H. et al., Ecology and Biotechnology of the Genus *Shewanella*, Annual Review of Microbiology, 2007, pp. 237-258, vol. 61, Annual Reviews.
Martin-Gil, J. et al., *Shewanella putrefaciens* in a fuel-in-water emulsion from the Prestige oil spill, Antonie van Leeuwenhoek, 2004, pp. 283-285, vol. 86, Kluwer Academic Publishers.
Altschul, Stephen F. et al., Bacic Local Alignment Search Tool, Journal of Molecular Biology, 1990, pp. 403-410, vol. 215, Academie Press Limited.
Barbeau, C. et al., Bioremediation of pentachlorophenol-contaminated soil by bioaugmentation using activated soil, Applied Microbiology Biotechnology, 1997, pp. 745-752, vol. 48, Springer-Verlag.
Berry, J. F. et al., In-Situ Saturation Measurements Improve Analysis and Interpretation of Laboratory Miscible and Immiscible Displacement Processes, SPE Reservoir Engineering, Nov. 1991, pp. 429-436, Society of Petroleum Engineers.

(Continued)

*Primary Examiner* — Richard Hutson

(57) ABSTRACT

Methods and compositions are provided wherein microorganisms are used to alter the interface of hydrocarbons and hydrocarbon-coated surfaces to increase oil recovery, for improved bioremediation and/or pipeline maintenance.

8 Claims, 18 Drawing Sheets

(56) References Cited

OTHER PUBLICATIONS

Figure 1:
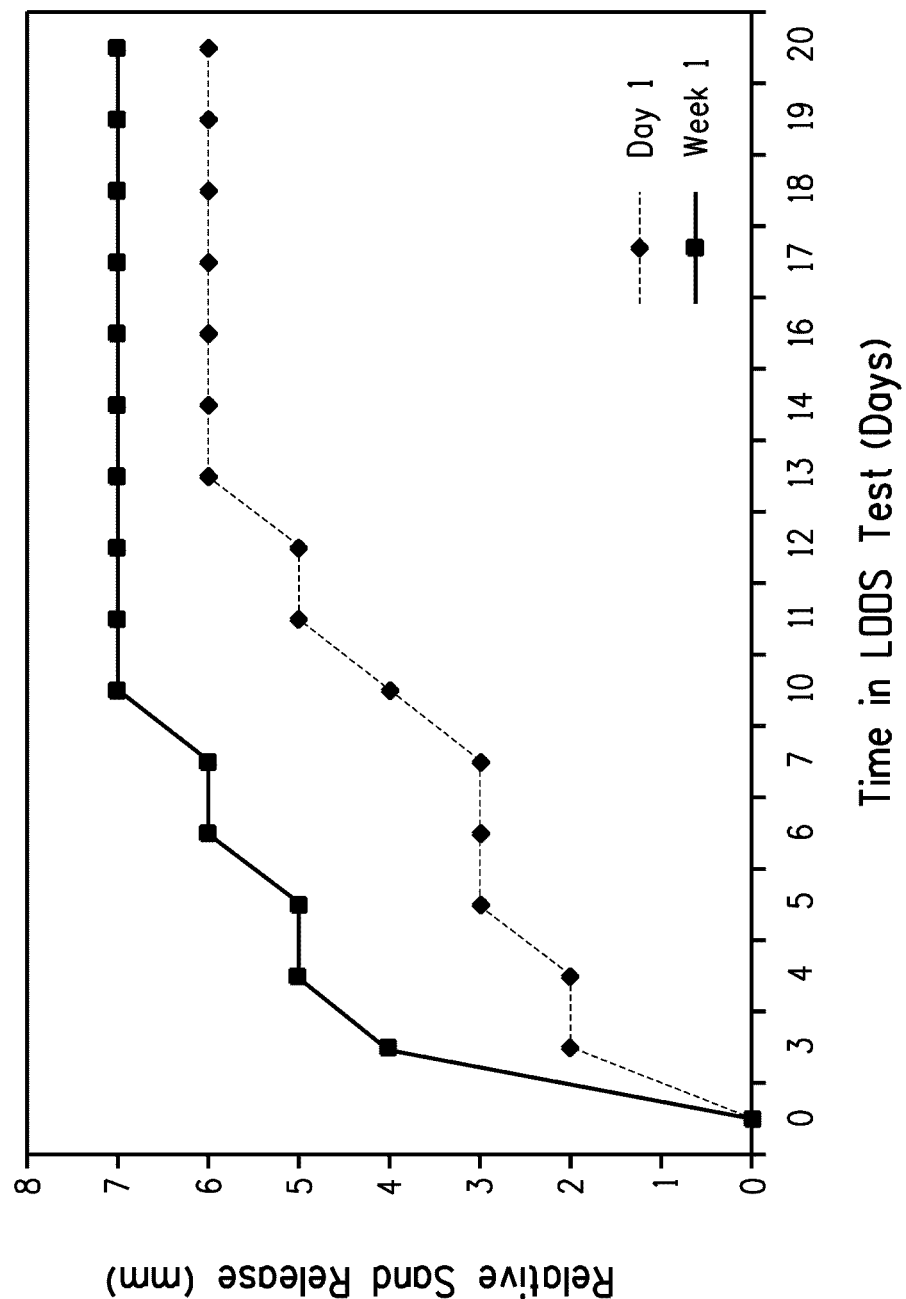

Moreno-Vivan, Conrado et al., Prokaryotic Nitrate Reduction: Molecular Properties and Functional Distinction among Bacterial Nitrate Reductases, Journal of Bacteriology, Nov. 1999, pp. 6573-6584, vol. 181, No. 21.

Bruce, James, Automated System Rapidly Identifies and Characterizes Microorganisms in Food, Food Technology, Jan. 1996, pp. 77-81.

Burgos, William D. et al., Soil Humic Acid Decreases Biological Uranium(VI) Reduction by *Shewanella putrefaciens* CN32, Environmental Enginerring Science, 2007, pp. 755-761, vol. 24, No. 6.

Fallon, R. D. et al., Anaerobic Biodegradation of Cyanide under Methanogenic Conditions, Applied and Environmental Microbiology, Jun. 1991, pp. 1656-1662, vol. 57, No. 6, American Society for Microbiology.

Validation of the Publication of New Names and New Combinations Previously Effectively Published Outside the IJSB, International Journal of Systematic Bacterilogy, Apr. 1986, pp. 354-356, vol. 36, No. 2, Intl. Union of Microbiological Societies.

Levi, J. D. et al., Meor Strategy and Screening Methods for Anaerobic Oil-Mobilizing Bacteria, Microbes and Oil Recovery (vol. 1), International Bioresources Journal, Edited by Zajic and Donaldson, 1985, pp. 336-344.

Picardal, Flynn W. et al., Involvement of Cytochromes in the Anaerobic Biotransformation of Tetrachloromethane by *Shewanella putrefaciens* 200, Applied and Environmental Microbiology, Nov. 1993, pp. 3763-3770, vol. 59, No. 11.

Liu, Chongxuan et al., Reduction Kinetics of Fe(III), Co(III), U(VI), Cr(VI), and Tc(VII) in Cultures of Dissimilatory Metal-Reducing Bacterial, Biotechnology and Bioengineering, Dec. 20, 2002, pp. 637-649, vol. 80, No. 6.

Maudgalya, Saikrishna et al., Development of Bio-surfactant Based Microbial Enhanced Oil Recovery Procedure, SPE 89473, SPE International, 2004, pp. 1-6, Society of Petroleum Engineers.

Sethi, Manju, Fully automated microbial characterization and identification for industrial microbiologists, American Laboratory, May 1997, pp. 31-35.

Stapleton, Jr., Raymond D. et al, Metal reduction at cold temperatures by *Shewanella* isolates from various marine environments, Aquatic Microbial Ecology, Jan. 21, 2005, pp. 81-91, vol. 38.

Brown, L. R. et al., Slowing Production Decline and Extending the Economic Life of an Oil Field: New MEOR Technology, SPE/DOE Improved Oil Recovery Symposium, SPE 59306, Apr. 3-5, 2000, Tulsa, OK, pp. 1-16.

Sunde, Egil et al., Aerobic Microbial Enhanced Oil Recovery for Offshore Use, SPE/DOE Symposium on Enhanced Oil Recovery, SPE/DOE 24204, Apr. 22-24, 1992, Tulska, OK, pp. 497-502.

Office Action mailed Nov. 19, 2009, in co-pending U.S. Patent No. 7,776,795.

Office Action mailed Jan. 13, 2010, in co-pending U.S. Patent No. 7,776,795.

Notice of Allowance mailed May 20, 2010, in co-pending U.S. Patent No. 7,776,795.

\* cited by examiner

Figure 14

```
Majority           ACTTTCAGCGAGGAGGAAAGGTTAGTAGTAATACCTGCTAGCTGTGACGTTACTCGCAGAAGAAGCACCG
                   +----+----+----+----+----+----+----+----+----+----+----+----+----+
                   390       400       410       420       430       440       450       460

SEQ ID NO:4  Shewanella putrefaciens CN32    ACTTTCAGTAGTGAGGAGGGAAAGGGTAAGGTTAATACGCCCTTAATCGTGACGTTACCTACAGAAGAAGGACCG 498
SEQ ID NO:5  Shewanella sp LH4:18            ACTTTCAGTAGTGAGGAGGGAAAGGGTAAGGTTAATACGCCTTAATCGTGACGTTACCTACAGAAGAAGGACCG 442
SEQ ID NO:6  Shewanella algae                ACTTTCAGCGAGGAGGGAAAGGGTGTAAGTTAAGGTTGTGACGTTACTCGCAGAAGAAGCACCG 460
SEQ ID NO:7  Shewanella sp. C13-M            ACTTTCAGCGAGGAGGGAAAGGGTAAGGTTGGTAGTAATACCTGCTATCGTGACGTTACTCGCAGAAGAAGCACCG 447
SEQ ID NO:8  Shewanella sp. C31              ACTTTCAGCGAGGAGGGAAAGGGTAAGGTTGGTAGTAATACCTGCTAGCTGTGACGTTACTCGCAGAAGAAGCACCG 446
SEQ ID NO:9  Shewanella sp. L-10             ACTTTCAGCGAGGAGGGAAAGGGTAAGGTTAGTAGTAATACCTGCTAGCTGTGACGTTACTCGCAGAAGAAGCACCG 447
SEQ ID NO:10 Shewanella chilikensis JC5T     ACTTTCAGCGAGGAGGGAAAGGGTAAGGTTAGTAGTAATACCTGCTAGCTGTGACGTTACTCGCAGAAGAAGCACCG 474
SEQ ID NO:11 Shew. clone DOO4O24HO7          ACTTTCAGCGAGGAGGGAAAGGGTAAGGTTAGTAGTAATACCTGCTAGCTGTGACGTTACTCGCAGAAGAAGCACCG 500
SEQ ID NO:12 Shewanella sp. C16-M            ACTTTCAGCGAGGAGGGAAAGGGTAAGGTTAGTAGTAATACCTGCTAGCTGTGACGTTACTCGCAGAAGAAGCACCG 448
SEQ ID NO:3  Shewanella sp L3:3              ACTTTCAGCGAGGAGGGAAAGGGTAAGGTTAGTAGTAATACCTGCTAGCTGTGACGTTACTCGCAGAAGAAGCACCG 500
                                             430    438-40  451   454-57         466-69      484-86    496
                                                                                 471                   500
```

Figure 15

```
Majority          CATCCTCAGAAGCCAGCAGCGGAGACCCAGGTGTGCCTTCGGG-AACTGAGAGAC
                  +----+----+----+----+----+----+----+----+----+----+----+
                  950       960       970       980       990      1000

SEQ ID NO:4   Shewanella putrefaciens CN32      CATCCACAGAACTTTCCAGAGATGGATTGGTGCCTTCGGG-AACTGTGAGAC 1047
SEQ ID NO:5   Shewanella putrefaciens LH4:18    CATCCACAGAACTTTCCAGAGATGGATTGGTGCCTTCGGG-AACTGTGAGAC 991
SEQ ID NO:6   Shewanella algae                  CATCCACAGAACTTTCCAGAGATGGATTGGTGCCTTCGGG-AACTCTGAGAC 1009
SEQ ID NO:8   Shewanella sp. C31                CATCCTCAGAAGCAGCGGAGACGCAGCAGGTGTGCCTTCGGG-AACTGAGAGAC 997
SEQ ID NO:7   Shewanella sp. C13-M              CATCCTCAGAAGCAGCAGCGGAGACCAGCAGGTGTGCCTTCGGG-AACTGAGAGAC 995
SEQ ID NO:9   Shewanella sp. L-10               CATCCTCAGAAGCAGCAGCGGAGACCAGCAGGTGTGCCTTCGGG-AACTGAGAGAC 996
SEQ ID NO:10  Shewanella chilikensis JC5T.      CATCCTCAGAAGCAGCAGCGGAGACGGCAGCAGGTGTGCCTTCGGGGAACTGAGAGAC 1028
SEQ ID NO:11  Shewanellaceae clone D004024H07   CATCCTCAGAAGCAGCAGCGGAGACGCAGCAGGTGTGCCTTCGGG-AACTGAGAGAC 1049
SEQ ID NO:12  Shewanella sp. C16-M              CATCCTCAGAAGCAGCAGCGGAGACGCAGCAGGTGTGCCTTCGGG-AACTGAGAGAC 1097
SEQ ID NO:3   Shewanella sp. L3:3               CATCCTCAGAAGCAGCAGCGGAGACGCAGCAGGTGTGCCTTCGGG-AACTGAGAGAC 1049
                  990 995-6 1001-5           1012,1016-18
                                        1007 1014
                                                1035
```

|  | 170 | 180 | 190 | 200 | 203 |
|---|---|---|---|---|---|

SEQ ID NO:18 Shewanella dominate signature    GCATACGCCTAGGGGAACAGGGAGATTTC 203
SEQ ID NO:19 Shewanella degenerate signature  GCATACCCTWRGGGARSGGAARYTYM 203

B

|  | 820 | 830 | 840 | 850 | 860 |
|---|---|---|---|---|---|

SEQ ID NO:20 Shewanella dominate signature    TCGATTTGCTGTGTTGATGCAGTGGAGTCTAG 861
SEQ ID NO:21 Shewanella degenerate signature  TCGAKTTGSYVHTTRAMTGSTTWAMGTRACG 861

C

|  | 1230 | 1240 | 1250 | 1260 | 1270 |
|---|---|---|---|---|---|

SEQ ID NO:22 Shewanella dominate signature    ACAAGGCTAGTACGTGCCAGCAGCCGCGGTAATACA
SEQ ID NO:23 Shewanella degenerate signature  ACAAKGSYDRSTACGTGCCAGCMGCYGCKGTAAYWCA

|  | 1280 | 1290 | 1300 | 1310 | 1320 |
|---|---|---|---|---|---|

Shewanella dominate signature cont'd.    CAAAGGCTCGGGAGCGAAGGGCACTGCAGAG
Shewanella degenerate signature cont'd.  BRAGSBSVGGVSCGRYVGGKMCWCDGMARRG Legend:
R=A/G; Y=T/C; M=A/C; S=G/C; N=A/C/G/T; H=A/C/T/not G; V=A/C/G/not T; B=C/G/T/not A;
D=A/G/T/not C; K=G/T

SEQUENCE LISTING

<160> NUMBER OF SEQ ID NOS: 23

<210> SEQ ID NO 1
<211> LENGTH: 20
<212> TYPE: DNA
<213> ORGANISM: artificial sequence
<220> FEATURE:
<223> OTHER INFORMATION: primer

<400> SEQUENCE: 1
cggttacctt gttacgactt    20

<210> SEQ ID NO 2
<211> LENGTH: 20
<212> TYPE: DNA
<213> ORGANISM: artificial sequence
<220> FEATURE:
<223> OTHER INFORMATION: primer 8f

<400> SEQUENCE: 2
agagtttgat ymtggctcag    20

<210> SEQ ID NO 3
<211> LENGTH: 1456
<212> TYPE: DNA
<213> ORGANISM: shwenanella species

<400> SEQUENCE: 3
agagtttgat catggctcag attgaacgct ggcggcaggc ctaacacatg caagtcgagc    60
ggtaacattt caaaagcttg cttttgaaga tgacgagcgg cggacgggtg agtaatgcct   120
gggaatttgc ccatttgtgg gggataacag ttggaaacga ctgctaatac cgcatacgcc   180
ctacggggga aagcagggga acttcggtcc ttgcgctgat ggataagccc aggtgggatt   240
agctagtagg tgaggtaatg gctcacctag gcaacgatcc ctagctggtc tgagaggatg   300
atcagccaca ctgggactga gacacggccc agactcctac gggaggcagc agtggggaat   360
attgcacaat gggggaaacc ctgatgcagc catgccgcgt gtgtgaagaa ggccttcggg   420
ttgtaaagca cttcagcga ggaggaaagg ttagtagtta atacctgcta gctgtgacgt   480
tactcgcaga agaagcaccg gctaactccg tgccagcagc cgcggtaata cggagggtgc   540

```
gagcgttaat cggaattact gggcgtaaag cgtgcgcagg cggtttgtta agcgagatgt      600
gaaagccccg ggctcaacct gggaaccgca tttcgaactg gcaaactaga gtcttgtaga      660 gggggggtaga attccaggtg tagcggtgaa atgcgtagag atctggagga ataccggtgg     720
cgaaggcggc cccctggaca aagactgacg ctcaggcacg aaagcgtggg gagcaaacag      780
gattagatac cctggtagtc cacgccgtaa acgatgtcta ctcggagttt ggtgtcttga      840
acactgggct ctcaagctaa cgcattaagt agaccgcctg gggagtacgg ccgcaaggtt      900
aaaactcaaa tgaattgacg ggggcccgca caagcggtgg agcatgtggt ttaattcgat      960
gcaacgcgaa gaaccttacc tactcttgac atcctcagaa gccagcggag acgcaggtgt     1020
gccttcggga actgagagac aggtgctgca tggctgtcgt cagctcgtgt tgtgaaatgt     1080
tgggttaagt cccgcaacga gcgcaacccc tatccttact tgccagcggg taatgccggg     1140
aactttaggg agactgccgg tgataaaccg gaggaaggtg gggacgacgt caagtcatca     1200
tggcccttac gagtagggct acacacgtgc tacaatggtc ggtacagagg ttgcgaagc      1260 cgcgaggtgg agctaatctc ataaagccgg tcgtagtccg gattggagtc tgcaactcga     1320
ctccatgaag tcggaatcgc tagtaatcgt ggatcagaat gccacggtga atacgttccc     1380
gggccttgta cacaccgccc gtcacaccat gggagtgggc tgcaccagaa gtagatagct     1440
taaccttcgg gagggc                                                    1456

<210> SEQ ID NO 4
<211> LENGTH: 1535
<212> TYPE: DNA
<213> ORGANISM: Shewanella species

<400> SEQUENCE: 4
agagtttgat catggctcag attgaacgct ggcggcaggc ctaacacatg caagtcgagc       60
ggcagcacaa gggagtttac tcctgaggtg cgagcggcg gacgggtgag taatgcctag      120
ggatctgccc agtcgagggg gataacagtt ggaaacgact gctaataccg catacgccct     180 acggggaaa ggaggggacc ttcgggcctt ccgcgattgg atgaacctag gtgggattag      240
ctagttggtg aggtaatggc tcaccaaggc gacgatccct agctgttctg agaggatgat     300
cagccacact gggactgaga cacggcccag actcctacgg gaggcagcag tggggaatat     360
tgcacaatgg gggaaaccct gatgcagcca tgccgcgtgt gtgaagaagg ccttcgggtt     420
gtaaagcact tcagtaggg aggaaagggt aaggtttaat acgccttatc tgtgacgtta     480
cctacagaag aaggaccggc taactccgtg ccagcagccg cggtaatacg agggtccga     540 gcgttaatcg gaattactgg gcgtaaagcg tgcgcaggcg gtttgttaag cgagatgtga     600
aagccctggg ctcaacctag aatagcatt tcgaactggc aactagagt cttgtagagg      660 ggggtagaat tccaggtgta gcggtgaaat gcgtagagat ctggaggaat accggtggcg     720
aaggcggccc cctggacaaa gactgacgct catgcacgaa agcgtgggga gcaaacagga     780
ttagataccc tggtagtcca cgccgtaaac gatgtctact cggagtttgg tgtcttgaac     840
actgggctct caagctaacg cattaagtag accgcctggg agtacggcc gcaaggttaa     900 aactcaaatg aattgacggg ggcccgcaca agcggtggag catgtggttt aattcgatgc     960
aacgcgaaga accttaccta ctcttgacat ccacagaact ttccagagat ggattggtgc    1020
cttcgggaac tgtgagacag gtgctgcatg gctgtcgtca gctcgtgttg tgaaatgttg    1080
ggttaagtcc cgcaacgagc gcaaccccta tccttatttg ccagcacgta atggtgggaa    1140
ctctagggag actgccggtg ataaaccgga ggaaggtggg gacgacgtca agtcatcatg    1200
```

```
gcccttacga gtagggctac acacgtgcta caatggcgag tacagagggt tgcaaagccg    1260
cgaggtggag ctaatctcac aaagctcgtc gtagtccgga ttggagtctg caactcgact    1320
ccatgaagtc ggaatcgcta gtaatcgtgg atcagaatgc cacggtgaat acgttcccgg    1380
gccttgtaca caccgcccgt cacaccatgg gagtgggctg caaaagaagt gggtagctta    1440
accttcgggg gggcgctcac cactttgtgg ttcatgactg gggtgaagtc gtaacaaggt    1500
agccctaggg gaacctgggg ctggatcacc tcctt                               1535

<210> SEQ ID NO 5
<211> LENGTH: 1407
<212> TYPE: DNA
<213> ORGANISM: Shewanella species

<400> SEQUENCE: 5
gagcggcagc acaagggagt ttactcctga ggtggcgagc ggcggacggg tgagtaatgc      60
ctagggatct gcccagtcga ggggataaca gttggaaaac gactgctaat accgcatacg    120
ccctacgggg gaaaggaggg gaccttcggg ccttccgcga ttggatgaac ctaggtggga    180
ttagctagtt ggtgaggtaa tggctcacca aggcgacgat ccctagctgt tctgagagga    240
tgatcagcca cactgggact gagacacggc ccagactcct acgggaggca gcagtgggga    300
atattgcaca atgggggaaa ccctgatgca gccatgccgc gtgtgtgaag aaggccttcg    360
ggttgtaaag cactttcagt agggaggaaa gggtaaggtt tatacgcctt atctgtgacg    420
ttacctacag aagaaggacc ggctaactcc gtgccagcag ccgcggtaat acggagggtc    480
cgagcgttaa tcggaattac tgggcgtaaa gcgtgcgcag gcggtttgtt aagcgagatg    540
tgaaagccct gggctcaacc taggaatagc atttcgaact ggcgaactag agtcttgtag    600 agggggtag aattccaggt gtagcggtga atgcgtaga gtctggagga ataccggtgg    660
cgaaggcggc cccctggaca agactgacg ctcatgcacg aaagcgtggg gagcaaacag    720
gattagatac cctggtagtc cacgccgtaa acgatgtcta ctcggagttt ggtgtcttga    780
acactgggct ctcaagctaa cgcattaagt agaccgcctg gggagtacgg ccgcaaggtt    840
aaaactcaaa tgaattgacg ggggcccgca caagcggtgg agcatgtggt ttaattcgat    900
gcaacgcgaa gaaccttacc tactcttgac atccacagaa ctttccagag atggattggt    960
gccttcggga actgtgagac aggtgctgca tggctgtcgt cagctcgtgt tgtgaaatgt   1020
tgggttaagt cccgcaacga gcgcaacccc tatccttatt tgccagcacg taatggtggg   1080
aactctaggg agactgccgg tgataaaccg gaggaaggtg gggacgacgt caagtcatca   1140
tggcccttac gagtagggct acacacgtgc tacaatggcg agtacagagg ttgcaaagc   1200 cgcgaggtgg agctaatctc acaaagctcg tcgtagtccg gattgagtc tgcaactcga   1260 ctccatgaag tcggaatcgc tagtaatcgt ggatcagaat gccacggtga atacgttccc   1320
gggccttgta cacaccgccc gtcacaccat gggagtgggc tgcaaaagaa gtgggtagct   1380
taaccttcgg ggggcgctc accactt                                         1407

<210> SEQ ID NO 6
<211> LENGTH: 1425
<212> TYPE: DNA
<213> ORGANISM: Shewanella algae

<400> SEQUENCE: 6
gctacacatg caagtcgagc ggtaacattt caaaagcttg cttttgaaga tgacgagcgg     60
cggacgggtg agtaatgcct gggaatttgc ccatttgtgg gggataacag ttggaaacga    120
```

```
ctgctaatac cgcatacgcc ctacggggga aagcagggga acttcgggcc ttgcgctgat      180
ggataagccc aggtgggatt agctagtagg tgaggtaatg gctcacctag caacgatcc      240 ctagctggtc tgagaggatg atcagccaca ctgggactga gacacggccc agactcctac      300
gggaggcagc agtggggaat attgcacaat gggggaaacc ctgatgcagc catgccgcgt      360
gtgtgaagaa ggccttcggg ttgtaaagca ctttcagcga ggaggaaagg gtgtaagtta      420
ataccttaca tctgtgacgt tactcgcaga agaagcaccg gctaactccg tgccagcagc      480
cgcggtaata cggagggtgc gagcgttaat cggaattact gggcgtaaag cgtgcgcagg      540
cggtttgtta agcgagatgt gaaagccccg ggctcaacct gggaaccgca tttcgaactg      600
gcaaactaga gtcttgtaga gggggtagaa ttccaggtg tagcggtgaa atgcgtagag      660
atctggagga ataccggtgg cgaatgcggc ccctggaca aagactgacg ctcaagcacg      720
aaagcgtggg gagcaaacag gattagatac cctggtagtc cacgccgtaa acgatgtcta      780
ctcggagttt ggtgtcttga acactgggct ctcaagctaa cgcattaagt agaccgcctg      840
gggagtacgg ccgcaaggtt aaaactcaaa tgaattgacg ggggcccgca caagcggtgg      900
agcatgtggt ttaattcgat gcaacgcgaa gaaccttacc tactcttgac atccagagaa      960
ctttccagag atggattggt gccttcggga actctgagac aggtgctgca tggctgtcgt     1020
cagctcgtgt tgtgaaatgt tgggttaagt cccgcaacga gcgcaacccc tatccttact     1080
tgccagcggg taatgccggg aactttaggg agactgccgg tgataaaccg gaggaaggtg     1140
gggacgacgt caagtcatca tggcccttac gagtagggct acacacgtgc tacaatggtc     1200
ggtacagagg gttgcgaagc cgcgaggtgg agctaatctc ataaagccgg tcgtagtccg     1260
gattggagtc tgcaactcga ctccatgaag tcggaatcgc tagtaatcgt ggatcagaat     1320
gccacggtga atacgttccc gggccttgta cacaccgccc gtcacaccat gggagtgggc     1380
tgcaccagaa gtagatagct taaccttcgg gagggcgtta ccacg                     1425
```

<210> SEQ ID NO 7
<211> LENGTH: 1401
<212> TYPE: DNA
<213> ORGANISM: Shewanella species

<400> SEQUENCE: 7

```
tcgagcggta acatttcaaa agcttgcttt tgaagatgac gagcggcgga cgggtgagta       60
atgcctggga atttgcccat tgtgggggga taacagttgg aaacgactgc taataccgca      120
tacgccctac gggggaaagc aggggaactt cggtccttgc gctgatggat aagcccaggt      180
gggattagct agtaggtgag gtaatggctc acctaggcga cgatccctag ctggtctgag      240
aggatgatca gccacactgg gactgagaca cggcccagac tcctacggga ggcagcagtg      300
gggaatattg cacaatgggg gaaaccctga tgcagccatg ccgcgtgtgt gaagaaggcc      360
ttcgggttgt aaagcacttt cagcgaggag gaaaggttag tagttaatac ctgctatctg      420
tgacgttact cgcagaagaa gcaccggcta actccgtgcc agcagccgcg gtaatacgga      480
gggtgcgagc gttaatcgga attactgggc gtaaagcgtg cgcaggcggt ttgttaagcg      540
agatgtgaaa gccccgggct caacctggga accgcatttc gaactggcaa actagagtct      600
tgtagagggg ggtagaattc caggtgtagc ggtgaaatgc gtagagatct ggaggaatac      660
cggtggcgaa ggcggcccc tggacaaaga ctgacgctca ggcacgaaag cgtggggagc      720
aaacaggatt agataccctg gtagtccacg ccgtaaacga tgtctactcg gagttttggtg      780 tcttgaacac tgggctctca agctaacgca ttaagtagac cgcctgggga gtacggccgc      840
```

```
aaggttaaaa ctcaaatgaa ttgacggggg cccgcacaag cggtggagca tgtggtttaa      900
ttcgatgcaa cgcgaagaac cttacctact cttgacatcc tcagaagcca gcggagacgc      960
aggtgtgcct tcgggaactg agagacaggt gctgcatggc tgtcgtcagc tcgtgttgtg     1020
aaatgttggg ttaagtcccg caacgagcgc aaccccctatc cttacttgcc agcgggtaat    1080
gccgggaact ttagggagac tgccggtgat aaaccggagg aaggtgggga cgacgtcaag    1140
tcatcatggc ccttacgagt agggctacac acgtgctaca atggtcggta cagagggttg    1200
cgaagccgcg aggtggagct aatctcataa agccggtcgt agtccggatt ggagtctgca    1260
actcgactcc atgaagtcgg aatcgctagt aatcgtggat cagaatgcca cggtgaatac    1320
gttcccgggc cttgtacaca ccgcccgtca ccatgggga gtgggctgca ccagaagtag      1380
atagcttaac cttcgggagg g                                                1401

<210> SEQ ID NO 8
<211> LENGTH: 1410
<212> TYPE: DNA
<213> ORGANISM: Shewanella species

<400> SEQUENCE: 8
gtcgagcggt aacatttcaa aagcttgctt ttgaagatga cgagcggcgg acgggtgagt      60
aatgcctggg aatttgccca tttgtggggg ataacagttg gaaacgactg ctaataccgc     120
atacgcccta cggggggaaag caggggaact tcggtccttg cgctgatgga taagcccagg    180
tgggattagc tagtaggtga ggtaatggct caccctaggcg acgatcccta gctggtctga    240
gaggatgatc agccacactg gaactgagac acggcccaga ctcctacggg aggcagcagt    300
ggggaatatt gcacaatggg ggaaaccctg atgcagccat gccgcgtgtg tgaagaaggc    360 cttcggggttg taaagcactt tcagcgagga ggaaggttg gtagttaata cctgctagct    420
gtgacgttac tcgcagaaga agcaccggct aactccgtgc cagcagccgc ggtaatacgg    480
agggtgcgag cgttaatcgg aattactggg cgtaaagcgt gcgcaggcgg tttgttaagc    540
gagatgtgaa agccccgggc tcaacctggg aaccgcattt cgaactggca aactagagtc    600
ttgtagaggg gggtagaatt ccaggtgtag cggtgaaatg cgtagagatc tggaggaata    660
ccggtggcga aggcggcccc ctggacaaag actgacgctc aggcacgaaa gcgtggggag    720
caaacaggat tagataccct ggtagtccac gccgtaaacg atgtctactc ggagtttggt    780
gtcttgaaca ctgggctctc aagctaacgc attaagtaga ccgcctgggg agtacgggcc    840
gcaaggttaa aactcaaatg aattgacggg ggcccgcaca agcggtggag catgtggttt    900
aattcgatgc aacgcgaaga accttaccta ctcttgacat cctcagaagc cagcggagac    960
gcaggtgtgc cttcgggaac tgagagacag gtgctgcatg gctgtcgtca gctcgtgttg   1020
tgaaatgttg ggttaagtcc cgcaacgagc gcaaccccta tccttacttg ccagcgggta   1080
atgccgggaa ctttagggag actgccggtg ataaaccgga ggaaggtggg gacgacgtca   1140
agtcatcatg gcccttacga gtagggctac acacgtgcta caatggtcgg tacagagggt   1200
tgcgaagccg cgaggtggag ctaatctcat aaagccggtc gtagtccgga ttggagtctg   1260
caactcgact ccatgaagtc ggaatcgcta gtaatcgtgg atcagaatgc cacggtgaat   1320
acgttcccgg ccttgtaca caccgcccgt cacaccatgg gagtgggctg caccagaagt   1380
agatagctta accttcggga gggcgttacc                                    1410

<210> SEQ ID NO 9
<211> LENGTH: 1398
```

```
<212> TYPE: DNA
<213> ORGANISM: Shewanella species

<400> SEQUENCE: 9
gtcgagcggt aacatttcaa aagcttgctt ttgaagatga cgagcggcgg acgggtgagt      60
aatgcctggg aatttgccca tttgtggggg ataacagttg gaaacgactg ctaataccgc     120
atacgcccta cggggaaag caggggaact tcggtccttg cgctgatgga taagcccagg     180
tgggattagc tagtaggtga ggtaatggct cacctaggcr acgatcccta gctggtctga     240
gaggatgatc agccacactg ggactgagac acggcccaga ctcctacggg aggcagcagt     300
ggggaatatt gcacaatggg ggaaaccctg atgcagccat gccgcgtgtg tgaagaaggc     360 cttcggttg taaagcactt tcagcgagga ggaaaggtta gtagttaata cctgctagct     420
gtgacgttac tcgcagaaga agcaccggct aactccgtgc cagcagccgc ggtaatacgg     480
agggtgcgag cgttaatcgg aattactggg cgtaaagcgt gcgcaggcgg tttgttaagc     540
gagatgtgaa agccccgggc tcaacctggg aaccgcattt cgaactggca aactagagtc     600
ttgtagaggg gggtagaatt ccaggtgtag cggtgaaatg cgtagagatc tggaggaata     660
ccggtggcga aggcggcccc ctggacaaag actgacgctc aggcacgaaa gcgtggggag     720
caaacaggat tagatacct ggtagtccac gccgtaaacg atgtctactc ggagtttggt     780
gtcttgaaca ctgggctctc aagctaacgc attaagtaga ccgcctgggg agtacgccg     840 caaggttaaa actcaaatga attgacgggg gcccgcacaa gcggtggagc atgtggttta     900
attcgatgca acgcgaagaa ccttacctac tcttgacatc ctcagaagcc agcggagacg     960
caggtgtgcc ttcgggaact gagagacagg tgctgcatgg ctgtcgtcag ctcgtgttgt    1020
gaaatgttgg gttaagtccc gcaacgagcg caacccctat ccttacttgc cagcgggtaa    1080
tgccgggaac tttagggaga ctgccggtga taaaccggag gaaggtgggg acgacgtcaa    1140
gtcatcatgg cccttacgag tagggctaca cacgtgctac aatggtcggt acagagggtt    1200
gcgaagccgc gaggtggagc taatctcata aagccggtcg tagtccggat tggagtctgc    1260
aactcgactc catgaagtcg gaatcgctag taatcgtgga tcagaatgcc acggtgaata    1320
cgttcccggg ccttgtacac accgcccgtc acaccatggg agtgggctgc accagaagta    1380
gatagcttaa ccttcggg                                                  1398

<210> SEQ ID NO 10
<211> LENGTH: 1467
<212> TYPE: DNA
<213> ORGANISM: Shewanella chilikensis

<400> SEQUENCE: 10
gtaccttaca gcaaactaca catgcaagtc gagcggtaca tttcaaaagc ttgcttttga      60
agatgacgag cggcgacgg gtgagtaatg cctgggaatt tgcccatttg tggggataa     120 cagttggaaa cgactgctaa taccgcatac gccctacggg ggaaagcagg ggaacttcgg     180
tccttgcgct gatggataag cccaggtggg attagctagt aggtgaggta atggctcacc     240
taggcaacga tccctagctg gtctgagagg atgatcagcc acactgggac tgagacacgg     300
cccagactcc tacggaggc agcagtgggg aatattgcat caatgggga aaccctgatg     360 cagccatgcc gcgtgtgtga agaaggcctt cgggttgtaa agcactttca gcgaggagga     420 aggttagta gttaataccct gctagctgtg acgttactcg cagaagaagc accggctaac     480
tccgtgccag cagccgcggt aatacggagg gtgcgagcgt taatcggaat tactgggcgt     540
aaagcgtgcg caggcggttt gttaagcgag atgtgaaagc cccgggctca acctgggaac     600
```

```
cgcatttcga actggcaaac tagagtcttg tagaggggggg tagaattcca ggtgtagcgg    660
tgaaatgcgt agagatctgg aggaataccg gtggcgaagg cggccccctg gacaaagact    720
gacgctcagg cacgaaaagc gtgggggagc aaacaggtat tagataccct ggtagtcca     780 cgccgtaaac gatgtctact cggagtttgg tgtcttgaac actgggctct caagctaacg    840
cattaagtag accgcctggg gagtacggcc gcaaggttaa aactcaaatg aattgacggg    900
ggcccgcaca agcggtggag catgtggttt aattcgatgc aacgcgaaga accttaccta    960
ctcttgacat cctcagaagc cagcggagac gcaggtgtgc cttcgggaa ctgagagaca    1020 ggtgctgcat ggctgtcgtc agctcgtgtt gtgaaatgtt gggttaagtc ccgcaacgag   1080
cgcaacccct atccttactt gccagcgggt aatgccggga actttaggga gactgccggt   1140
gataaaccgg aggaaggtgg ggacgacgtc aagtcatcat ggcccttacg agtagggcta   1200
cacacgtgct acaatggtcg gtacagaggg ttgcgaagcc gcgaggtgga gctaatctca   1260
taaagccggt cgtagtccgg attggagtct gcaactcgac tccatgaagt cggaatcgct   1320
agtaatcgtg gatcagaatg ccacggtgaa tacgttcccg ggccttgtac acaccgcccg   1380
tcacaccatg ggagtgggct gcaccagaag tagatagctt aaccttcggg agggcgttta   1440
ccacggtgtg gttcatgact ggggtga                                       1467

<210> SEQ ID NO 11
<211> LENGTH: 1402
<212> TYPE: DNA
<213> ORGANISM: Shewanella species

<400> SEQUENCE: 11
agagtttgat tatggctcag attgaacgct ggcggcaggc ctaacacatg caagtcgagc     60
ggtaacattt caaaagcttg cttttgaaga tgacgagcgg cggacgggtg agtaatgcct    120
gggaatttgc ccatttgtgg gggataacag ttggaaacga ctgctaatac cgcatacgcc    180
ctacggggga aagcagggga acttaggtcc ttgcgctgat ggataagccc aggtgggatt    240
agctagtagg tgaggtaatg gctcacctag gcgacgatcc ctagctggtc tgagaggatg    300
atcagccaca ctgggactga gacacggccc agactcctac gggaggcagc agtggggaat    360
attgcacaat gggggaaacc ctgatgcagc catgccgcgt gtgtgaagaa ggccttcggg    420
ttgtaaagca ctttcagcga ggaggaaagg ttagtagtta atacctgcta gctgtgacgt    480
tactcgcaga agaagcaccg gctaactccg tgccagcagc cgcggtaata cggagggtgc    540
gagcgttaat cggaattact gggcgtaaag cgtgcgcagg cggtttgtta agcgagatgt    600 gaaagcccccg ggctcaacct gggaaccgca tttcgaactg gcaaactaga gtcttgtaga    660 gggggtaga attccaggtg tagcggtgaa atgcgtagag atctggagga ataccggtgg    720
cgaaggcggc cccctggaca aagactgacg ctcaggcacg aaagcgtggg gagcaaacag    780
gattagatac cctggtagtc cacgccgtaa acgatgtcta ctcggagttt ggtgtcttga    840
acactgggct ctcaagctaa cgcattaagt agaccgcctg gggagtacgg ccgcaaggtt    900
aaaactcaaa tgaattgacg ggggcccgca caagcggtgg agcatgtggt ttaattcgat    960
gcaacgcgaa gaaccttacc tactcttgac atcctcagaa gccagcggag acgcaggtgt   1020
gccttcggga actgagagac aggtgctgca tggctgtcgt cagctcgtgt tgtgaaatgt   1080
tgggttaagt cccgcaacga gcgcaacccc tatccttact tgccagcggg taatgccggg   1140
aactttaggg agactgccgg tgataaaccg gaggaaggtg gggacgacgt caagtcatca   1200
tggcccttac gagtagggct acacacgtgc tacaatggtc ggtacagagg gttgcgaagc   1260
```

```
cgcgaggtgg agctaatctc ataaagccgg tcgtagtccg gattggagtc tgcaactcga    1320
ctccatgaag tcggaatcgc tagtaatcgt ggatcagaat gccacggtga atacgttccc    1380
gggccttgca cacccccg tc                                               1402

<210> SEQ ID NO 12
<211> LENGTH: 1404
<212> TYPE: DNA
<213> ORGANISM: Shewanella species

<400> SEQUENCE: 12
agtcgagcgg taacatttca aaagcttgct tttgaagatg acgagcggcg gacgggtgag      60
taatgcctgg gaatttgccc atttgtgggg gataacagtt ggaaacgact gctaataccg     120
catacgccct acggggaaa gcaggggaac ttcggtcctt gcgctgatgg ataagcccag      180
gtgggattag ctagtaggtg aggtaatggc tcacctaggc gacgatccct agctggtctg     240
agaggatgat cagccacact gggactgaga cacggcccag actcctacgg gaggcagcag    300 tgggaatat tgcacaatgg gggaaaccct gatgcagcca tgccgcgtgt gtgaagaagg     360
ccttcgggtt gtaaagcact ttcagcgagg aggaaaggtt agtagttaat acctgctagc    420
tgtgacgtta ctcgcagaag aagcaccggc taactccgtg ccagcagccg cggtaatacg    480
gagggtgcga gcgttaatcg gaattactgg gcgtaaagcg tgcgcaggcg gtttgttaag    540
cgagatgtga agcccgggg ctcaacctgg gaaccgcatt tcgaactggc aaactagagt    600
cttgtagagg ggggtagaat tccaggtgta gcggtgaaat gcgtagagat ctggaggaat    660
accggtggcg aaggcggccc cctggacaaa gactgacgct caggcacgaa agcgtgggga    720
gcaaacagga ttagataccc tggtagtcca cgccgtaaac gatgtctact cggagtttgg    780
tgtcttgaac actgggctct caagctaacg cattaagtag accgcctggg gagtacggcc    840
gcaaggttaa aactcaaatg aattgacggg ggcccgcaca agcggtggag catgtggttt    900
aattcgatgc aacgcgaaga accttaccta ctcttgacat cctcagaagc cagcggagac    960
gcaggtgtgc cttcgggaac tgagagacag gtgctgcatg gctgtcgtca gctcgtgttg   1020
tgaaatgttg ggttaagtcc cgcaacgagc gcaacccta tccttacttg ccagcgggta    1080
atgccgggaa ctttagggag actgccggtg ataaaccgga ggaaggtggg gacgacgtca   1140
agtcatcatg gcccttacga gtagggctac acacgtgcta caatggtcgg tacagagggt   1200
tgcgaagccg cgaggtggag ctaatctcat aaagccggtc gtagtccgga ttggagtctg   1260
caactcgact ccatgaagtc ggaatcgcta gtaatcgtgg atcagaatgc cacggtgaat   1320
acgttcccgg ccttgtaca caccgcccgt cacaccatgg gagtgggctg caccagaagt   1380
agatagctta accttcggga gggc                                           1404

<210> SEQ ID NO 13
<211> LENGTH: 71
<212> TYPE: DNA
<213> ORGANISM: Shewanella species

<400> SEQUENCE: 13
actttcagcg aggaggaaag gttagtagtt aatacctgct agctgtgacg ttactcgcag      60
aagaagcacc g                                                          71

<210> SEQ ID NO 14
<211> LENGTH: 51
<212> TYPE: DNA
<213> ORGANISM: Shewanella species
```

<400> SEQUENCE: 14

```
catcctcaga agccagcgga gacgcaggtg tgccttcggg aactgagaga c        51
```

<210> SEQ ID NO 15
<211> LENGTH: 931
<212> TYPE: DNA
<213> ORGANISM: Shewanella species

<400> SEQUENCE: 15

```
ggtaatacgg agggtgcgag cgttaatcgg aatactggcg taaagcgtgc gcaggcggtt    60
tgttaagcga gatgtgaaag ccccgggctc aacctgggaa ccgcatttcg aactggcaaa   120
ctagagtctt gtagaggggg gtagaattcc aggtgtagcg gtgaaatgcg tagagatctg   180
gaggaatacc ggtggcgaag gcggcccccct ggacaaagac tgacgctcag gcacgaaagc   240
gtggggagca acaggatta gatacctg tagtccacgc cgtaaacgat gtctactcgg   300
agtttggtgt cttgaacact gggctctcaa gctaacgcat taagtagacc gcctggggag   360
tacggccgca aggttaaaac tcaaatgaat tgacgggggc ccgcacaagc ggtggagcat   420
gtggtttaat tcgatgcaac gcgaagaacc ttacctactc ttgacatcct cagaagccag   480
cggagacgca ggtgtgcctt cgggaactga gagacaggtg ctgcatggct gtcgtcagct   540
cgtgttgtga atgttgggt taagtcccgc aacgagcgca accccctatcc ttacttgcca   600
gcgggtaatg ccgggaactt tagggagact gccggtgata accggagga agtggggac   660
gacgtcaagt catcatggcc cttacgagta gggctacaca cgtgctacaa tggtcggtac   720
agagggttgc gaagccgcga ggtggagcta atctcataaa gccggtcgta gtccggattg   780
gagtctgcaa ctcgactcca tgaagtcgga atcgctagta atcgtggatc agaatgccac   840
ggtgaatacg ttcccgggcc ttgtacacac cgcccgtcac accatgggag tgggctgcac   900
cagaagtaga tagcttaacc ttcgggaggg c                                 931
```

<210> SEQ ID NO 16
<211> LENGTH: 928
<212> TYPE: DNA
<213> ORGANISM: Shewanella species

<400> SEQUENCE: 16

```
ggttattcgg aggtgcgact ttatcgtaat tactgggcga aagcgtgcgc aggcgtttgt    60
ttagcgagat gtgaaagccc cgggctcaac ttgggaaccg catttcgaac tggcaaacta   120
gagtcttgta gaggggggta gaattccagg tgtagcggtg aaatgcgtag agatctggag   180
gaataccggt ggcgaaggcg gccccctgga caaagactga cgctcaggca cgaaagcgtg   240
gggagcaaac aggattagat accctggtag tccacgccgt aaacgatgtc tactcggagt   300
ttggtgtctt gaacactggg ctctcaagct aacgcattaa gtagaccgcc tggggagtac   360
ggccgcaagg ttaaaactca aatgaattga cggggcccg cacaagcggt ggagcatgtg   420
gtttaattcg atgcaacgcg aagaacctta cctactcttg acatcctcag aagccagcgg   480
agacgcaggt gtgccttcgg gaactgagag acaggtgctg catggctgtc gtcagctcgt   540
gttgtgaaat gttgggttaa gtcccgcaac gagcgcaacc cctatcctta cttgccagcg   600
ggtaatgccg gaactttag ggagactgcc ggtgataaac cggaggaagg tggggacgac   660
gtcaagtcat catggcccctt acgagtaggg ctacacacgt gctacaatgg tcggtacaga   720
gggttgcgaa gccgcgaggt ggagctaatc tcataaagcc ggtcgtagtc cggattggag   780
tctgcaactc gactccatga agtcggaatc gctagtaatc gtggatcaga atgccacggt   840
```

```
gaatacgttc ccgggccttg tacacaccgc ccgtcacacc atgggagtgg gctgcaccag    900
aagtagatag cttaaccttc gggagggc                                       928
```

<210> SEQ ID NO 17
<211> LENGTH: 929
<212> TYPE: DNA
<213> ORGANISM: Shewanella species

<400> SEQUENCE: 17

```
ggtaatcgga gggtgcgagc gttaatcgga attacgggcg taaagcgtgc gcaggcggtt     60
tgttaagcga gatgtgaaag ccccgggctc aaccgggaac cgcattcgaa ctggcaaact    120
agagtcttgt agaggggggt agaattccag gtgtagcggt gaaatgcgta gagatctgga    180
ggaataccgg tggcgaaggc ggcccctgg acaaagactg acgctcaggc acgaaagcgt     240
ggggagcaaa caggattaga taccctggta gtccacgccg taaacgatgt ctactcggag    300
tttggtgtct tgaacactgg gctctcaagc taacgcatta agtagaccgc ctggggagta    360
cggccgcaag gttaaaactc aaatgaattg acggggggccc gcacaagcgg tggagcatgt    420
ggtttaattc gatgcaacgc gaagaacctt acctactctt gacatcctca gaagccagcg    480
gagacgcagg tgtgccttcg ggaactgaga gacaggtgct gcatggctgt cgtcagctcg    540
tgttgtgaaa tgttgggtta agtcccgcaa cgagcgcaac ccctatcctt acttgccagc    600
gggtaatgcc gggaacttta gggagactgc cggtgataaa ccggaggaag gtggggacga    660
cgtcaagtca tcatggccct tacgagtagg gctacacacg tgctacaatg gtcggtacag    720
agggttgcga agccgcgagg tggagctaat ctcataaagc cggtcgtagt ccggattgga    780
gtctgcaact cgactccatg aagtcggaat cgctagtaat cgtggatcag aatgccacgg    840
tgaatacgtt cccgggcctt gtacacaccg cccgtcacac catgggagtg gctgcacca     900 gaagtagata gcttaacctt cgggagggc                                      929
```

<210> SEQ ID NO 18
<211> LENGTH: 34
<212> TYPE: DNA
<213> ORGANISM: Shewanella oneidensis

<400> SEQUENCE: 18

```
gcatacgccc tacgggggaa agaggggggac tttc                                34
```

<210> SEQ ID NO 19
<211> LENGTH: 34
<212> TYPE: DNA
<213> ORGANISM: artificial sequence
<220> FEATURE:
<223> OTHER INFORMATION: Shewanella 16S rDNA degenerate signature
       sequence with variable positions in region 2
<220> FEATURE:
<221> NAME/KEY: misc_feature
<222> LOCATION: (22)..(24)
<223> OTHER INFORMATION: n=a or g
<220> FEATURE:
<221> NAME/KEY: misc_feature
<222> LOCATION: (29)..(29)
<223> OTHER INFORMATION: n=a or c
<220> FEATURE:
<221> NAME/KEY: misc_feature
<222> LOCATION: (30)..(30)
<223> OTHER INFORMATION: n=a,,c, g, or t
<220> FEATURE:
<221> NAME/KEY: misc_feature
<222> LOCATION: (30)..(30)
<223> OTHER INFORMATION: n=a, c, g, or t
<220> FEATURE:

```
<221> NAME/KEY: misc_feature
<222> LOCATION: (31)..(32)
<223> OTHER INFORMATION: n=t or c
<220> FEATURE:
<221> NAME/KEY: misc_feature
<222> LOCATION: (34)..(34)
<223> OTHER INFORMATION: n=a or c

<400> SEQUENCE: 19
gcatacgccc tacgggggaa annnggggnn nntn                          34

<210> SEQ ID NO 20
<211> LENGTH: 41
<212> TYPE: DNA
<213> ORGANISM: Shewanella oneidensis

<400> SEQUENCE: 20
tcggagtttg gtgtcttgaa cactgggctc tcaagctaac g                  41

<210> SEQ ID NO 21
<211> LENGTH: 41
<212> TYPE: DNA
<213> ORGANISM: artificial sequence
<220> FEATURE:
<223> OTHER INFORMATION: Shewanella 16S rDNA degenerate signature
      sequence with variable positions in region 5
<220> FEATURE:
<221> NAME/KEY: misc_feature
<222> LOCATION: (6)..(6)
<223> OTHER INFORMATION: n=a or g
<220> FEATURE:
<221> NAME/KEY: misc_feature
<222> LOCATION: (13)..(13)
<223> OTHER INFORMATION: n=a , c or g
<220> FEATURE:
<221> NAME/KEY: misc_feature
<222> LOCATION: (14)..(14)
<223> OTHER INFORMATION: n=a , c or t
<220> FEATURE:
<221> NAME/KEY: misc_feature
<222> LOCATION: (18)..(19)
<223> OTHER INFORMATION: n=a or g
<220> FEATURE:
<221> NAME/KEY: misc_feature
<222> LOCATION: (27)..(27)
<223> OTHER INFORMATION: n=g or t
<220> FEATURE:
<221> NAME/KEY: misc_feature
<222> LOCATION: (28)..(28)
<223> OTHER INFORMATION: n=t or c
<220> FEATURE:
<221> NAME/KEY: misc_feature
<222> LOCATION: (30)..(31)
<223> OTHER INFORMATION: n=t or c
<220> FEATURE:
<221> NAME/KEY: misc_feature
<222> LOCATION: (32)..(32)
<223> OTHER INFORMATION: n=a or c

<400> SEQUENCE: 21
tcggantttg gtnncttnna cactggnntn nnaagctaac g                  41

<210> SEQ ID NO 22
<211> LENGTH: 96
<212> TYPE: DNA
<213> ORGANISM: Shewanella oneidensis

<400> SEQUENCE: 22
acaatggcga gtacagaggg ttgcaaagcc gcgaggtgga gctaatctca caaagctcgt  60
cgtagtccgg attggagtct gcaactcgac tccatg                           96
```

```
<210> SEQ ID NO 23
<211> LENGTH: 96
<212> TYPE: DNA
<213> ORGANISM: artificial sequence
<220> FEATURE:
<223> OTHER INFORMATION: Shewanella 16S rDNA degenerate signature
      sequence with variable positions in region 8
<220> FEATURE:
<221> NAME/KEY: misc_feature
<222> LOCATION: (8)..(8)
<223> OTHER INFORMATION: n=c, g, or t
<220> FEATURE:
<221> NAME/KEY: misc_feature
<222> LOCATION: (9)..(9)
<223> OTHER INFORMATION: n=a, c, or g
<220> FEATURE:
<221> NAME/KEY: misc_feature
<222> LOCATION: (10)..(11)
<223> OTHER INFORMATION: n=a, g, or t
<220> FEATURE:
<221> NAME/KEY: misc_feature
<222> LOCATION: (25)..(25)
<223> OTHER INFORMATION: n=a or g
<220> FEATURE:
<221> NAME/KEY: misc_feature
<222> LOCATION: (33)..(33)
<223> OTHER INFORMATION: n=a or g
<220> FEATURE:
<221> NAME/KEY: misc_feature
<222> LOCATION: (38)..(38)
<223> OTHER INFORMATION: n=g or c
<220> FEATURE:
<221> NAME/KEY: misc_feature
<222> LOCATION: (39)..(39)
<223> OTHER INFORMATION: n=a, g, or t
<220> FEATURE:
<221> NAME/KEY: misc_feature
<222> LOCATION: (48)..(48)
<223> OTHER INFORMATION: n=t or c
<220> FEATURE:
<221> NAME/KEY: misc_feature
<222> LOCATION: (51)..(51)
<223> OTHER INFORMATION: n=c, g, or t
<220> FEATURE:
<221> NAME/KEY: misc_feature
<222> LOCATION: (56)..(56)
<223> OTHER INFORMATION: n=c, g, or t
<220> FEATURE:
<221> NAME/KEY: misc_feature
<222> LOCATION: (57)..(57)
<223> OTHER INFORMATION: n=a, c, or t
<220> FEATURE:
<221> NAME/KEY: misc_feature
<222> LOCATION: (58)..(58)
<223> OTHER INFORMATION: n=c, g, or t
<220> FEATURE:
<221> NAME/KEY: misc_feature
<222> LOCATION: (73)..(73)
<223> OTHER INFORMATION: n=t or c
<220> FEATURE:
<221> NAME/KEY: misc_feature
<222> LOCATION: (94)..(94)
<223> OTHER INFORMATION: n=a or g

<400> SEQUENCE: 23
acaatggnnn ntacagaggg ttgcnaagcc gcnaggtnna gctaatcnca naaagnnngt      60
cgtagtccgg atnggagtct gcaactcgac tccntg                              96
```

ALTERING THE INTERFACE OF HYDROCARBON-COATED SURFACES

This applications claims the benefit of U.S. Provisional Applications 61/180,529, filed May 22, 2009 and 61/180,445, filed May 22, 2009.

FIELD OF INVENTION

This invention relates to the field of environmental microbiology and modification of heavy crude oil properties using microorganisms. More specifically, microorganisms are used to alter the interface between hydrocarbons and a surface to increase oil recovery, from hydrocarbon coated surfaces.

BACKGROUND OF THE INVENTION

Hydrocarbons in the form of petroleum deposits and oil reservoirs are distributed worldwide. These oil reservoirs are measured in the hundreds of billions of recoverable barrels. Because heavy crude oil has a relatively high viscosity and may adhere to surfaces, it is essentially immobile and cannot be easily recovered by conventional primary and secondary means.

Microbial Enhanced Oil Recovery (MEOR) is a methodology for increasing oil recovery by the action of microorganisms (Brown, L. R., Vadie, A. A, Stephen, O. J. SPE 59306, SPE/DOE Improved Oil Recovery Symposium, Oklahoma, Apr. 3-5, 2000). MEOR research and development is an ongoing effort directed at discovering techniques to use microorganisms to benefit oil recovery (Sunde. E., Beeder, J., Nilsen, R. K. Torsvik, T., SPE 24204, SPE/DOE 8th Symposium on enhanced Oil Recovery, Tulsa, Okla., USA, Apr. 22-24, 1992). An effective MEOR treatment for crude oil desorption and mobilization could utilize microbially derived surface active agents (McInerney, M. J., et al., Development of microorganisms with improved transport and biosurfactant activity for enhanced oil recovery. DE-FE-02NT15321. DOE, 2003). Few have been indentified that have been shown to alter the surface interaction between hydrocarbons and rocks, soil, brine, sand or clay to which the hydrocarbons are adhered.

Use of surface active agents or surfactants to increase solubility of oil through reduction in surface and interfacial tensions is another technique for increasing oil recovery. A wide variety of surfactants identified thus far are able to significantly reduce surface and interfacial tensions at the oil/water and air/water interfaces. Because surfactants partition at oil/water interfaces, they are capable of increasing the solubility and bioavailability of hydrocarbons (Desai, J. D. and I. M. Banat. Microbial production of surfactants and their commercial potential. Microbiol. Mol. Biol. Rev., 47-64, 1997 and Banat, I. M. Bioresource Technol. 51: 1-12, 1995 and Kukukina, M. S., et al. Environment International. 31: 155-161, 2005 and Mulligan, C., Environmental Pollution. 133: 183-198, 2005). Doong and Lei (J. Hazardous Materials. B96: 15-27, 2003), for example, found that the addition of surfactants to soil environments contaminated with polyaromatic hydrocarbons increased the mineralization rate of some hydrocarbons (Doong, R and W. Lei, supra). Such surfactants are expensive and may pose environmental or other equipment issues.

Biosurfactants, (biologically produced surfactants), have helped to substantially increase oil recovery from sandstone deposits by increasing solubility and decreasing viscosity of the oil (Mulligan, C., supra). Depending on the application, biosurfactants may be preferred since they are generally more biodegradable and less toxic than synthetically produced surfactants, and are effective under a broad range of oil and reservoir conditions. Examples of biosurfactants include glycolipids, lipopeptides and lipoproteins, fatty acids and phospholipids, polymeric compounds, and particulate biosurfactants (Desai, J. D. supra). However, further characterization of production and use of biosurfactants is needed. Further, there is a need to identify micrororganisms that are able to produce these biosurfactants under reservoir conditions or other relevant environmental conditions.

Certain microorganisms have been described as having properties that may benefit MEOR processes. Certain *Shewanella* species have been disclosed as useful for remediation of metal contamination (U.S. Pat. No. 6,923,914B2), iron containing mixed waste (U.S. Pat. No. 6,719,902B1), manganese contamination (U.S. Pat. No. 6,350,605B1), and other pollutants with the aide of butane (U.S. Pat. No. 6,245,235B1). In EP1189843, certain *Shewanella* species were described as being useful for bioremediation of petroleum contaminants aerobically. In addition, *Shewanella* supplemented with butane was used for reduction of fouling in injection and recovery wells under aerobic conditions (U.S. Pat. No. 6,244,346B1). Other *Shewanella* species have been described as having the ability to produce biofilms (D. Bagge, et al., Appl. Environ. Microbiol. 67, 2319-2325. 2001); to sequester gases, in particular $CO_2$, in underground geological formations and prevent their release into the atmosphere (see US20060216811A1); and to enhance oil recovery (commonly owned and co-pending US 2009-0260803 A1). The activity reported by these microorganisms is related to the degradation and transformation of hydrocarbons and other pollutants and not related to altering the interfacial boundaries between hydrocarbons and the surfaces to which they are bound.

The problem to be solved therefore, relates to the identification of microorganisms that: 1) have the ability to alter the interface between hydrocarbons and rock or other surfaces subject to coating by oil; 2) can be inoculated under suitable conditions which effect these alterations in surface properties; and 3) can be used in a cost-efficient way, to improve oil recovery, and benefit bioremediation.

SUMMARY OF THE INVENTION

The methods described herein solve the stated problem above, by identifying microorganisms that have the ability to alter the interface between hydrocarbons and the surfaces which they coat in order to improve oil recovery, and benefit bioremediation. The alterations result in substantial liberation of oil from hydrocarbon-coated surfaces. In one aspect the microorganisms are *Shewanella*, species that have the ability to affect the wettability of the surfaces through microbial action. In addition, a new isolate of *Shewanella* sp. has been identified.

Accordingly invention provides a method for altering the wettability of a hydrocarbon coated surface comprising:
a) providing a hydrocarbon-coated surface;
b) providing a medium selected from the group consisting of:
  i) a cell containing medium comprising one or more *Shewanella* sp.; and
  ii) a conditioned medium which is substantially cell free and which has been in contact with one or more *Shewanella* sp.;
c) contacting said hydrocarbon-coated surface with the medium of b)
wherein the medium alters the wettability of said hydrocarbon-coated surface.

In another aspect of the invention the invention provides a method for oil recovery from an oil reservoir comprising:
a) providing one or more *Shewanella* sp;
b) injecting an oil reservoir with the one or more *Shewanella* sp of (a); and
c) injecting said oil reservoir with a nutrient solution comprising one or more electron acceptors selected from the group consisting of nitrate, fumarate, ferric ion, manganese (MnIV) ion and mixtures thereof;
wherein said one or more *Shewanella* sp. grow under anaerobic conditions in the oil reservoir and said growth promotes improved oil recovery.

In another aspect of the invention the invention provides a composition for enhanced oil recovery comprising:
a) a *Shewanella* sp having a 16S rDNA that has at least 95% identity to the 16S rDNA sequence as set forth in any of SEQ ID NO.'s 3, 5, 15, 16 and 17; and
b) an electron acceptor selected from the group consisting of nitrate, fumarate, ferric ion, manganese (MnIV) ion and mixtures thereof.

Figure 16:
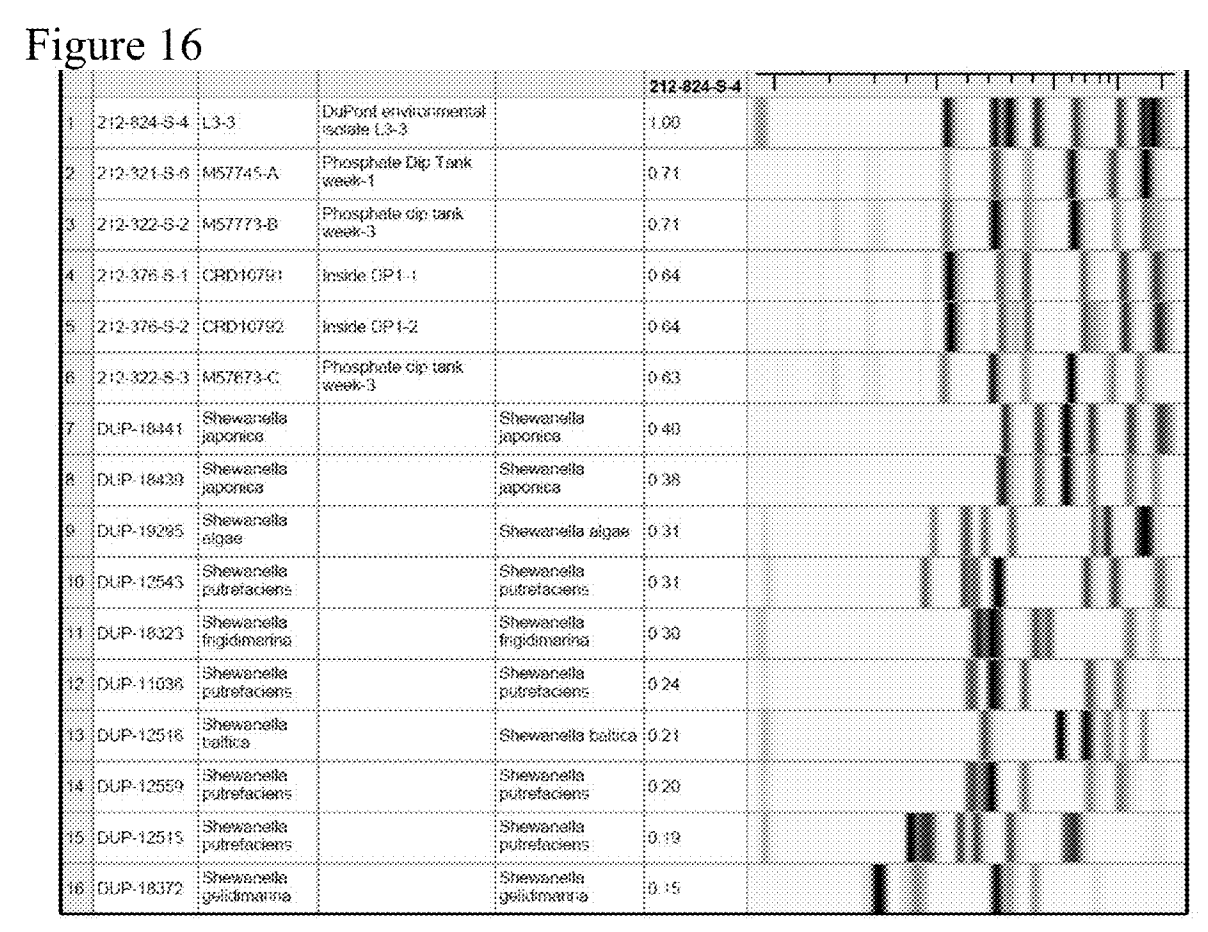

In another aspect of the invention the invention provides a *Shewanella* sp. having the following characteristics:
a) a 16S rDNA comprising signature sequences SEQ ID NOs: 13 and 14; and
b) riboprint pattern identifier of 212-824-S-4 as illustrated in FIG. 16;
wherein 16S rDNA of (a) has at least about 97% identity to the 16S rDNA sequence as set forth in SEQ ID NO:3.

BRIEF DESCRIPTION OF FIGURES AND SEQUENCES OF THE INVENTION

The invention can be more fully understood from the following detailed description, the Figures, and the accompanying sequence descriptions, which form a part of this application.

FIG. 1. Depicts oil release over time with early and late stage growth of strain LH4:18.

Figure 2:
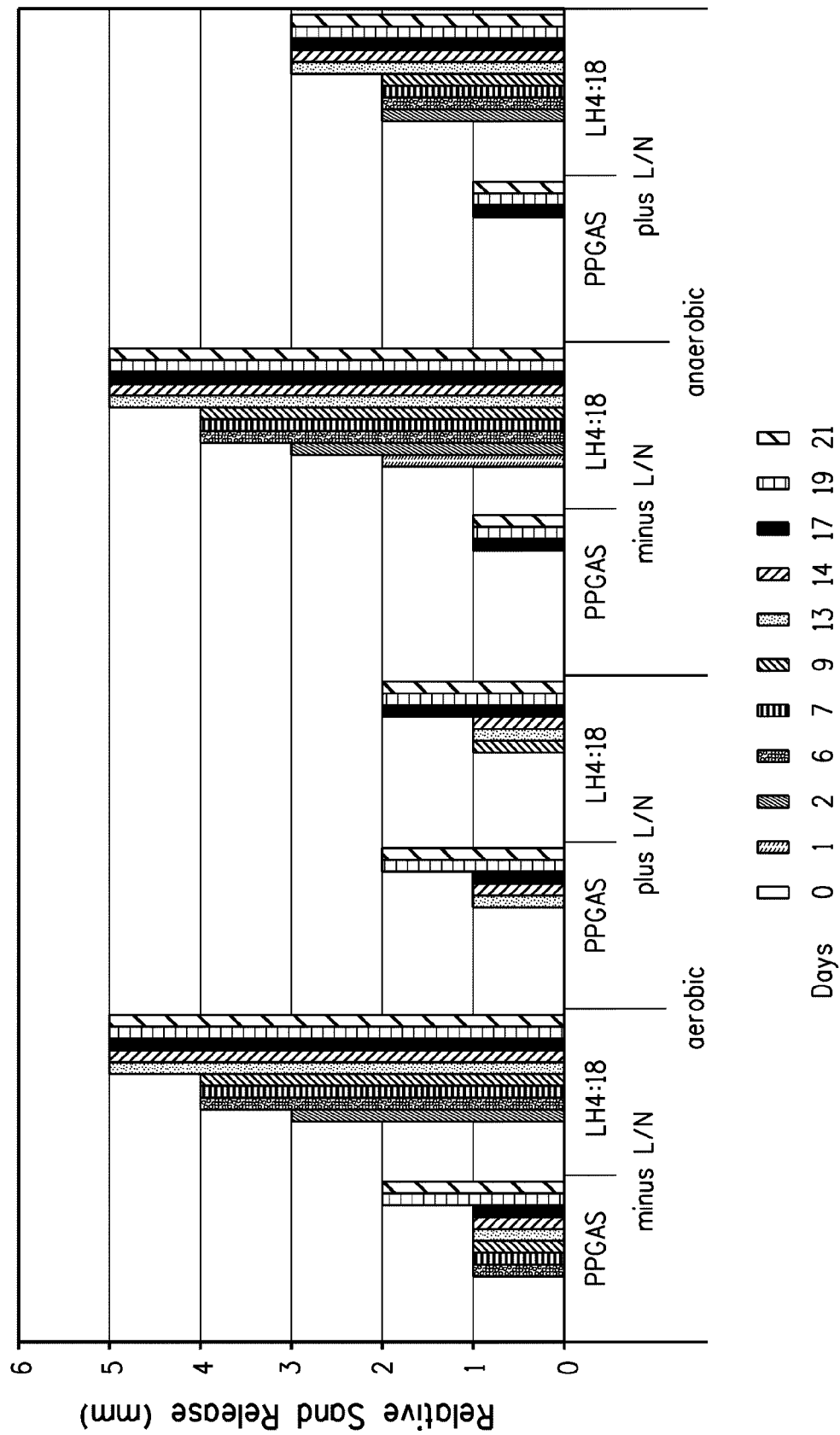

FIG. 2. Depicts oil release over time comparing aerobic growth versus anaerobic growth.

Figure 3:
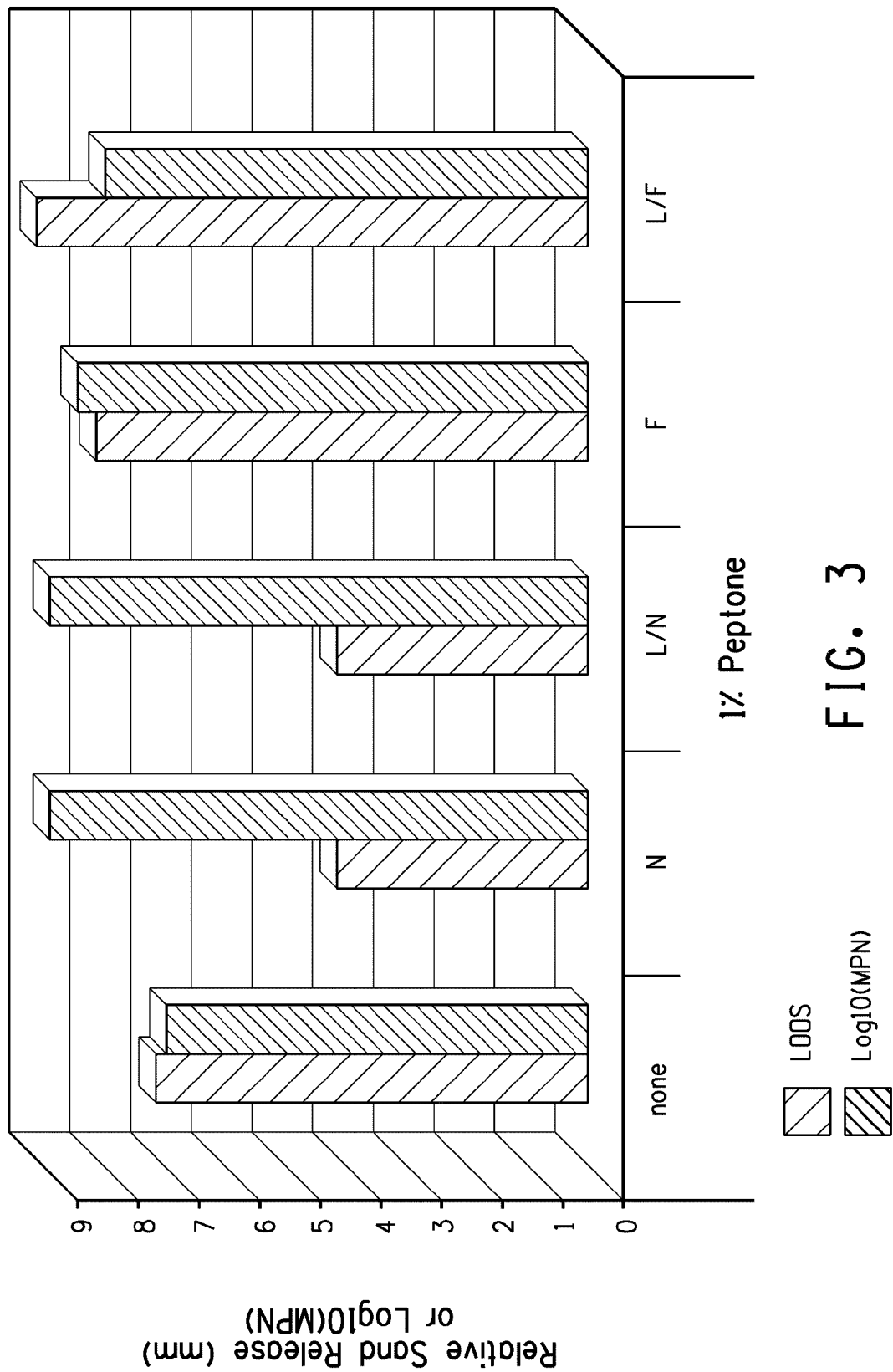

FIG. 3. Depicts oil release and MPNs of strain LH4:18 in the presence of different electron acceptors.

Figure 4:
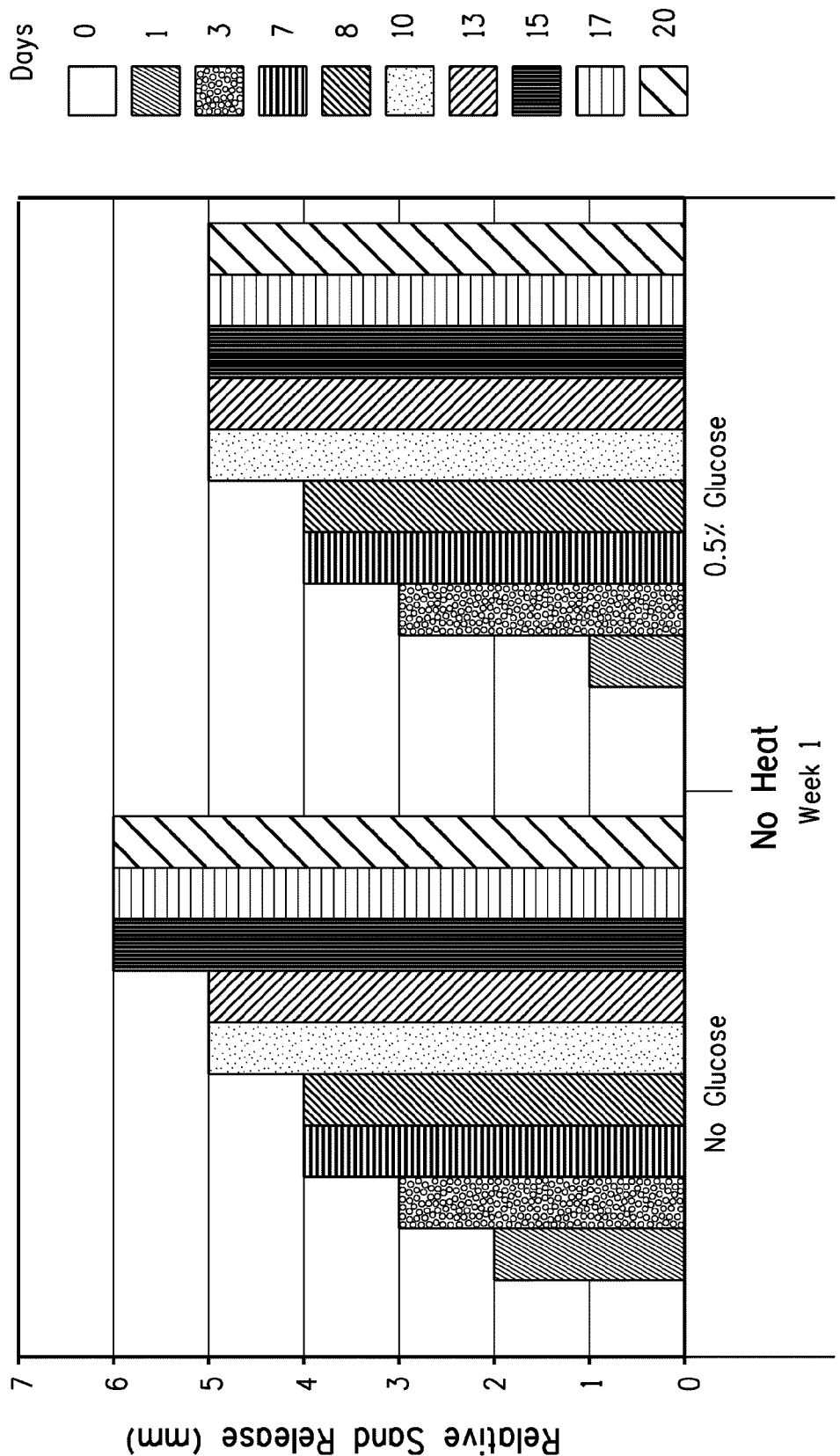

FIG. 4. Depicts oil release over time with strain LH4:18 grown in the presence or absence of glucose.

Figure 5:
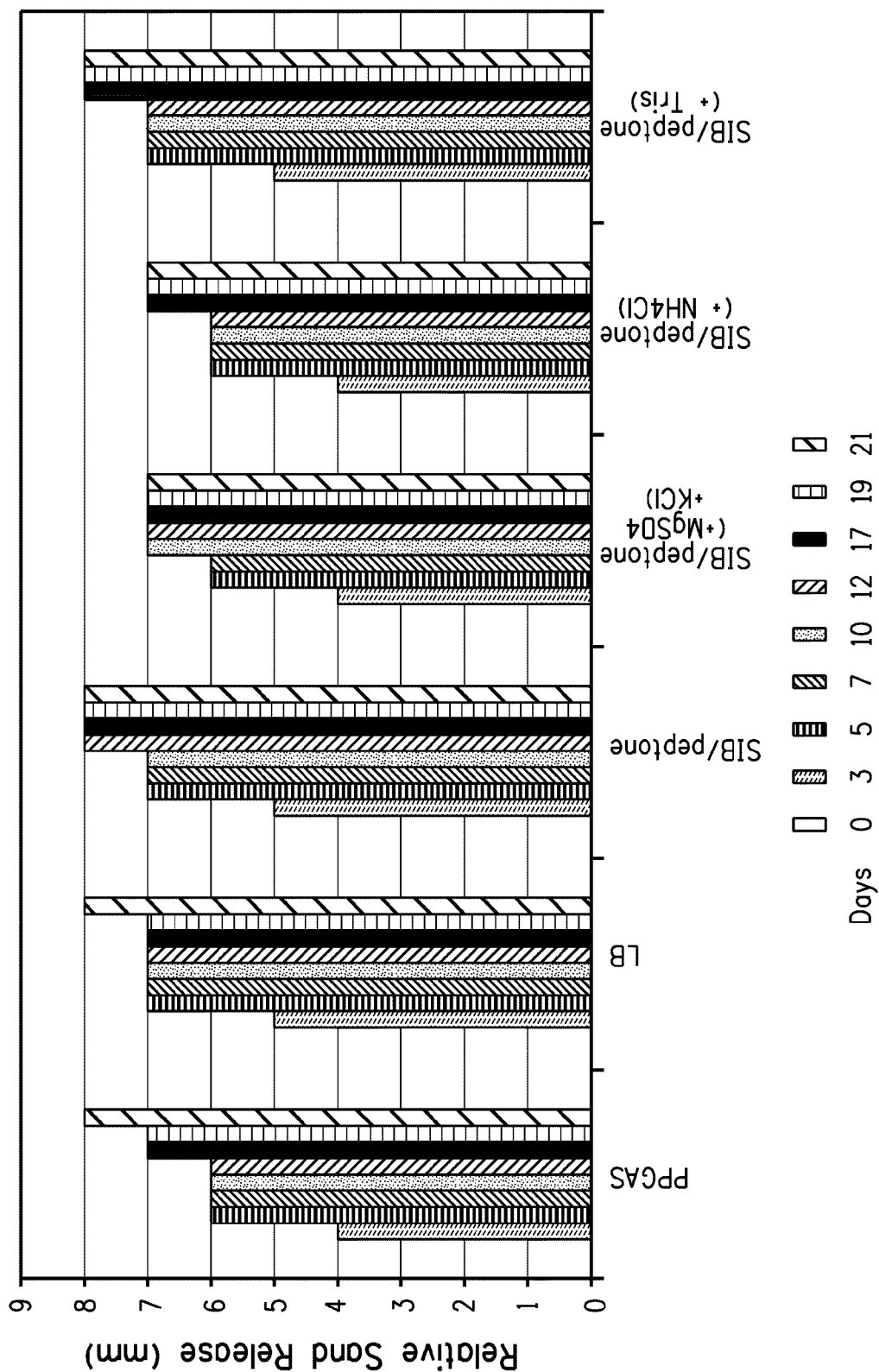

FIG. 5. Depicts oil release over time with strain LH4:18 grown in the presence of different media and supplements. Where indicated, supplements were 1% peptone, 1.6 mM $MgSO_4$, 20 mM KCl, 20 mM $NH_4Cl$, and 20 mM tris base.

Figure 6:
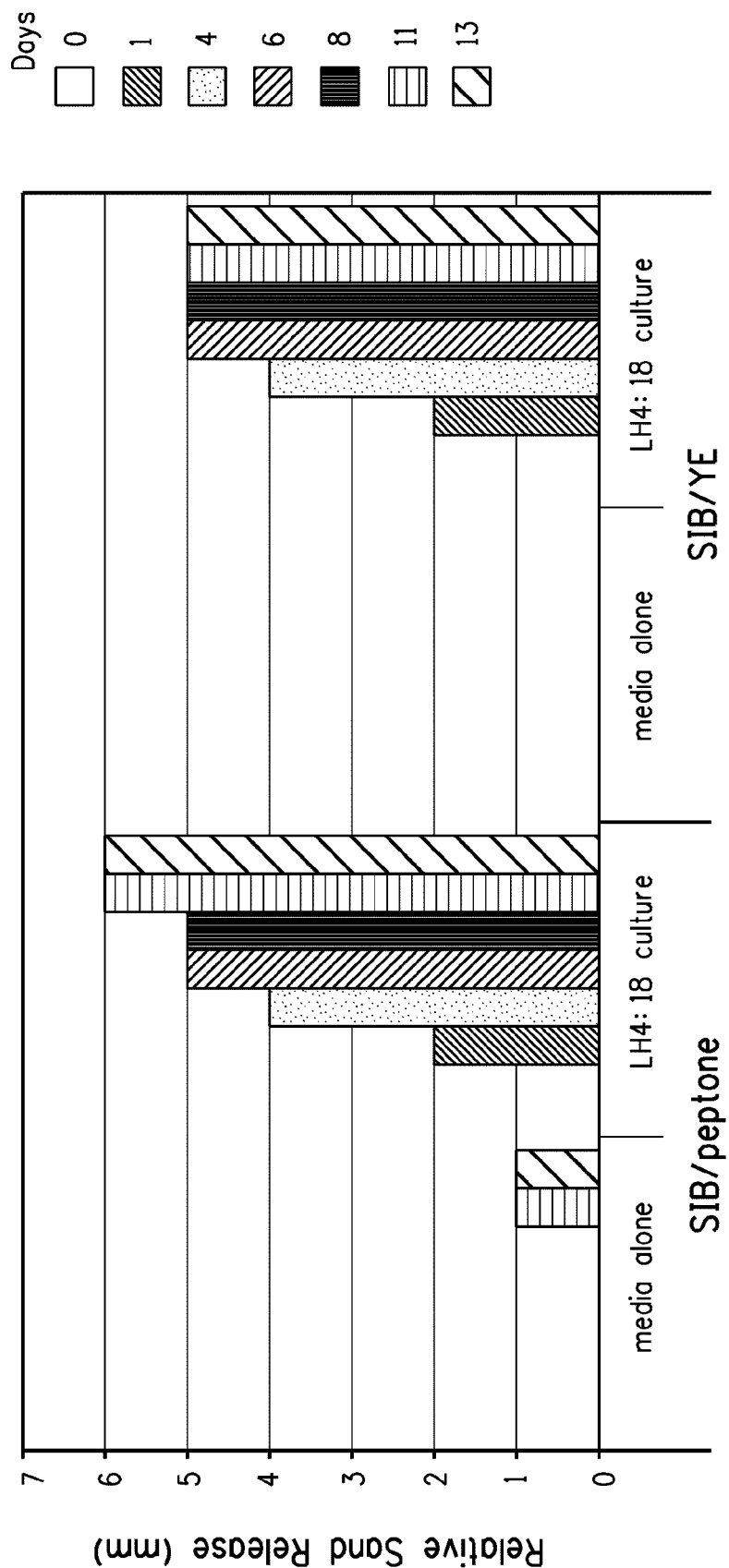

FIG. 6. Depicts oil release over time with strain LH4:18 grown in simulated injection brine supplemented with peptone or yeast extract.

Figure 7:
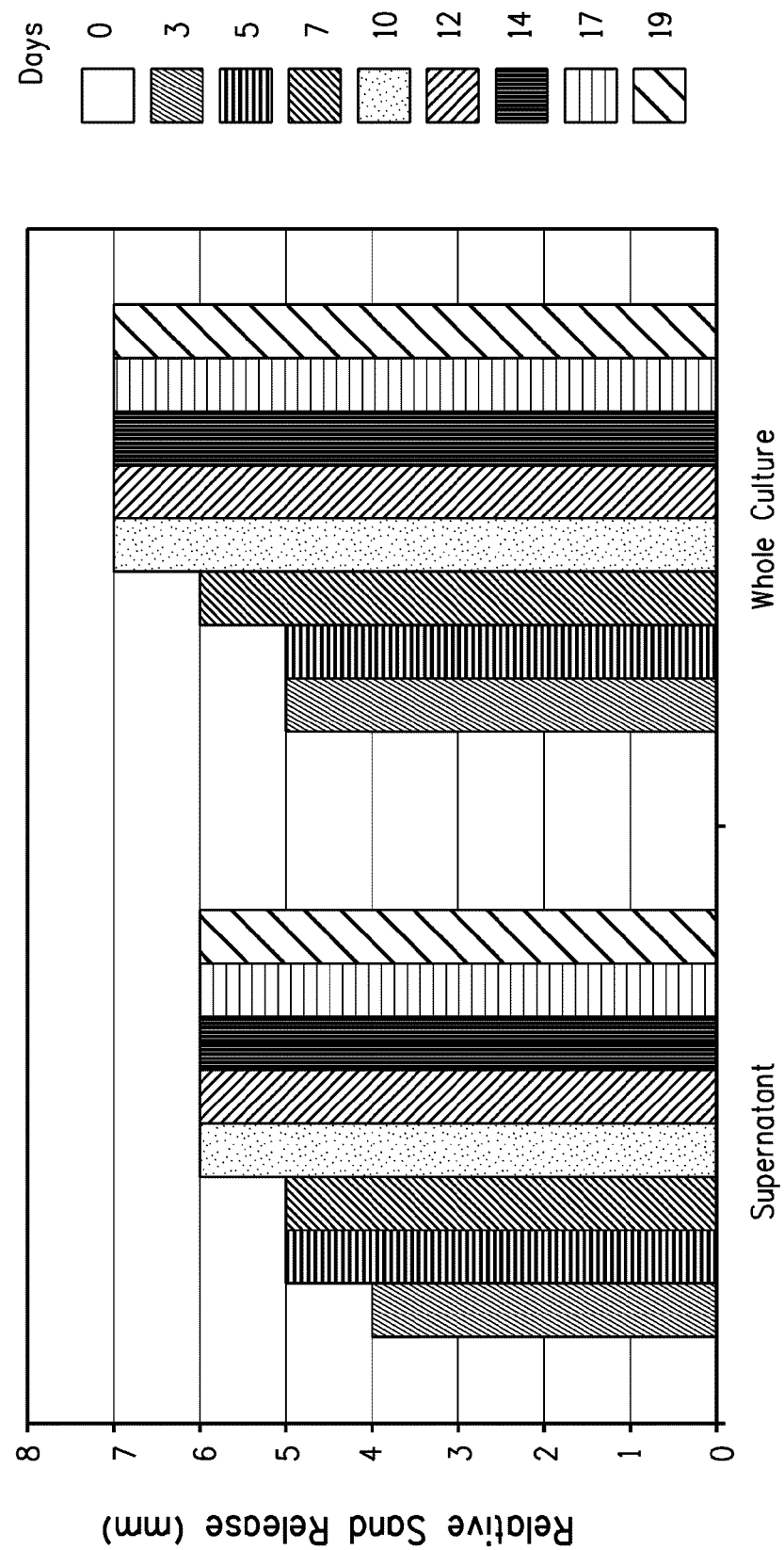

FIG. 7. Depicts oil release over time with strain LH4:18 culture and supernatant alone.

Figure 8:
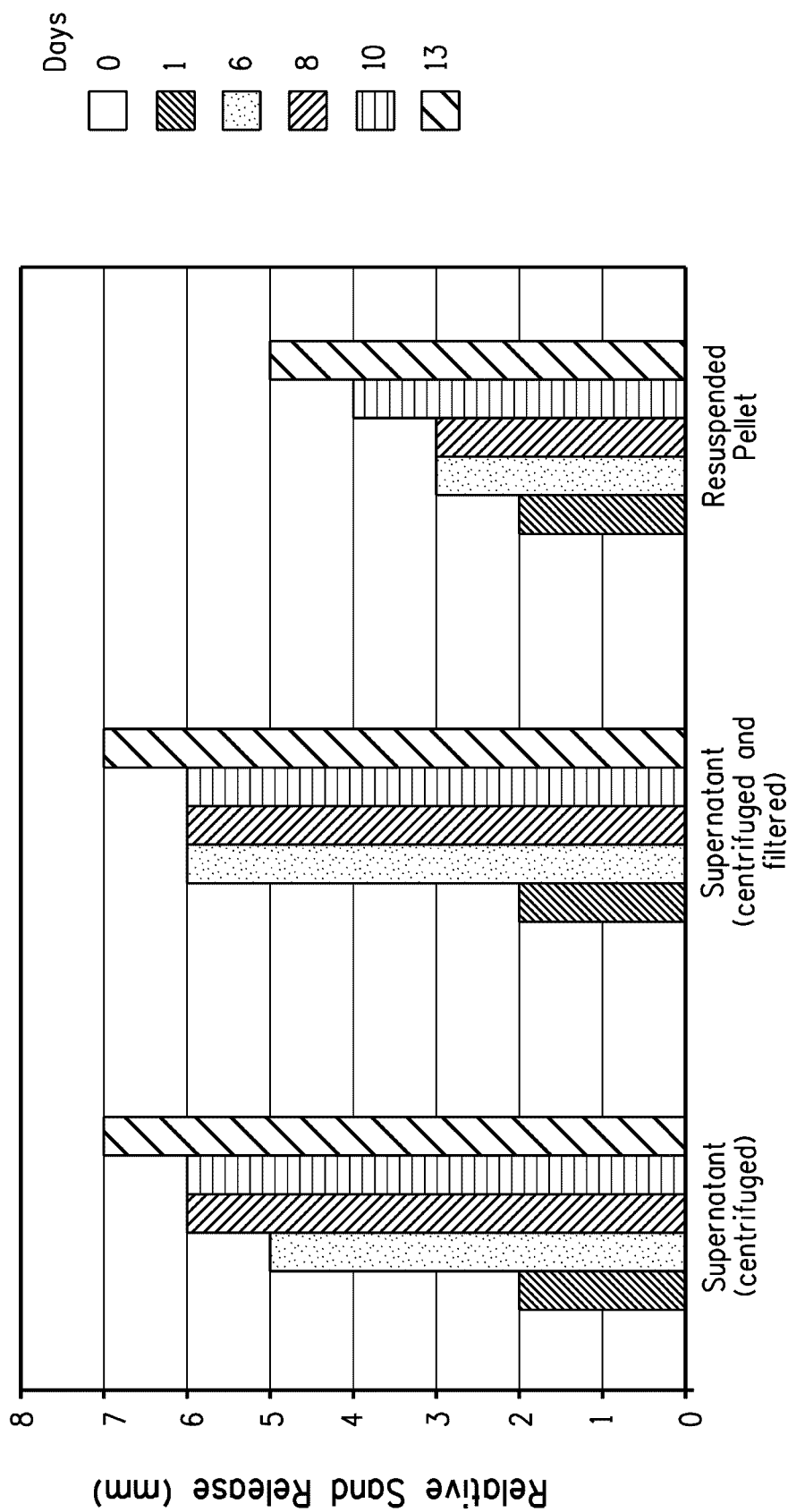

FIG. 8. Depicts oil release over time with strain LH4:18 supernatant (centrifuged compared with centrifuged and filtered) and strain LH4:18 cell pellet resuspended in fresh medium.

Figure 9:
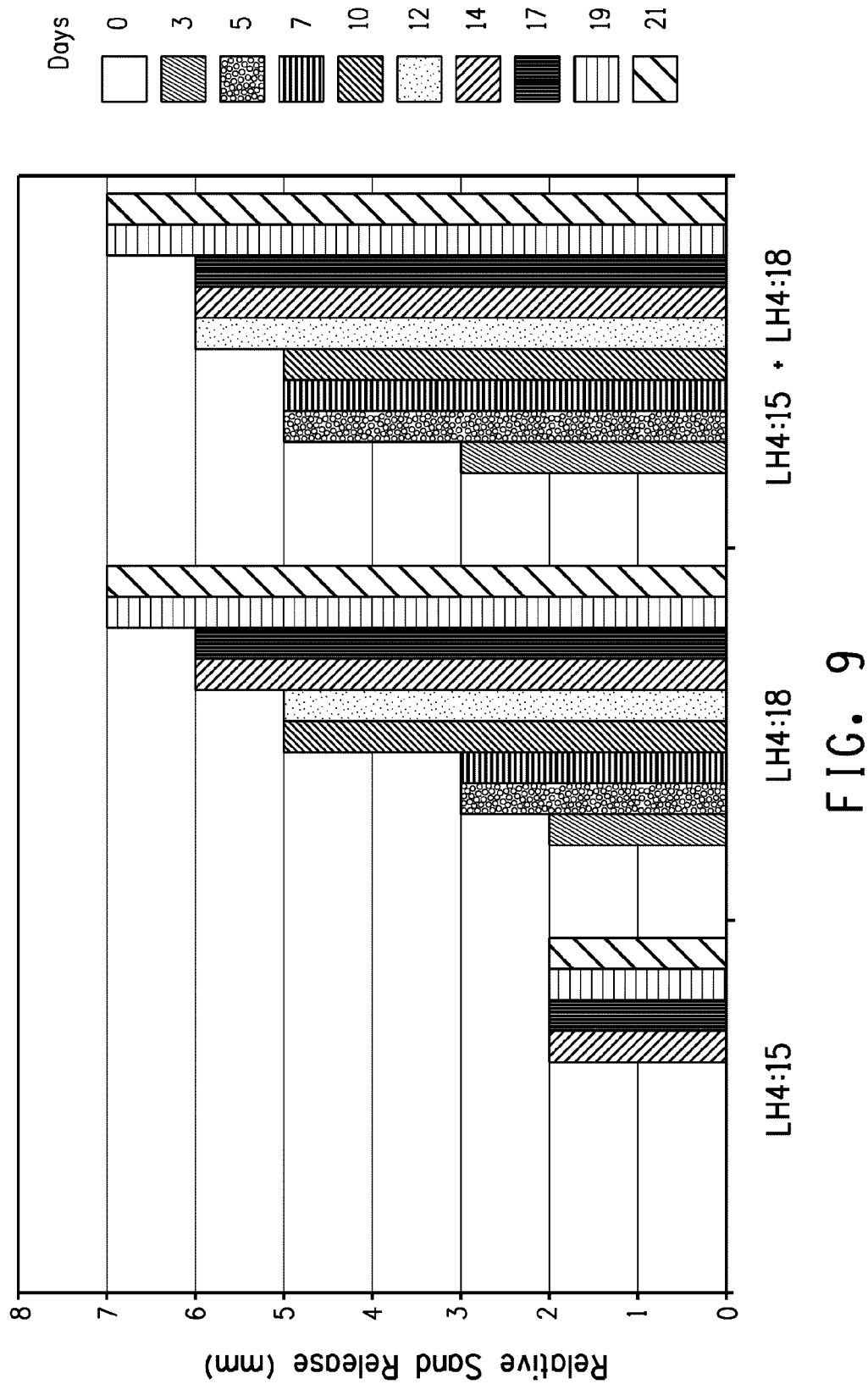

FIG. 9. Depicts oil release over time with strain LH4:18 in the presence and absence of *Pseudomonas stutzeri*, species LH4:15.

Figure 10:
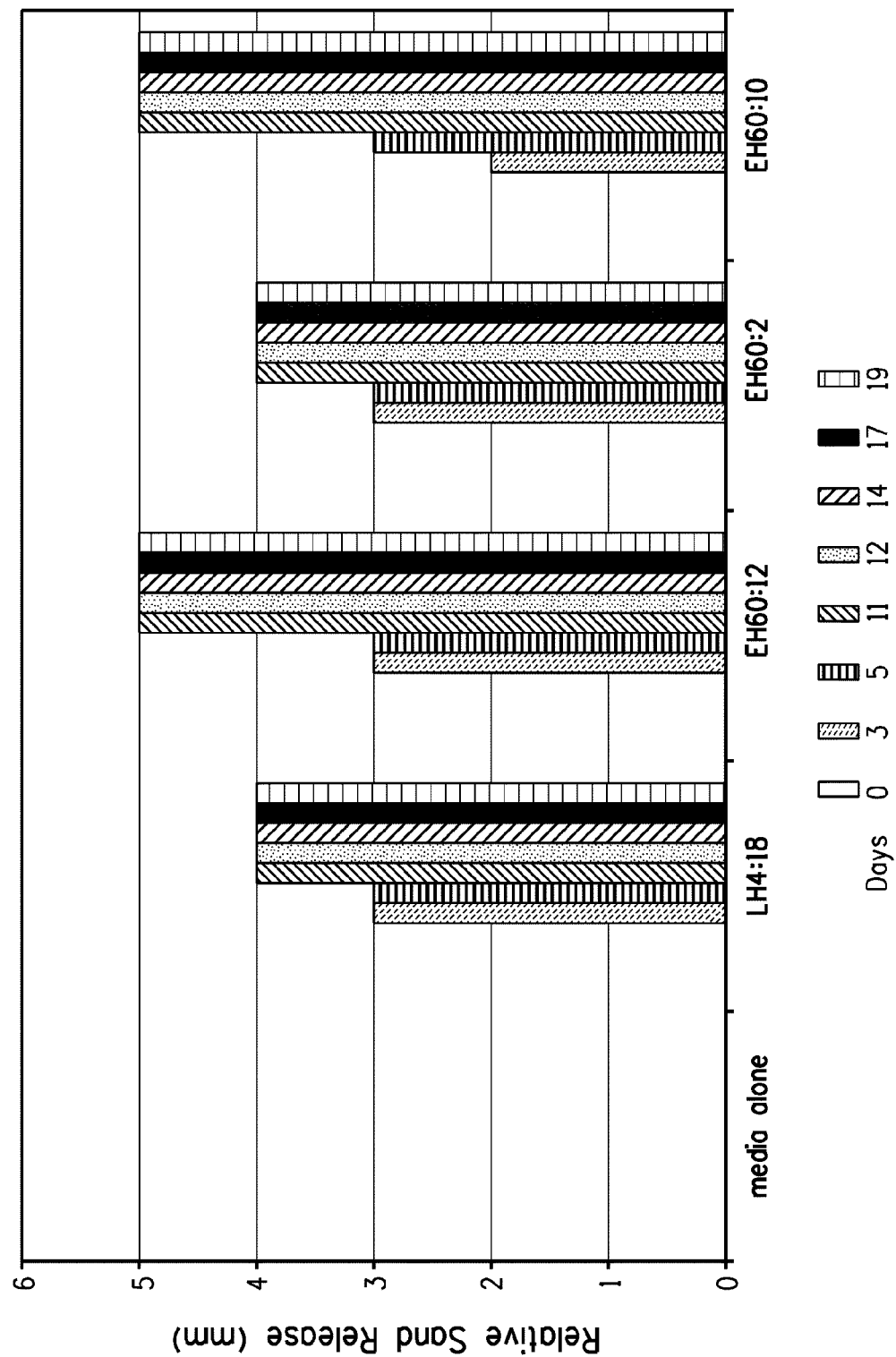

FIG. 10. Depicts oil release over time with LH4:18 and other *Shewanella* species (strains EH60:12, EH60:2, and EH60:10).

Figure 11:
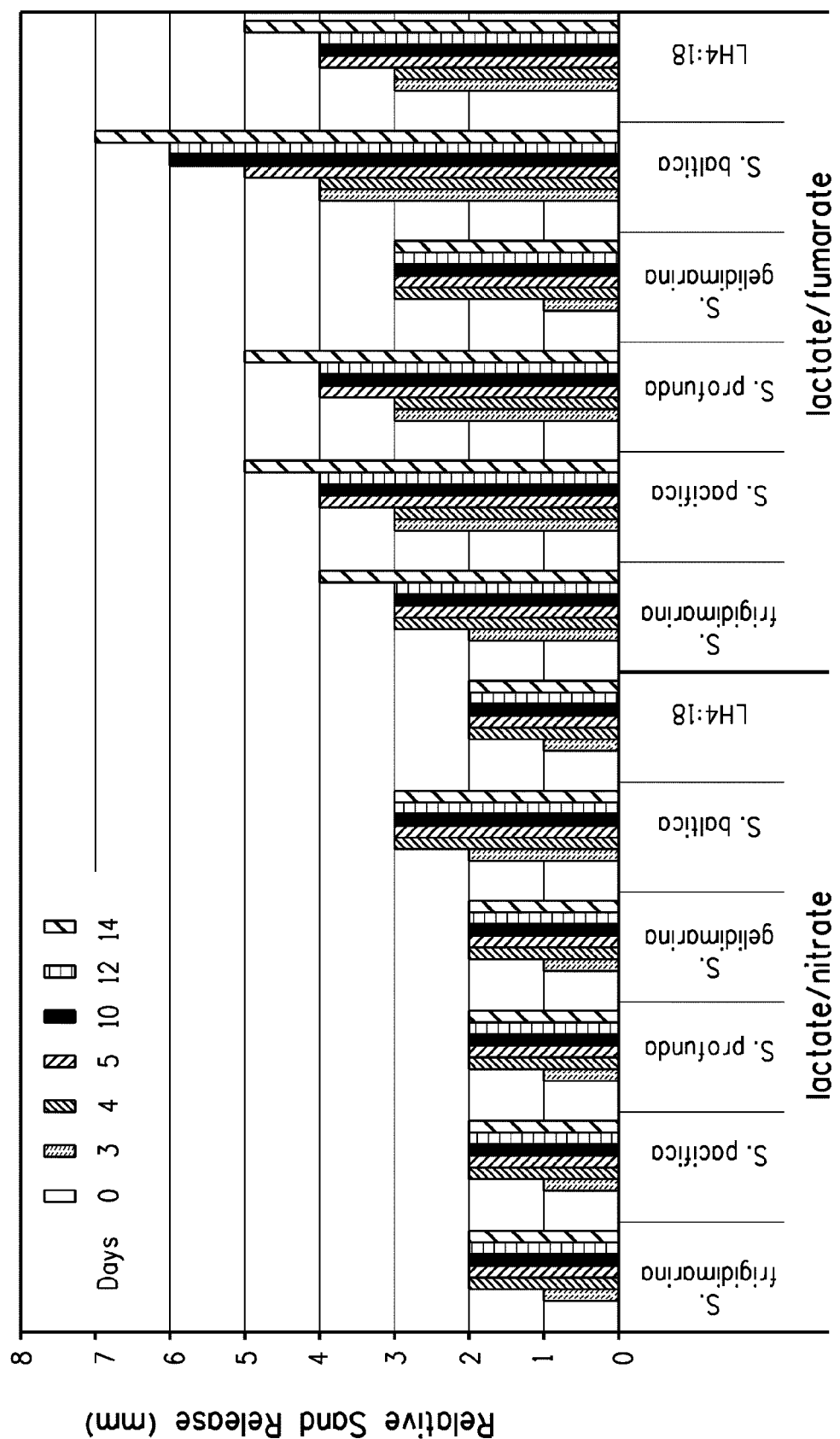

FIG. 11. Depicts oil release over time with LH4:18 and other *Shewanella* species purchased through DSMZ (Deutsche Sammlung von Mikrorganismen und Zellkulturen, German Collection of Microorganisms and Cell Cultures).

FIG. 12. Pictograph of contact angle comparisons between untreated oil coated sand (left) and strain LH4:18 treated oil coated sand (right).

Figure 13:
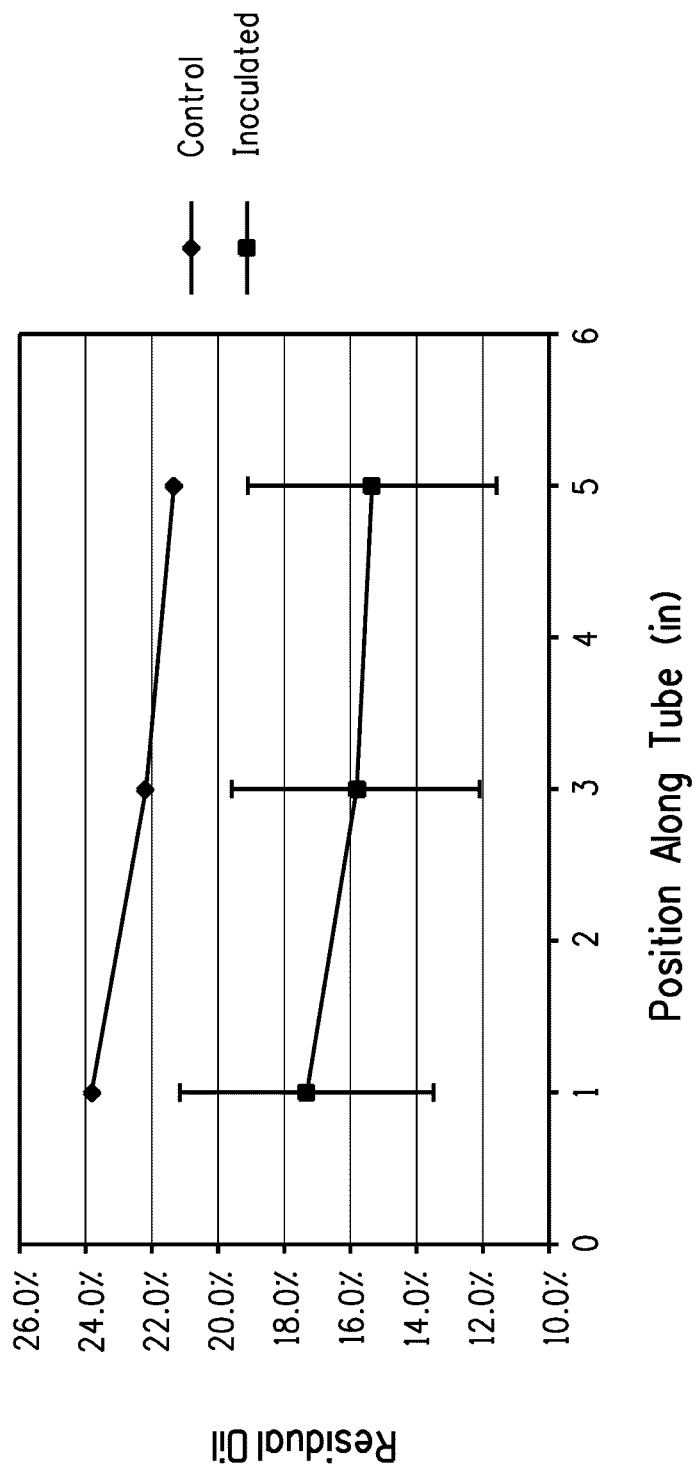

FIG. 13. Depicts residual oil versus position along sand-pack tubes comparing strain LH4:18 treated and untreated sandpacks.

FIG. 14. *Shewanella* species alignment for signature sequence region 3.

FIG. 15. *Shewanella* species alignment for signature sequence region 6.

FIG. 16. Riboprint batch report, 052009, used for comparisons of *Shewanella* sp. L3:3 riboprint #212-824-S-4 to other *Shewanella* riboprints in the Qualicon and DuPont Environmental Sciences Riboprint Databases.

Figure 17:
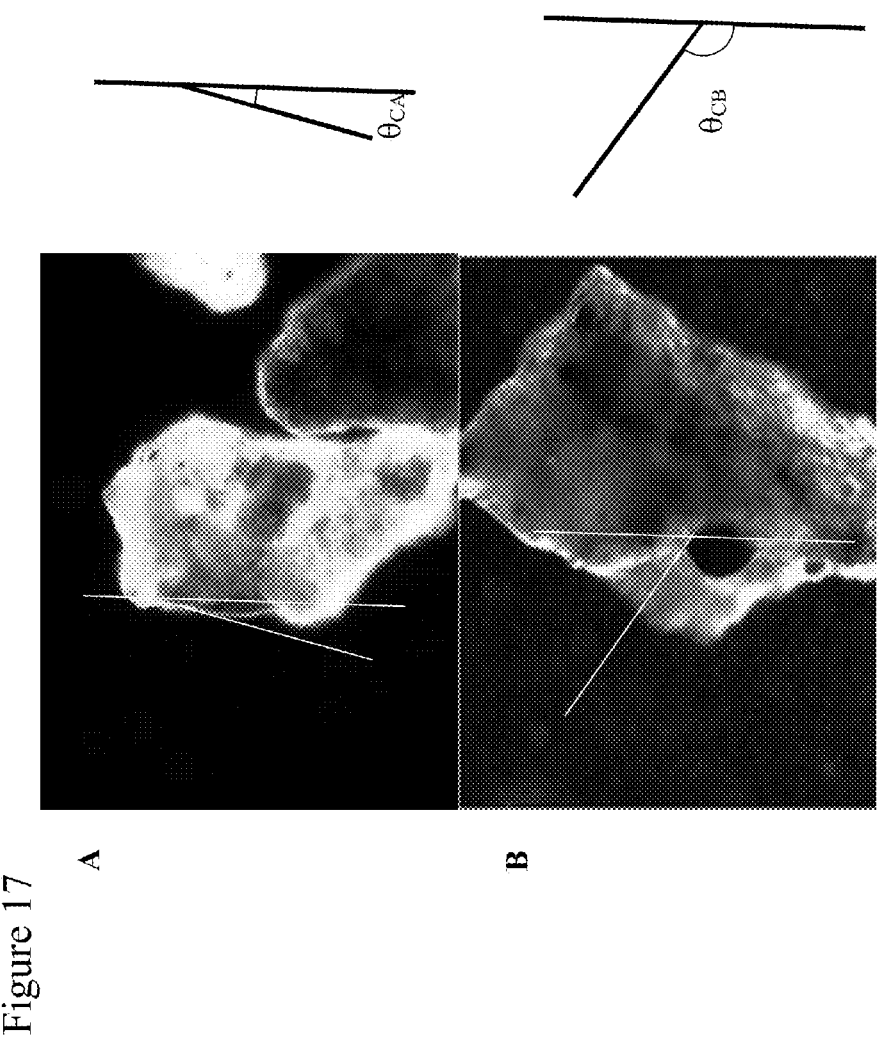

FIGS. 17A and B. Pictograph of contact angle comparisons between untreated oil coated sand (A) and L3:3 treated oil coated sand (B).

FIG. 18 shows dominate and degenerate signature sequences for *Shewanella* species in rDNA variable regions 2 (A), 5 (B), and 8 (C). The variable positions are underlined. Alternative nucleotides for each variable position designation are given in the legend. *Shewanella oneidensis* MR-1 is representative of *Shewanella* having the dominate signature sequences.

The following DNA sequences conform with 37 C.F.R. 1.821-1.825 ("Requirements for Patent Applications Containing Nucleotide Sequences and/or Amino Acid Sequence Disclosures—the Sequence Rules") and are consistent with World Intellectual Property Organization (WIPO) Standard ST.25 (1998) and the sequence listing requirements of the EPO and PCT (Rules 5.2 and 49.5(a-bis), and Section 208 and Annex C of the Administrative Instructions. The symbols and format used for nucleotide and amino acid sequence data comply with the rules set forth in 37 C.F.R. §1.822.

SEQ ID NO:1 is oligonucleotide primer 1492R.
SEQ ID NO:2 is oligonucleotide primer 8F.
SEQ ID NO:3 is 16S rDNA from *Shewanella* sp. L3:3
SEQ ID NO:4 is 16S rDNA from CP000681 *Shewanella putrefaciens* CN-32.
SEQ ID NO:5 is 16S rDNA from *Shewanella putrefaciens* LH4:18.
SEQ ID NO:6 is 16S rDNA FJ210800 from *Shewanella algae*.
SEQ ID NO:7 is 16S rDNA EU563337.1 from *Shewanella* sp. C13-M.
SEQ ID NO:8 is 16S rDNA EU563345.1 from *Shewanella* sp. C31.
SEQ ID NO:9 is 16S rDNA DQ164801.1 from *Shewanella* sp. L10.
SEQ ID NO:10 is 16S rDNA FM210033.2 from *Shewanella chilikensis* JC5T.
SEQ ID NO:11 is 16S rDNA EU721813 from *Shewanella* uncultured clone D004024H07.
SEQ ID NO:12 is 16S rDNA EU563338.1 from *Shewanella* sp. C16-M.
SEQ ID NO:13 is the DNA sequence corresponding to prokaryote 16S rRNA variable region 3 that is signature to *Shewanella* sp. L3:3 and related strains.
SEQ ID NO:14 is the DNA sequence corresponding to prokaryote 16S rRNA variable region 6 that is signature to *Shewanella* sp. L3:3 and related strains.
SEQ ID NO:15 is a partial sequence of the 16S rDNA of *Shewanella* sp. strain EH60:12.
SEQ ID NO:16 is a partial sequence of the 16S rDNA of *Shewanella* sp. strain EH60:10.
SEQ ID NO:17 is a partial sequence of the 16S rDNA of *Shewanella* sp. strain EH60:2.

SEQ ID NO:18 is the *Shewanella* dominant signature sequence for the 16S rDNA variable region 2.

SEQ ID NO:19 is the *Shewanella* degenerate signature sequence for the 16S rDNA variable region 2.

SEQ ID NO:20 is the *Shewanella* dominant signature sequence for the 16S rDNA variable region 5.

SEQ ID NO:21 is the *Shewanella* degenerate signature sequence for the 16S rDNA variable region 5.

SEQ ID NO:22 is the *Shewanella* dominant signature sequence for the 16S rDNA variable region 8.

SEQ ID NO:23 is the *Shewanella* degenerate signature sequence for the 16S rDNA variable region 8.

Applicants have made the following biological deposits under the terms of the Budapest Treaty on the International Recognition of the Deposit of Microorganisms for the Purposes of Patent Procedure:

TABLE 1

INFORMATION ON DEPOSITED STRAINS

| Depositor Identification Reference | International Depository Designation | Date of Deposit |
|---|---|---|
| *Shewanella* sp L3:3 | ATCC No. 10980 | May 19, 2010 |
| *Shewanella putrefaciens* LH4:18 | ATCC No. PTA-8822 | Dec. 4, 2007 |
| *Thauera aromatica* | ATCC PTA-9497 | Sep. 17, 2008 |
| *Pseudomonas stutzeri* LH4:15 | (ATCC No. PTA-8823) | Dec. 4, 2007 |

DETAILED DESCRIPTION

Applicants specifically incorporate the entire content of all cited references in this disclosure. Unless stated otherwise, all percentages, parts, ratios, etc., are by weight. Trademarks are shown in upper case. Further, when an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

The invention relates to methods for altering the interfacial properties of hydrocarbon coated surfaces by contacting these surfaces with *Shewanella* microorganisms that have the ability to alter the interface between the hydrocarbons and such surfaces. These alterations result in substantial oil liberation from the hydrocarbon-coated surfaces. It has been discovered that these *Shewanella* sp. have the ability to affect the wettability of the surfaces through microbial action and thereby provide for increased oil recovery form those surfaces. Wettability may also be altered by media conditioned by growth of said microorganisms.

In addition, the invention relates to the identification of previously unknown *Shewanella* sp. isolated from production water samples obtained from an oil reservoir.

The following definitions are provided for the special terms and abbreviations used in this application:

The abbreviation "dNTPs" refers to Deoxyribonucleotide triphosphates.

The abbreviation "ATCC" refers to American Type Culture Collection International Depository, Manassas, Va., USA. "ATCC No." refers to the accession number to cultures on deposit with ATCC.

The abbreviation "ASTM" refers to the American Society for Testing and Materials.

The term "terrestrial subsurface formation" or "subsurface formation" refers to in ground or under ground geological formations and may comprise elements such as rock, soil, brine, sand, shale, clays and mixtures thereof.

The term "terrestrial surface formation" or "surface formation" refers to above ground geological formations and may comprise elements such as rock, soil, brine, sand, shale, clays and mixtures thereof.

The term "environmental sample" means any sample exposed to hydrocarbons, including a mixture of water and oil. As used herein environmental samples include water and oil samples that comprise indigenous microorganisms useful for phylogenetic mapping of genera present in a given sampling area.

The term "environmental site" means a site that has been contaminated with hydrocarbons and/or other persistent environmental pollutants. Environmental sites may be in surface or subsurface locations.

"Production wells" are wells through which oil is withdrawn from a reservoir. An oil reservoir or oil formation is a subsurface body of rock having sufficient porosity and permeability to store and transmit oil.

The term "sweep efficiency" means the ability of injected water to 'push' oil through a geological formation toward a producer well. One problem that can be encountered with waterflooding operations is the relatively poor sweep efficiency of the water, i.e., the water can channel through certain portions of the reservoir as it travels from the injection well(s) to the production well(s), thereby bypassing other portions of the reservoir. Poor sweep efficiency may be due, for example, to differences in the mobility of the water versus that of the oil, and permeability variations within the reservoir which encourage flow through some portions of the reservoir and not others.

The term "irreducible water saturation" is the minimal water saturation that can be achieved in a porous core plug when flooding with oil to saturation. It represents the interstitial water content of the matrix where the water is never completely displaced by the oil because a minimal amount of water must be retained to satisfy capillary forces.

The term "growing on oil" means the microbial species are capable of metabolizing hydrocarbons or other organic components of crude petroleum as a nutrient to support growth.

The term "remediation" refers to the process used to remove hydrocarbon contaminants from an environmental site containing hydrocarbons and/or other persistent environmental pollutants.

The term "bioremediation" refers to the use of microorganisms to remediate or detoxify contaminants form a contaminant-altered environment "Petroleum" or "oil" is a naturally occurring, flammable liquid found in rock and sand formations in the Earth, which consisting of a complex mixture of hydrocarbons and polycyclic aromatic hydrocarbon of various molecular weights, plus other organic compounds.

"Crude oil" refers to the unrefined oil taken from a petroleum reservoir.

"Oil well" and "oil reservoir" may be used herein interchangeably and refer to a subsurface formation from which oil may be recovered.

"Interface" as used herein refers to the surface of contact or boundary between immiscible materials, such as oil and water or a liquid and a solid. As used herein "interfaces" may be between a water layer and an oil layer, a water layer and a solid surface layer, or an oil layer and a solid surface layer.

"Hydrocarbon-coated" as used herein refers to a coating of a hydrocarbon to a solid surface of at least 10% areal coverage.

The term "components of a subsurface formation" refers to rock, soil, brine, sand, shale, clay or mixtures thereof of either subterranean or seabed formations, that have come in contact with one or more hydrocarbon. These components may be part of an oil well or reservoir. At least a portion of the components include some hydrocarbon-coated surfaces, including particles with coated surfaces.

"Adhered to" refers to coating or adsorption of a liquid to a solid surface of at least 10% areal coverage.

"Shewanella species" or "Shewanella sp." is a bacterial genus that has been established, in part through phylogenetic classification by rDNA. There is at least about 89% sequence identity of 16S rDNA sequences among Shewanella species. The 16S rDNA sequences of Shewanella species have at least about 89% sequence identity to any of SEQ ID NOs:3-12. Shewanella species have 16S rDNA which has the signature sequences of regions 2 (SEQ ID NO:18, 19), 5, (SEQ ID NO:20,21) and 8 (SEQ ID NO: 22,23) as shown in FIG. 18. The degenerate signature sequence for each region gives the sequence that defines Shewanella species, including some position variations as shown in FIG. 18. The dominant signature sequences in FIG. 18 are those with the variable positions designated as the most frequently found nucleotides in Shewanella species. Shewanella are gram negative, gamma-proteobacteria, which have the ability to reduce metals and are capable of additionally reducing a wide range of terminal electron acceptors. These microorganisms gain energy to support anaerobic growth by coupling the oxidation of $H_2$ or organic matter to the redox transformation of a variety of multivalent metals, which leads to the precipitation, transformation, or dissolution of minerals.

The abbreviation "rDNA" refers to ribosomal deoxyribonucleic acid gene sequence.

The term "rDNA typing" means the process of using the sequence of the 16S rDNA gene to obtain the "closest relative" microbial species by homology to rDNA sequences maintained in several international databases.

The term "phylogenetic typing" "phylogenetic mapping" or "phylogenetic classification" may be used interchangeably herein and refer to a form of classification in which microorganisms are grouped according to their ancestral lineage. The methods herein are specifically directed to phylogenetic typing on environmental samples based on 16S Ribosomal DNA (rDNA) sequencing. In this context, approximately 1400 base pair (bp) length of the 16S rDNA gene sequence is generated using 16S rDNA universal primers identified herein and compared by sequence homology to a database of microbial rDNA sequences. This comparison is then used to help taxonomically classify pure cultures for use in enhanced oil recovery.

The term "ribotyping" or "riboprint" refers to fingerprinting of genomic DNA restriction fragments that contain all or part of the rRNA operon encoding for the 5S, 16S and 23S rRNA genes (Webster, John A, 1988. U.S. Pat. No. 4,717,653; Bruce, J. L., Food Techno., (1996), 50: 77-81; and Sethi, M. R., Am. Lab. (1997), 5: 31-35). Ribotyping, involves generation of restriction fragments, from microbial chromosomal DNA, which are then separated by electrophoresis, and transferred to a filter membrane and finally probed with labeled rDNA operon probes. Restriction fragments that hybridize to the labeled probe produce a distinct labeled pattern or fingerprint/barcode that is unique to a specific microbial strain. The "riboprint" is a unique fingerprint pattern that can be given a unique riboprint identifier" (alphanumeric characters) and stored electronically to be used to identify the isolate when compared to the database at a later date. The ribotyping procedure can be entirely performed on the Riboprinter® instrument (DuPont Qualicon, Wilmington, Del.).

The term "riboprint batch" refers to comparison alignment of two or more riboprints and is depicted in a report as a pictograph.

The term "percent identity", as known in the art, is a relationship between two or more polypeptide sequences or two or more polynucleotide sequences, as determined by sequence comparisons. In the art, "identity" also means the degree of sequence relatedness or homology between polynucleotide sequences, as determined by the match between strings of such sequences and their degree of invariance. The term "similarity" refers to how related one nucleotide or protein sequence is to another. The extent of similarity between two sequences is based on the percent of sequence identity and/or conservation. "identity" and "similarity" can be readily calculated by known methods, including but not limited to those described in "Computational Molecular Biology, Lesk, A. M., ed. Oxford University Press, NY, 1988"; and "Biocomputing: Informatics and Genome Projects, Smith, D. W., ed., Academic Press, NY, 1993"; and "Computer Analysis of Sequence Data, Part I, Griffin, A. M., and Griffin, H. G., eds., Humana Press, NJ, 1994"; and "Sequence Analysis in Molecular Biology, von Heinje, G., ed., Academic Press, 1987"; and "Sequence Analysis Primer, Gribskov, M. and Devereux, J., eds., Stockton Press, NY, 1991". Preferred methods to determine identity are designed to give the best match between the sequences tested. Methods to determine identity and similarity are codified in publicly available computer programs such as sequence analysis software. Typical sequence analysis software includes, but is not limited to: the GCG suite of programs (Wisconsin Package Version 9.0, Genetics Computer Group (GCG), Madison, Wis.), BLASTP, BLASTN, BLASTX (Altschul et al., J. Mol. Biol. 215, 403-410, 1990), DNASTAR (DNASTAR, Inc., Madison, Wis.), and the FASTA program incorporating the Smith-Waterman algorithm (Pearson, W. R., Comput. Methods Genome Res., Proc. Int. Symp, Meeting Date 1992, 111-120, Eds: Suhai, Sandor, Plenum Publishing, New York, N.Y., 1994). Within the context of this application, it will be understood that, where sequence analysis software is used for analysis, the results of the analysis will be based on the "default values" of the program referenced, unless otherwise specified. As used herein "default values" will mean any set of values or parameters which originally load with the software when first initialized. The term "wetting" refers to the ability of a liquid to maintain contact with a solid surface, resulting from intermolecular interactions when the two are brought together. The degree of wetting (expressed as "wettability") is determined by a force balance between adhesive and cohesive forces.

"Wetting agent" refers to a chemical such as a surfactant that increases the water wettability of a solid or porous surface by changing the hydrophobic surface into one that is more hydrophilic. Wetting agents help spread the wetting phase (e.g., water) onto the surface thereby making the surface more water wet.

"Wettability" refers to the preference of a solid to contact one liquid, known as the wetting phase, rather than another. Solid surfaces can be water wet, oil wet or intermediate wet.

"Water wettability" pertains to the adhesion of water to the surface of a solid. In water-wet conditions, a thin film of water coats the solid surface, a condition that is desirable for efficient oil transport.

The term "adhesive forces" refers to the forces between a liquid and solid that cause a liquid drop to spread across the surface.

The "cohesive forces" refers to forces within the liquid that cause the drop to ball up and avoid contact with the surface.

The term "contact angle" is the angle at which a liquid (oil or water) interface meets a solid surface, such as sand or clay. Contact angle is a quantitative measurement of the wetting of a solid by a liquid and is specific for any given system, and is determined by interactions across three interfaces. The concept is illustrated with a small liquid droplet resting on a flat horizontal solid surface. The shape of the droplet is determined by the "Young Relation" (Bico et al., Colloids and Surfaces A: Physicochemical and Engineering Aspects 206 (2002) 41-46). The theoretical description of contact arises from the consideration of a thermodynamic equilibrium between the three phases: the liquid phase of the droplet (L), the solid phase of the substrate (S), and the gas/vapor phase of the ambient (V) (which will be a mixture of ambient atmosphere and an equilibrium concentration of the liquid vapor). The V phase could also be another (immiscible) liquid phase. At equilibrium, the chemical potential in the three phases should be equal. It is convenient to frame the discussion in terms of interfacial energies. The solid-vapor interfacial energy (see surface energy) is $\gamma_{SV}$, the solid-liquid interfacial energy is $\gamma_{SL}$ L and the liquid-vapor energy (i.e. the surface tension) is simply $\gamma$. The Young equation: $0=\gamma_{SV}-\gamma_{SL}-\cos\theta$ is written such that describes an equilibrium where $\theta_C$ is the equilibrium contact angle.

"Microbial populations" means one or more populations of microorganisms present, either in samples obtained from oil wells or in an inoculum for injection into an oil well or subsurface formation.

"Medium" as used herein means an aqueous milieu either comprises one of more *Shewanella* sp. or is a cell free supernatant that has been in contact with one or more *Shewanella* sp. Medium containing *Shewanella* sp. is referred to herein as "cell containing" medium and medium that is a cell free supernatant is referred to herein as "cell free" medium. Medium will be aqueous based any may contain various nutrients, buffers, salts, vitamins, co-factors and the like and carbon sources useful for microbial growth.

"Electron acceptor" is a molecular compound that receives or accepts an electron during cellular respiration. Microorganisms obtain energy to grow by transferring electrons from an "electron donor" to an electron acceptor. During this process, the electron acceptor is reduced and the electron donor is oxidized. Examples of acceptors include oxygen, nitrate, fumarate, iron (III), manganese (IV), sulfate or carbon dioxide. Sugars, low molecular weight organic acids, carbohydrates, fatty acids, hydrogen and crude oil or its components such as petroleum hydrocarbons or polycyclic aromatic hydrocarbons are examples of compounds that can act as electron donors.

"Denitrifying" and "denitrification" mean reducing nitrate for use as an electron acceptor in respiratory energy generation. "Denitrifying conditions" means conditions where denitrification occurs.

"Inoculating an oil well" means injecting one or more microorganisms or microbial populations or a consortium into an oil well or oil reservoir such that microorganisms are delivered to the well or reservoir without loss of total viability.

The term "simple nitrates" and "simple nitrites" refer to nitrite ($NO_2$) and nitrate ($NO_3$).

The term "nutrient supplementation" refers to the addition of nutrients that benefit the growth of microorganisms that are capable of using crude oil as their main carbon source but grow optimally with other non-hydrocarbon nutrients, i.e., yeast extract, peptone, succinate, lactate, formate, acetate, propionate, glutamate, glycine, lysine, citrate, glucose, pyruvate and vitamin solutions.

The term "biofilm" means a film or "biomass layer" made up of a matrix of a compact mass of microorganisms consisting of structural heterogeneity, genetic diversity, complex community interactions, and an extracellular matrix of polymeric substances. Biofilms are often embedded in these extracellular polymers, which adhere to surfaces submerged in, or subjected to, aquatic environment The term "bacterial" means belonging to the bacteria. Bacteria are an evolutionary domain or kingdom of microbial species separate from other prokaryotes based on their physiology, morphology and 16S rDNA sequence homologies.

"Microbial species" means distinct microorganisms identified based on their physiology, morphology and phylogenetic characteristics using 16S rDNA sequences. The closest relative microbial species may also be referred to as a "homolog".

The term "pure culture" means a culture derived from a single cell isolate of a microbial species. The pure cultures specifically referred to herein include those that are publicly available in a depository. Additional pure cultures are identifiable by the methods described herein.

The term "simulated injection brine" or "SIB" is a medium composition containing 198 mM NaCl, 1 mM $MgCl_2$, 1.8 mM $CaCl_2$, 1.2 mM KCl, 16 mM $NaHCO_3$, 0.05 mM $SrCl_2$, 0.13 mM $BaCl_2$, 0.14 mM LiCl.

The abbreviation "NCBI" refers to the National Center for Biotechnology Information.

A spectrophotometer is a device for measuring light intensity that can measure intensity as a function of the color, or more specifically, the wavelength of light. In microbiology, the term "optical density" is a unit-less measure of the transmittance of light at a given wavelength that uses an empirical relationship that relates the absorption of light to the properties of the material through which the light is traveling.

The term "MPN" or "most probable number" is a quantitative measurement of the concentration of microbes in a given medium. It is expressed as CFU/ml (colony forming units/ml), log 10 (CFU/ml) or log 10 (MPN).

Altering Hydrocarbon-Surface Interface

Provided herein are methods for oil recovery and remediation which rely on altering the wettability of hydrocarbon-coated surfaces. Through altering wettability, the characteristics of the interface between hydrocarbons and a hydrocarbon-coated surface is changed, thereby releasing the hydrocarbons from the surface. For example, this alteration may result in the surface having a preference for binding water as opposed to oil thereby providing for recovery of the oil more readily. Changes in the wettability may be monitored by measuring changes in the contact angle between a hydrocarbon and the surface to which it is adhered. For example, an increase in the contact angle is an indication of a reduction in the surface energy required to bind the oil to the surface (see Example 8). Thus, an aspect of the present invention is the discovery that contact between *Shewanella* sp. or biomolecules produced by *Shewanella* sp. and hydrocarbon coated surfaces produces alterations in the wettability properties of the hydrocarbon coated surface such that the surface energy binding the hydrocarbon to the surface is decreased, (as measured by an increase in the contact angle) resulting in the subsequent release of oil.

Hydrocarbon-coated surfaces may be any hard surface (including one or more particle) that is coated or contaminated with hydrocarbons with at least 10% areal coverage by said hydrocarbons. The hydrocarbons may be adhered to said surfaces. Hydrocarbon-coated surfaces may be in subsurface formations, for example in oil reservoirs, and may include rock, soil, brine, sand, clays, shale, and mixtures thereof. In addition, hydrocarbon-coated surfaces may include materials that are not subsurface including rock, clay, soil, sediments, sand, sludge, harbor dredge spoils, sediments, refinery wastes, wastewater, sea water, and mixtures thereof. In addition, hydrocarbon-coated surfaces may include equipment such as pipelines, oil tanks and tankers, and other machinery that may be contaminated with hydrocarbons.

In the present methods, *Shewanella* sp. alter the wettability of hydrocarbon-coated surfaces. Alteration may be by contact with said microbes or by contact with extracellular molecules produced by said microbes, which may in include one or more wetting agents. The *Shewanella* sp. under certain conditions undergo modifications in surface-bound or extracellular molecules. Modifications include changes in the composition and/or ratio of the molecules which include but are not limited to cytochromes, flavins, siderophores, membrane vesicles, glycoproteins, glycolipids, lipoproteins, fimbriae, extracellular polymeric substances, polysaccharides, monosaccharides, and lipopolysaccharides. These modifications, in turn, alter the water wettability of a hydrocarbon-coated surface contacted by the altered microbial surfaces.

Conditions for growth that are suitable for *Shewanella* species to be used in the present methods are determined by the environment of the target hydrocarbon-coated surface, and the conditions for growth of said species in a given environment. Suitable conditions include those that are favorable to producing changes in the wettability of the hydrocarbon-coated surface. Such suitable conditions may include growth and medium compositions that are beneficial for the production and/or modification of surface bound or extracellular molecules, especially those molecules related to stress, oxygen limitation, redox, and/or electron transfer which may be wetting agents. Typical growth media compositions include enriched media containing diverse nutrient sources such as peptone, yeast extract, or casamino acids, for example. In some aspects the media may be a minimal media such as SL10 or simulated injection brine supplemented with an electron donor and electron acceptor. Examples of electron donors include, but are not limited to, lactate and/or acetate. Examples of electron acceptors include but are not limited to, nitrate, fumarate, pyruvate, ferric ion (Fe (III)) and/or manganese ion (Mn (IV). Additional carbon sources may include but are not limited to yeast extract, peptone, pyruvate, glucose, succinate, formate, propionate, glutamate, glycine lysine, oil, and oil components. Oil components may be any of the many components that are present in crude oil. Cultures may be grown aerobically or anaerobically, and may be grown at a temperature that is similar to that of a target reservoir, typically about 30° C., or in the range of room temperature, +/−5° C. In addition, stress conditions may be suitable for growth of the present strains. Growth under stress inducing conditions includes, but is not limited to, switching growth from oxic to anoxic conditions, growth under population pressure or high density growth, switching electron acceptors, growth at low temperatures, and growth under osmotic stress (such as in high salt).

Cultures of *Shewanella* species may be used to contact hydrocarbon-coated surfaces in the present methods. Alternatively, cells may be removed from the cultures and the remaining medium, which has been conditioned by growth of *Shewanella* species cells, may be used to contact hydrocarbon-coated surfaces in the present methods. It is likely that condition medium contains biosurfactants or other biomolecules that act as wetting agents and contribute to the alterations in the wettability hydrocarbon coated surfaces.

Multiple cultures of different strains of *Shewanella* species may be used in the present methods. Alternatively, multiple strains may be grown in the same culture that is used in the present methods.

Treating Surface and Subsurface Formations

In the present methods, hydrocarbon-coated surfaces in surface and subsurface formations are contacted with a *Shewanella* species cultures in an cell containing medium or a conditioned medium. Typically the subsurface formations will be contained within an oil well site, often comprising an injection site and a production well site.

Application of the medium may include processes such as waterflooding, or the use of a fluid such as an aqueous solution or gas (such as $CO_2$) or a solvent or a polymer that is injected into the subsurface formation. Injection methods are common and well known in the art and any suitable method may be used. [see for example *Nontechnical guide to petroleum geology, exploration, drilling, and production*, $2^{nd}$ edition. N. J. Hyne, PennWell Corp. Tulsa, Okla., USA, Freethey, G. W., Naftz, D. L., Rowland, R. C., & Davis, J. A. (2002); and *Deep aquifer remediation tools*: Theory, design, and performance modeling, In: D. L. Naftz, S. J. Morrison, J. A. Davis, & C. C. Fuller (Eds.); and *Handbook of groundwater remediation using permeable reactive barriers* (pp. 133-161), Amsterdam: Academic Press)].

Typically the injection site or well will communicate with the production well where oil is recovered. The application of the medium (either cell containing or cell free) may follow any number of sequences for the effective production of oil and the various options will be readily apparent to the one skilled in the art of oil recovery.

For example, treatment of the subsurface formations may include pumping or adding water with *Shewanella* microbes via an injection well into an area comprising hydrocarbons ("treatment zone") and allowing that water to be produced along with the recovered hydrocarbon at the production well. Treatment may also involve pumping water with cell-free medium produced by conditioning with *Shewanella* into a treatment zone. Treatment of an oil reservoir also may include pumping water with medium down the producer well and into the formation and then back flowing oil and water out of the producer well (huff and puff). Additionally reservoir treatment may also include inoculating an injector well that is in communication with one or more producer wells, and then subsequently providing an injection water that has been augmented with nutrients either continuously or periodically to promote growth of the *Shewanella* microbes, where oil is recovered at the producer well. Other treatments may include pumping water containing conditioned medium onto an environmental site comprising elements as a pile of oil sand or oil shale, collecting the water and released oil, and separating the oil from the water. The water may optionally be recycled back to be treated with *Shewanella* sp.

Hydrocarbon-coated surfaces may be contacted with cell containing *Shewanella* sp. medium or conditioned medium alone or with additional components. Additional components may be provided separately or in compositions with the medium. Components other than cultures may be injected, pumped, or otherwise applied to an area with hydrocarbon-coated surfaces prior to, together with, or following contact with cultures or conditioned medium.

Mixtures of one or more *Shewanella* species and one or more electron acceptors provide compositions for use in any oil recovery or clean-up site as listed above. Electron acceptors may include, but are not limited to, nitrate, fumarate, pyruvate, ferric ion (Fe (III)) or manganese ion (Mn (IV)). Mixtures of one or more electron acceptor may be used.

Additional components of the compositions may include one or more carbon sources, such as but not limited to, lactate, yeast extract, peptone, pyruvate, glucose, succinate, formate, acetate, propionate, glutamate, glycine lysine, oil, and oil components. Oil components may be any of the many components that are present in crude oil.

The compositions may include other agents or components such as one or more additional microorganisms, such as bacteria, yeast, or fungus. Particularly useful additional microorganisms are capable of growing on oil under denitrifying conditions. In some embodiments, the additional agents may be the microorganisms *Pseudomonas stutzeri* strain LH4:15 (ATCC No. PTA-8823), and/or *Thauera* sp AL9:8, (ATCC No. PTA-9497), which are described in commonly owned and co-pending US US 20100078162 A1. Other agents may also include one or more chemical compounds that are not lethal to microorganisms, but are effective at degrading or partially degrading hydrocarbons and/or other contaminants.

Enhanced Oil Recovery from a Reservoir or Oil Well

Enhanced oil recovery in this context may include secondary or tertiary oil recovery of hydrocarbons from subsurface formations by techniques that alter the original properties of hydrocarbon-coated surface interface. Specifically, hydrocarbons that are adhered to surfaces within subsurface formations may be substantially liberated by contact with *Shewanella* sp. or biomolecules produced by these microorganisms. Typically oil is liberated on an order of about 5, 10, 15, 20, 25, 30, to about 35% of the areal coverage. These methods permit the release of oil that could not normally be recovered by waterflooding or other traditional oil recovery techniques.

Bioremediation.

In addition to applications in oil recovery the present *Shewanella* sp may be useful in effecting the remediation of environmental sites contaminated with hydrocarbons and other pollutants. Bioremediation strategies for hydrocarbons depend on their locations in the environment. Contamination by hydrocarbon spills can be costly to remediate and cause toxicity to environmental inhabitants. Use of microbial action as described here may provide cost-effective mechanisms for remediating hydrocarbon contamination especially under circumstances in which contamination results in hydrocarbon-coated surfaces. For example, use of *Shewanella* sp. and their surface active agents (such as wetting agents) may help to increase wettability of soil and solubility of soil contaminants through reduction in surface and interfacial tensions. This action liberates the hydrocarbons from the surface of soils and renders them available for other remediating action, including degradation by other microbes. In this context bioremediation may be accomplished by a combination of microbes including *Shewanella* sp. in addition to oil-degrading microorganisms.

*Shewanella* Species

It has been discovered that the presence *Shewanella* species or materials or biomolecules produced by *Shewanella* have the effect of altering the wettability of a hydrocarbon coated surface. Any and all members of the genus *Shewanella* have this utility.

*Shewanella* is a bacterial genus that has been established, in part through phylogenetic classification by rDNA and are fully described in the literature (see for example Fredrickson et al., *Towards Environmental Systems Biology Of Shewanella*, Nature Reviews Microbiology (2008), 6(8), 592-603; Hau et al., *Ecology And Biotechnology Of The Genus Shewanella*, Annual Review of Microbiology (2007), 61, 237-258).

It is within the scope of the present invention to classify relevant *Shewanella* on the basis of conserved regions contained in the 16S rDNA. Analysis of the 16 S rDNA from 50 different *Shewanella* strains revealed three conserved signature regions, 2 (SEQ ID NO:18, 19), 5, (SEQ ID NO:20,21) and 8 (SEQ ID NO: 22,23) as shown in FIG. 18, each having dominant and degenerate sequences.

To identify the *Shewanella* signature sequences, 50 different 16S rDNA sequences of *Shewanella* strains that are available in the NCBI database were aligned. The sequences are from strains that have been classified as *Shewanella* in the International Journal of Systematic and Evolutionary Microbiology. The sequences were aligned using the MegAlign program of the LASERGENE bioinformatics computing suite (DNASTAR Inc., Madison, Wis.). Multiple alignment of the sequences is performed using the "Clustal method of alignment" (described by Higgins and Sharp, *CABIOS*. 5:151-153 (1989); Higgins, D. G. et al., *Comput. Appl. Biosci.*, 8:189-191 (1992)). For multiple alignments, the default values correspond to GAP PENALTY=10 and GAP LENGTH PENALTY=10. In addition to the *Shewanella* rDNA sequences, the alignment included 16S rDNA sequences of *E. coli*, and of microbes closely related to *Shewanella, Alishewanella jeotgali, Alteromonas rubra*, and *Vibrio natriegenas*. Through visual analysis of the 16S rDNA variable regions 2, 5, and 8, signature sequences for *Shewanella* species were identified and are given in FIG. 18. Thus, *Shewanella* sp. useful in the present invention are those that comprise within the 16s rDNA the dominant or degenerate signature sequences as set forth in 2SEQ ID NO:18-23.

Specific strains of *Shewanella* are disclosed herein that are useful in the methods of the invention. One such strain is *Shewanella putrefaciens* strain LH4:18 which was isolated, identified, and deposited to the ATCC under the Budapest Treaty as #PTA-8822, as described in commonly owned and co-pending US Patent Application Publication US 2009-0260803 A1. Strain LH4:18 has the 16S rDNA sequence of SEQ ID NO:5. Examples of additional *Shewanella* species that may be used include but are not limited to *Shewanella frigidimarina* (DSM 12253), *Shewanella pacifica* (DSM 15445), *Shewanella profunda* (DSM 15900), *Shewanella gelidimarina* (DSM 12621), and *Shewanella baltica* (DSM 9439). These strains may be purchased through the German Collection of Microorganisms and Cell Cultures (DSMZ). These and other strains that may be used have at least about 94%, 95%, 96%, 97%, 98%, or 99% identity to SEQ ID NO:5 of strain LH4:18.

Additionally useful strains are *Shewanella* strains EH60:12, EH60:2, and EH60:10, which were identified herein and characterized with partial 16S rDNA sequences of SEQ ID NOs:15, 16, and 17, respectively. *Shewanella* species include microorganisms having a 16S rDNA sequence with at least about 95%, 96%, 97%, 98%, or 99% identity to any one or all of SEQ ID NOs:15-17.

In addition to the known *Shewanella* sp. described above, the invention provides a newly identified *Shewanella* sp. which is useful in the present methods. This new strain is identified as *Shewanella* sp. strain L3:3 which has been deposited with the ATCC under the Budapest Treaty as #

PTA-10980. *Shewanella* sp. strain L3:3 was isolated from an injection water sample obtained from the Alaskan North Slope and has the 16S rDNA sequence of SEQ ID NO:3. Within the 16S rDNA sequence are signature sequences that were identified in variable regions 3 and 6 of prokaryote rDNA that have nucleotide sequences of SEQ ID NOs: 13 and 14, respectively. As shown in FIG. 14, the nucleotides at specific positions (with respect to the first nucleotide of SEQ ID NO:3) 438-40, 451, 454-57, 466-69, 471, 484-86 and 496 within SEQ ID NO:13 are different in strain L3:3 from the nucleotides present in the 16S rDNA of *Shewanella putrefaciens, Shewanella* sp. LH4:18 and *Shewanella algae*. As shown in FIG. 15, the nucleotides at specific positions (with respect to the first nucleotide of SEQ ID NO:3) 995-6, 1001-05, 1007, 1012, 1014, 1016-1018 and 1035 within SEQ ID NO:14 are also different in strain L3:3 from the nucleotides present in the 16S rDNA of *Shewanella putrefaciens, Shewanella* sp. LH4:18 and *Shewanella algae*. *Shewanella* strains found herein to have the same nucleotides at all of these positions are *Shewanella* sp. C31, *Shewanella* sp. L-10, *Shewanella chilikensis* JC5T, *Shewanella* sp. C16-M, and a *Shewanella* clone identified as D00402024H07. While having the signature sequences of SEQ ID NOs:13 and 14, the present *Shewanella* species that are closely related to the newly identified strain L3:3 have at least about 97%, 98% or 99% sequence identity to the DNA sequences for 16S ribosomal RNA of SEQ ID NO:3. In addition, strains closely related to strain L3:3 have a riboprint pattern identifier of 212-824-S-4 as demonstrated in FIG. 16. This riboprint pattern was identified herein for *Shewanella* sp. strain L3:3.

*Shewanella* sp. are gram negative, metal-reducing bacteria that are capable of reducing a wide range of terminal electron acceptors. These microorganisms gain energy to support anaerobic growth by coupling the oxidation of $H_2$ or organic matter to the redox transformation of a variety of multivalent metals, which leads to the precipitation, transformation, or dissolution of minerals.

On the basis of the 16S rDNA sequences isolated from the above described *Shewanella* sp. and using the alignment methods described herein, it has been discovered that all bacteria having a 16S rDNA sequence that is at least 89% identical to either the full length 16S rDNA as set forth in either SEQ IC NO:3 (L3:3) or 5 (LH4:18) must be classified as *Shewanella*.

EXAMPLES

The present invention is further defined in the following Examples. It should be understood that these Examples, while indicating preferred embodiments of the invention, are given by way of illustration only. From the above discussion and these Examples, one skilled in the art may ascertain the essential characteristics of this invention, and without departing from the spirit and scope thereof, may make various changes and modifications of the invention to adapt it to various usages and conditions.

Additional Abbreviations Used in the Examples

The meaning of abbreviations is as follows: "hr" means hour(s); "mL" means milliliter; "° C." means degrees Celsius; "mg" means milligram(s); "mm" means millimeter; "g" means gram(s); "GC" means gas chromatography; "g of oil/g of total fluid" means gram of oil per gram of total fluid; "ppm" means part per million; "mM" means millimolar; "%" means percent; "CFU/mL" means colony forming unit per milliliter; "LB" means Luria broth medium; "min" means minute(s); "mL/min means milliliter per minute; "NIC" means non-inoculated control (negative controls in microbial culture experiments); "µg/L" means microgram per liter; "nM" means nanomolar; "µM" means micromolar.

General Methods

Growth of Microorganisms

Techniques for growth and maintenance of anaerobic cultures are described in "Isolation of Biotechnological Organisms from Nature", (Labeda, D. P. ed. 117-140, McGraw-Hill Publishers, 1990). When using nitrate as an electron acceptor in anaerobic cultures, growth is measured by nitrate depletion from the growth medium over time. Nitrate is utilized as one of the primary electron acceptors under the growth conditions used herein. The reduction of nitrate to nitrogen has been previously described (Moreno-Vivian, C., et al., J. Bacteriol., 181, 6573-6584, 1999). In some cases nitrate reduction processes lead to nitrite accumulation, which is subsequently further reduced to nitrogen. Accumulation of nitrite is therefore also considered evidence for active growth and metabolism by microorganisms.

Ion Chromatography

An ICS2000 chromatography unit (Dionex, Banockburn, Ill.) was used to quantitate nitrate and nitrite ions in growth medium. Ion exchange was accomplished on an AS15 anion exchange column using a gradient of 2 to 50 mM potassium hydroxide. Standard curves were generated and used for calibrating nitrate and nitrite concentrations.

Genomic DNA Extractions from Bacterial Cultures

To extract genomic DNA from liquid bacterial cultures, cells were harvested by centrifugation (10,000 rpm, at room temperature) and resuspended in lysis buffer (100 mM Tris-HCL, 50 mM NaCl, 50 mM EDTA, pH8.0) followed by agitation using a Vortex mixer. Reagents were then added to a final concentration of 2.0 mg/mL lysozyme, 10 mg/mL SDS, and 10 mg/mL Sarkosyl to lyse the cells. After further mixing with a Vortex mixer, 0.1 mg/mL RNAse and 0.1 mg/mL Proteinase K were added to remove RNA and protein contaminants, and the samples were incubated at 37° C. for 1.0-2.0 hr. Post incubation, the samples were extracted twice with an equal volume of a phenol:chloroform:isoamyl alcohol (25:24:1, v/v/v) and once with chloroform: isoamyl alcohol (24:1). One-tenth volume of 5.0 M NaCl and two volumes of 100% ethanol were added to the aqueous layer, and mixed. The tubes were frozen at −20° C. overnight and then centrifuged at 15,000×g for 30 min at room temperature to pellet chromosomal DNA. The pellets were washed once with 70% ethanol, centrifuged at 15,000×g for 10 min, dried, resuspended in 100 µL of de-ionized water and stored at −20° C. An aliquot of the extracted DNA was visualized on an agarose gel to ascertain the quantity and quality of the extracted DNA.

Direct Colony rDNA Sequence Analysis

Genomic DNA from bacterial colonies was isolated by diluting bacterial colonies in 50 µL of water or Tris-HCL buffer pH7-8. Diluted colony DNAs were amplified with Phi 29 DNA polymerase prior to sequencing (GenomiPHI Amplification Kit GE Life Sciences, New Brunswick, N.J.). An aliquot (1.0 µL) of a diluted colony was added to 9.0 µL of the Lysis Reagent (from the GenomiPHI Amplification Kit) and heated to 95° C. for 3 min followed by immediate cooling to 4° C. 9.0 µL of Enzyme Buffer and 1.0 µL of Phi 29 enzyme were added to each lysed sample followed by incubation at 30° C. for 18 hr. The polymerase was inactivated by heating to 65° C. for 10 min followed by cooling to 4° C.

DNA sequencing reactions were set up as follows: 8.0 µL of GenomiPHI amplified sample were added to 8.0 µL of BigDye v3.1 Sequencing reagent (Applied Biosystems, Foster City, Calif.) followed by 3.0 µL of 10 µM primers SEQ ID NO: 1 in combination with SEQ ID NO: 2 (prepared by Sigma Genosys, Woodlands, Tex.), 4.0 µL of 5× BigDye Dilution buffer (Applied Biosystems) and 174 Molecular Biology Grade water (Mediatech, Inc., Herndon, Va.).

Sequencing reactions were heated for 3 min at 96° C. followed by 200 thermocycles of (95° C. for 30 sec; 55° C. for 20 sec; 60° C. for 2 min) and stored at 4° C. Unincorporated fluorescently labeled ddNTPs were removed using Edge Biosystems (Gaithersburg, Md.) clean-up plates. Amplified reactions were pipetted into wells of a pre-spun 96 well clean up plate. The plate was centrifuged for 5 min at 5,000×g in a Sorvall RT-7 (Sorvall, Newtown, Conn.) at 25° C. The cleaned up reactions were placed directly onto an Applied Biosystems 3730 DNA sequencer and sequenced with automatic base-calling.

Each of the assembled rDNA sequences was compared to the NCBI rDNA database (~260,000 rDNA sequences) using the BLAST algorithm (Altschul et al., supra). The primary hit was used as an identifier of the most closely related known species identification. The initial screen using the rDNA colony direct sequencing reduced the number of colonies to be carried through further screening by 20 fold.

Automated Ribotyping

Automated ribotyping was used for identification of selected strains with similar 16S rDNA sequence phylogenetic characteristics (Webster, John A, 1988. U.S. Pat. No. 4,717,653; Bruce, J. L., Food Techno., (1996), 50: 77-81; and Sethi, M. R., Am. Lab. (1997), 5: 31-35). Ribotyping was performed as recommended by the manufacturer (DuPont Qualicon Inc., Wilmington, Del.). For these analyses, one fresh colony was picked, resuspended in the sample buffer and added to the processing module for the heat treatment step at 80° C. for 10 min to inhibit endogenous DNA-degrading enzymes. The temperature was then reduced and lytic enzymes lysostaphin and N-acetyl-muramidase, provided by the manufacturer, were added to the sample. The sample carrier was then loaded onto the Riboprinter system with other commercial reagents. Restriction enzyme digestion using EcoRI enzyme, gel electrophoresis and blotting steps were completely automated. Briefly, bacterial DNA was digested with the EcoRI restriction enzyme and loaded onto an agarose gel, restriction fragments were separated by electrophoresis and then transferred to a nylon membrane. After a denaturation step, the nucleic acids were hybridized with a sulfonated DNA probe containing the genes for the small and large rRNA subunits of *E. coli*, the 5S, 16S, and 23S ribosomal rRNAs. The hybridized labeled-probe was detected by capturing light emission from a chemiluminescent substrate with a charge-coupled device camera. The output consisted of a densitometry finger scan depicting the specific distribution of the EcoRI restriction fragments containing the genomic rDNA sequences and their molecular weights, which are particular to the genomic DNA sequence of a specific strain independent of the 16S rDNA sequence.

Measuring the Potential for the Microbes to Release Oil from Sand Particles

In order to screen test cultures for the ability to release oil from the nonporous silica medium, a microtiter plate assay to measure the ability of the microbes to release oil/sand from oil-saturated North Slope sand was developed. The assay is referred to as the LOOS test (Less Oil On Sand). Briefly, autoclaved North Slope sand was dried under vacuum at 160° C. for 48 hr. Twenty grams of the dried sand was then mixed with 5 mL of autoclaved, degassed crude oil. The oil-coated sand was then allowed to age anaerobically at room temperature, in an anaerobic chamber, for at least a week. Microtiter plate assays were set up and analyzed in an anaerobic chamber. Specifically, 2 mL of test cultures were added into the wells of a 12-well microtiter plate (Falcon Multiwell 12 well plates, #353225, Becton Dickinson, Franklin Lakes, N.J.). The control wells contained 2 mL of the medium alone. Approximately 40 mg of oil-coated sand was then added to the center of each well. Samples were then monitored over time for release and accumulation of "free" sand that collected in the bottom of the wells. Approximate diameters (in millimeters) of the accumulated total sand released were measured. A score of 2 mm and above indicates the microbes' potential to release oil from the nonporous silica medium.

Gas Chromatography for Determining Residual Oil on Sand

A gas chromatography (GC) method was developed to analyze the sand from sandpacks for residual oil. An empirical relationship was determined based on the North Slope sand and the intrinsic pore volume of packed sand, e.g., for 240 g of packed sand there is a pore volume of 64 mL. Weights of the individual sand samples were obtained and the oil on the sand was extracted with a known amount of toluene. A sample of this toluene with extracted oil was then analyzed by GC. A calibration curve was generated and used to determine the amount of oil in toluene on a weight percent basis. This was then multiplied by the total amount of toluene used to extract the oil resulting in the total amount of oil on the sand. This value was then divided by the total sample weight to yield the percent of oil with respect to the total sample weight. The weight percent of oil of the sample was multiplied by the ratio of the empirically derived characteristic of packed North Slope sand (total weight of sample after being flooded with brine divided by total sand weight, 1.27). This relationship was equal to the amount of oil on dry sand. This value was then multiplied by the ratio of the weight of North Slope sand to the weight of fluid trapped in the pore space of the sand, 3.75. This resulting value was the residual oil left on the sand in units of g of oil/g of total fluid in the pore space.

Growth Medium and Growth Protocol

PPGAS medium was used in the following Examples unless stated otherwise. The medium contained: 1.6 mM $MgSO_4$, 20 mM KCl, 20 mM $NH_4Cl$, 120 mM Tris base 0.5% glucose and 1% Bacto peptone. The initial culture was grown aerobically in the medium at 25° C.

Sterile injection brine (SIB) contained: 198 mM NaCl, 1 mM $MgCl_2$, 1.8 mM $CaCl_2$, 1.2 mM KCl, 16 mM $NaHCO_3$, 0.05 mM $SrCl_2$, 0.13 mM $BaCl_2$, 0.14 mM LiCl) plus 1% peptone.

The SL10 medium had the following composition summarized in Table 2 below:

TABLE 2

Composition of the SL10 Mediu

| Growth component | Final Concentration | Chemical Source |
|---|---|---|
| Nitrogen | 18.7 mM | $NH_4Cl$ |
| Phosphorus | 3.7 mM | $KH_2PO_4$ |
| Magnesium | 984 µM | $MgCl_2 \cdot 6H_2O$ |
| Calcium | 680 µM | $CaCL_2 \cdot 2H_2O$ |
| Sodium chloride | 172 mM | NaCl |
| Trace metals | | |
| | 7.5 µM | $FeCl_2 \cdot 4H_2O$ |
| | 12 nM | $CuCl_2 \cdot 2H_2O$ |
| | 500 nM | $MnCl_2 \cdot 4H_2O$ |
| | 800 nM | $CoCl_2 \cdot 6H_2O$ |
| | 500 nM | $ZnCl_2$ |

TABLE 2-continued

Composition of the SL10 Mediu

| Growth component | Final Concentration | Chemical Source |
|---|---|---|
| | 97 nM | $H_3BO_3$ |
| | 149 nM | $Na_2MoO_4 \cdot 2H_2O$ |
| | 100 nM | $NiCl_2 \cdot 6H_2O$ |
| Selenium-tungstate | 22.8 nM | $Na_2SeO_3 \cdot 5H_2O$ |
| | 24.3 nM | $Na_2WO_4 \cdot 2H_2O$ |
| pH buffer/Bicarbonate | 29.7 mM | $NaHCO_3$ |
| Vitamins | 100 µg/L | vitamin B12 |
| | 80 µg/L | p-aminobenzoic acid |
| | 20 µg/L | D(+)-Biotin |
| | 200 µg/L | nicotinic acid |
| | 100 µg/L | calcium pantothenate |
| | 300 µg/L | pyridoxine hydrochloride |
| | 200 µg/L | thiamine-HCL $\cdot 2H_2O$ |
| | 50 µg/L | Alpha-lipoic acid |

The pH of the medium was adjusted to between 7.4-7.8.

Example 1

Comparison of the Ability of Early and Late Stage Microbial Cultures to Release Oil from Sand Particles To determine whether late stationary phase growth enhances oil release, the oil release activity of an anaerobic overnight culture of strain LH4:18 was compared to that of a one week old culture of the same strain. A culture was grown initially as described above in PPGAS medium. It was then moved into an anaerobic chamber, was supplemented with 500 ppm sodium lactate and 1000 ppm sodium nitrate, and divided in half. One half was used immediately in an anaerobic LOOS test, described in General Methods. The other half (Week1 culture) was aged (left for a week in the anaerobic chamber) and then the LOOS test was performed using this culture.

FIG. 1 shows the relative sand release by strain LH4:18 cultures over a period of three weeks. After about 6 days, a 6 mm zone of released sand was observed in the bottom of the wells for the week old (week 1) culture and a 3 mm zone was observed for the day-old sample (Day 1). Thus these results indicate that late stationary phase growth cultures may be more effective in expression of wetting agent molecules in that the rate of the sand/oil release was higher for the week old sample and continued to increase with time.

Example 2

Demonstration of Oil Release During Both Aerobic and Anaerobic Growth

To ascertain whether oil release occurs when the assay is performed aerobically versus anaerobically, and whether the addition of lactate and nitrate are beneficial, the following experiment was performed. A LOOS test was set up as described above. A culture of strain LH4:18 was grown aerobically overnight at 25° C. in the PPGAS medium. It was then divided in half. One half was supplemented with 1000 ppm sodium lactate and 2000 ppm sodium nitrate. The other half received no further supplements. Each of these cultures was then divided into an aerobic set and an anaerobic set. LOOS tests were set up to compare the samples. PPGAS medium alone samples, with and without the respective supplements, were used as controls.

The results showed that the sand/oil release was relatively the same irrespective of whether the assay was performed aerobically or anaerobically (FIG. 2). Interestingly, the addition of lactate and nitrate had a detrimental effect on both aerobic and anaerobic cultures. It should be noted, however, that even with the aerobic cultures, oxygen could still be limiting due to the high cell density.

Example 3

Comparison of Electron Acceptors and their Effect on Oil Release by Strain LH4:18

A survey of the literature shows that fumarate may act as an efficient terminal electron acceptor (Morris, C. J., et al., Biochem. J., 302: 587-593, 1994). In addition, in *Shewanella* species, certain cell surface and respiratory molecules are more abundant in cells grown with fumarate, rather than nitrate or iron citrate, as the terminal electron acceptor (Morris et al., supra). In Example 2, it was demonstrated that nitrate addition was detrimental in oil/sand release. Fumarate was therefore tested as an acceptable and possibly more advantageous replacement in this assay.

A frozen stock culture of strain LH4:18 was diluted 1:100 in SIB plus 1% peptone and placed into an anaerobic chamber. The culture was then split and sodium nitrate (2000 ppm), both sodium lactate (1000 ppm) and sodium nitrate (2000 ppm), sodium fumarate (2000 ppm), or both sodium lactate and sodium fumarate supplements were added to different samples. The control sample contained no additional supplements. Samples were grown anaerobically for 3 days. On the second day, samples were fed again with their respective supplements. MPNs were monitored at Day 1 and again after 3 days of anaerobic growth. On Day 3, a LOOS test was set up and sand/oil release was compared across all samples over time.

FIG. 3 shows a comparison of CFU/mL, expressed as Log 10 (MPN), on the day of the LOOS test set up (Day 3) and the relative sand release for each sample. The results show that even though growth was relatively the same across all conditions, the sand/oil release was better for samples containing fumarate instead of nitrate as the terminal electron acceptor.

Example 4

Demonstration of the Effect of Various Media Formulation on Oil Release by Strain LH4:18

For certain bacterial species, glucose is necessary for the expression of some surface molecules and surfactants. To determine whether glucose can improve oil release using strain LH4:18, a LOOS test with this strain grown aerobically overnight in PPGAS medium with and without glucose was performed. The samples were then placed into an anaerobic chamber and the LOOS test was performed anaerobically as described above.

FIG. 4 shows that the sand/oil release response was relatively the same whether glucose was present or not In order to determine if the effect of strain LH4:18 on oil release was limited to a rich medium, the LOOS test response was measured using different media. Media tested were PPGAS, LB, and supplemented simulated injection brine (SIB). SIB was supplemented with 1% peptone and either $MgSO_4$ and KCl, $NH_4CL$, or Tris. Cultures of strain LH4:18 were grown aerobically overnight. Samples were then placed into an anaerobic chamber and the LOOS test was performed anaerobically.

The simulated injection brine with 1% peptone added worked as well as the other rich medium formulations as shown in FIG. 5. Strain LH4:18 grew relatively the same in each of the media. All cultures exhibited about the same sand/oil release response in the LOOS test.

To determine whether yeast extract worked as well as peptone in the simulated injection brine, these supplements were compared directly in a LOOS assay. Strain LH4:18 was grown aerobically overnight at 25° C. in SIB supplemented with 1% peptone or 1% yeast extract (YE). After 20 hr, the SIB/peptone culture had approximately 4.27E+09 CFU/mL and the SIB/YE culture contained about 9.33E+09 CFU/mL. The samples were then placed into the anaerobic chamber and the LOOS test was performed anaerobically.

The data in FIG. 6 shows that YE may be substituted for peptone with no detrimental effect on the oil release response.

Example 5

Demonstration of Oil Release by Culture Supernatant

A number of microbial species release surfactants in their surrounding media. To determine whether a wetting agent from strain LH4:18 might be released into the surrounding medium, a LOOS test was performed using both a whole LH4:18 culture and also the supernatant alone of an LH4:18 culture. Strain LH4:18 was grown aerobically overnight at 25° C. in SIB supplemented with 1% peptone. After 20 hr, the culture contained approximately 1.49E+09 CFU/mL. The culture was then divided into two aliquots and one aliquot was centrifuged at 12000×g for 3 min to remove the cells. The supernatant was collected from the centrifuged sample and transferred into a new tube. Both samples were then placed into an anaeriobic chamber and the LOOS test was performed anaerobically as described above.

FIG. 7 shows that the supernatant alone released the sand/oil as effectively as the whole culture indicating that an agent affecting oil release was present in the medium.

While the Example above showed that the supernatant alone released the sand/oil almost as effectively as the whole culture, an experiment was performed to determine if oil release ability remained surface bound. A culture of strain LH4:18 was grown overnight at 25° C. in SIB supplemented with 1% peptone. The culture was then divided into two aliquots and half was centrifuged at 12000×g for 3 min to remove the cells. The supernatant was collected from the centrifuged sample and transferred into a new tube. The pellet was then resuspended in fresh medium. The other half of the overnight culture was also centrifuged and the supernatant was filtered (Supor, 0.2 µm, Pall Corp., Ann Arbor, Mich.) to remove the microorganisms. The three samples (centrifuged supernatant, filtered supernatant, and resuspended cells) were then placed into the anaerobic chamber and the LOOS test was performed anaerobically. FIG. 8 shows that both supernatant samples released the oil/sand equally well, while oil release by the resuspended cells was less effective. However the resuspended cells were able to cause some oil release.

Example 6

Effect of Strain LH4:18 in Combination with *Pseudomonas stutzeri* Strain LH4:15 in Oil Release To determine whether the oil release effected by strain LH4:18 is compromised by the presence of other microbes, a LOOS test was performed on strain LH4:18 alone and also in the presence of *Pseudomonas stutzeri* LH4:15 (ATCC No. PTA-8823). Specifically, cultures of strains LH4:15 and LH4:18 were grown separately overnight in the PPGAS medium. Three LOOS tests were performed: 1) using strain LH4:15 alone; 2) using strain LH4:18 alone; and 3) using the combined cultures. The results shown in FIG. 9 indicate that the oil release ability of strain LH4:18 was not adversely affected by the presence of the other microorganism.

Example 7

Measuring the Effects of Other *Shewanella* Species in Oil Release

Additional *Shewanella* strains had been identified through anaerobic enrichments on oil production fluids, using SL10 medium and Fe(III) as the electron acceptor. Strains EH60:12, EH60:10, and EH60:2 were identified as *Shewanella* species by their 16S rDNA sequences (SEQ ID NOs:15, 16, and 17, respectively). These strains were grown aerobically overnight in the LB medium. A LOOS test was set up on 2 mL of the whole cultures as previously described.

The results in FIG. 10 demonstrate that other *Shewanella* species (e.g., strains EH60:12, EH60:2, and EH60:10) were also capable of releasing oil. Results were comparable to those of strain LH4:18.

Other known *Shewanella* species were purchased through the German Collection of Microorganisms and Cell Cultures (DSMZ): *Shewanella frigidimarina* (DSM 12253), *S. pacifica* (DSM 15445), *S. profunda* (DSM 15900), *S. gelidimarina* (DSM 12621), and *S. baltica* (DSM 9439). Cultures of each strain were grown aerobically overnight in SIB supplemented with 1% peptone. The cultures were then split and 1000 ppm sodium lactate and 2000 ppm sodium nitrate, or 1000 ppm sodium lactate and 3715 ppm sodium fumarate were added. A LOOS test was performed on 2 mL of the cultures as previously described. Samples were not adjusted for growth.

FIG. 11 shows that these known *Shewanella* species also released oil in the LOOS assay. As in Example 3, those samples grown in the presence of fumarate as the electron acceptor performed better than those grown in the presence of nitrate.

Example 8

*Shewanella* Increases the Contact Angle of Oil in Deep Sediment Sand

Figure 12A:
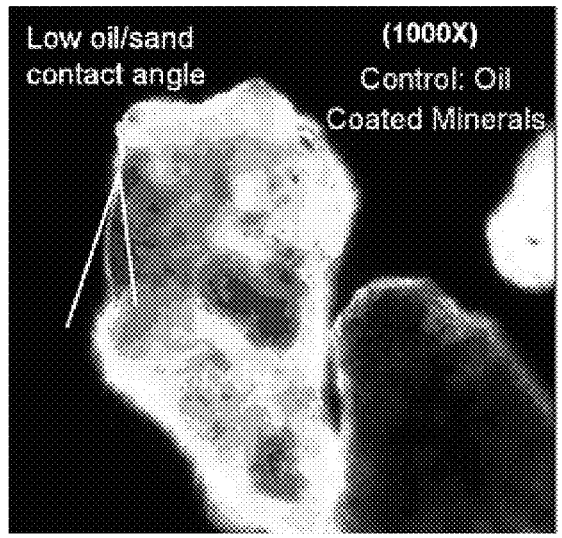
Figure 12B:
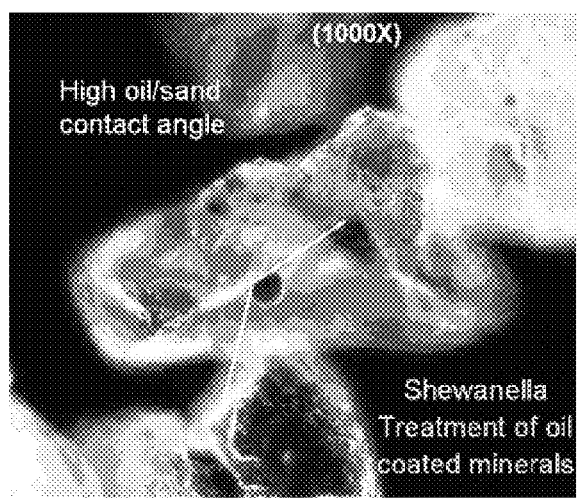

Strain LH4:18 was grown aerobically in PPGAS medium and added to a LOOS test as described above. After approximately two weeks, an aliquot of the sand was removed from the bottom of the strain LH4:18 well and was compared microscopically to oil coated sand from a medium alone control well. FIG. 12 shows photomicrographs for comparison. FIG. 12A shows the untreated oil coated sand. As indicated by the lines drawn on the picture, the contact angle between the hydrocarbon and sand is low indicating that the surface energy encourages the hydrocarbon to coat the entire mineral grain. The right photomicrograph in FIG. 12B shows the effect of exposure to strain LH4:18. As indicated by the lines drawn on the picture, the contact angle has increased dramatically indicating a significant change in the surface energy between the hydrocarbon and the mineral, and showing substantial liberation of hydrocarbon from the surface of the sand particle. This is a visual demonstration of change in wettability.

Example 9

Measuring Oil Release from Sandpacks

Oil Release Sandpack or Core Flood Assay

The potential application of strain LH4:18 in MEOR treatment was evaluated using the sandpack technique. This was done with an in-house developed Teflon® shrink-wrapped sandpack apparatus. Using a 0.5 inches (1.27 cm) OD and 7 inches (17.78 cm) long Teflon heat shrink tube, an aluminum inlet fitting with Viton® O-ring was attached to one end of the tube by heat with a heat gun. North Slope sand was added to the column which was vibrated with an engraver to pack down the sand and release trapped air. A second aluminum inlet fitting with Viton® O-ring was attached to the other end of the tube and sealed with heat a gun. The sandpack was then put in an oven at 275° C. for 7 min to evenly heat and shrink the wrap. The sandpack was removed and allowed to cool to room temperature. A second Teflon® heat shrink tube was installed over the original pack and heated in the oven as described above. After the column had cooled, a hose clamp was attached on the pack on the outer wrap over the O-ring and then tightened.

Four sandpack columns were flooded horizontally with three pore volumes of SIB1 low bicarbonate (same as SIB but with 1 mM bicarbonate) at 10 mL/min via a syringe pump and a 60 mL (Becton Dickinson, Franklin Lakes, N.J.) sterile plastic polypropylene syringe. All four sandpacks were then flooded with two pore volumes of anaerobic autoclaved crude oil at 0.5 mL/min to achieve irreducible water saturation. The crude oil was aged on the sand for three weeks before inoculating. For the inoculation culture, strain LH4:18 was grown aerobically overnight in PPGAS medium. The culture was then placed in an anaerobic environment where Na-Lactate was added to 1000 ppm and Na-Nitrate was added to 2000 ppm. This sample was anaerobically aged for 5 days before inoculating the sandpacks. Two columns were anaerobically inoculated with a sample of strain LH4:18 for one pore volume at 0.4 mL/hr. Two control sandpacks were flooded using anaerobic SIB1 low bicarbonate using the same inoculation procedure. The four sandpacks were then shut-in for incubation with the oil for five days. After the shut-in, the columns were produced by flushing with anaerobic sterile SIB low bicarbonate at 0.4 mL/hr for three pore volumes to prepare the production flood.

At the conclusion of the production flood, the 7 inches (17.78 cm) slim tubes were sacrificed into 5 one-inch sections labeled A-E. One inch was skipped at the beginning and at the exit of the slim tube to avoid edge effects during analysis. Sections A, C, and E were analyzed for residual oil saturation on the sand by the GC method described in General Methods.

The results in FIG. 13 show that average residual oil saturation in the uninoculated column was 22.5% whereas the residual oil saturation for strain LH4:18 inoculated columns was 16.1%, indicating that strain LH4:18 was able to reduce residual oil saturation by approximately 6.5%.

Example 10

Discovery of Oil Recovery Activity in Live Injection Water Sample

To screen enrichment cultures, environmental samples or isolated strains for the ability to release oil from a nonporous silica medium, a microtiter plate assay was developed to measure the ability of microbes to release oil/sand from oil-saturated North Slope sand. North Slope sand was autoclaved and then dried under vacuum at 160° C. for 48 hr and 20 g of this dried sand was then mixed with 5 mL of autoclaved, degassed crude oil obtained from Milne point, North Slope. The oil-coated sand was then allowed to adsorb to the sand and age anaerobically at room temperature for at least a week. Microtiter plate assays were set up in a Coy anaerobic chamber (Coy Laboratories Products, Inc., Grass Lake, Mich.). The assay is referred to as the LOOS test (Liberation of Oil Off Sand).

Water samples were obtained from production and injection well heads as mixed oil/water liquids in glass 1.0 L brown bottles, filled to the top, capped and sealed with tape to prevent gas leakage. Gas from inherent anaerobic processes sufficed to maintain anaerobic conditions during shipment. The bottles were shipped in large plastic coolers filled with ice blocks to the testing facilities within 48 hr of sampling.

A sample of non sterile ('Live') injection water obtained from Alaskan North Slope was used in a LOOS test plus and minus *Shewanella putrefaciens* strain LH4:18 (ATCC No. PTA-8822) to determine the efficacy of the *Shewanella* LH4:18 surface active agent in a background microbial population simulated by the live injection water. Live water was included in the LOOS test as a control. A positive LOOS result was obtained for live injection +/− LH4:18 microbial treatments. The oil/sand release scores obtained from these LOOS tests are given in Table 3.

TABLE 3

Response of Live Injection Water vs. *Shewanella* LH4:18 in the Release of Oil from Sand in the LOOS Test

| | | | | Time in days | | | | | |
|---|---|---|---|---|---|---|---|---|---|
| Test Sample | Live Injection Water | LH4:18 | Nutrients[1] | 0 | 3 | 7 | 10 | 18 | 26 |
| | | | | Response as diameter of sand released (mm) | | | | | |
| L1 | + | − | none | 0 | 1 | 2 | 4 | 4 | 4 |
| L2 | + | − | N | 0 | 1 | 2 | 3 | 3 | 3 |
| L3 | + | − | L/N | 0 | 5 | 6 | 6 | 7 | 7 |
| L4 | + | − | F | 0 | 2 | 2 | 4 | 5 | 5 |
| L5 | + | − | L/N | 0 | 2 | 3 | 4 | 6 | 6 |
| L6 | + | + | none | 0 | 4 | 4 | 4 | 5 | 5 |
| L7 | + | + | N | 0 | 2 | 4 | 4 | 4 | 4 |
| L8 | + | + | L/N | 0 | 4 | 5 | 6 | 6 | 6 |
| L9 | + | + | F | 0 | 4 | 5 | 5 | 6 | 6 |
| L10 | + | + | L/N | 0 | 3 | 5 | 6 | 6 | 6 |

[1]N = Nitrate (2000 ppm);
L/N = Lactate (1000 ppm) plus Nitrate (2000 ppm);
F = Fumarate (2000 ppm)

The degree of oil release response is measured as the diameter of the sand released from oil. The data demonstrates that test sample L3 consisting of live injection water released oil faster than the other samples. This sample was not inoculated with *Shewanella* LH4:18. This test demonstrates that the live injection water contained an agent or agents that facilitated the release of oil from sand independent of *Shewanella* sp LH4:18.

Example 11

Isolation and Identification of *Shewanella* Species in Oil Reservoir Production Water Aliquots of the live injection water giving positive oil release results in the LOOS test were streaked on LB agar plates (Teknova, Hollister, Calif.) in order to isolate and identify those strain(s) present in live injection water capable of oil release. Representative colonies with unique morphologies were isolated from the live injection water test samples. Samples of these isolated colonies were screened by PCR amplification using direct colony rDNA analysis described in the General Methods using both the reverse PCR primer 1492r (SEQ ID NO:1) and forward PCR primer 8f (SEQ ID NO:2). The resultant rDNA sequence from each colony was aligned and matched with the GenBank sequence database for phylogenetic strain identification.

One isolate, named L3:3, was identified as having 16S rDNA homology to *Shewanella* sp C16-M. Both L3:3 and C16-M strains as well as four other reported *Shewanella* isolates (C31, L31, C13-M and JC5T) have 16S rDNA sequences that are similar to a newly proposed *Shewanella* species, *Sh. chilikensis* (K. Sucharita et al, (2009) International Journal of Systematic and Evolutionary Microbiology 59:3111-3115). The 16S rDNA sequence of L3:3 has 99.9% identity to three of the six rDNA gene sequences in the GenBank database that could be classified as *Shewanella chilikensis*: strain JC5T, strain C16-M, and sequence from a population study designated *Shewanella* clone D004024H07. *Shewanella chilikensis* JC5T was isolated from a lake mud environment, *Shewanella chilikensis* C16-M was isolated from a marine environment and *Shewanella* clone D004024H07 was isolated (by DuPont) from environmental samples taken from an Alaskan oil well (Pham, V. D, et al., Environ. Microbiol. 11:176-187 (2008)).

Strain L3:3 was identified to be *Shewanella* sp L3:3 and was further characterized by DNA sequence analysis to have signature sequences within *Shewanella* species rDNA sequences. Specifically, *Shewanella* sp L3:3 was found to have 16S rDNA sequence (SEQ ID NO: 3) and signature sequences within *Shewanella* 16S rRNA variable regions 3 and 6 that are defined in SEQ ID NO:13 (within the prokaryote 16S rRNA variable region 3) and SEQ ID NO: 14 (within the prokaryote 16S rRNA variable region 6). These signature sequence regions were discovered when the 16S rDNA sequence profile of *Shewanella* sp L3:3 was aligned with 42 published 16S rDNA sequences of *Shewanella* sp., which were pared down to the nine sequences (SEQ ID NO:4 through 12) in FIGS. 1 and 2 for demonstration of the variations. *Shewanella* sp L3:3 full 16S rDNA sequence (SEQ ID NO: 3) was used as the alignment anchor. FIG. 14 shows signature base variations that occur in L3:3 in the 16S rRNA variable region 3 and SEQ ID NO: 13 (bp coordinates 430 to 500) at specific coordinate positions: 438-40, 451, 454-57, 466-69, 471, 484-86 and 496 and are observed as signature in nature when compared across 16S rDNA of various *Shewanella* species. A similar observation was made for bacterial variable region 6 for sequences closely related to *Shewanella* sp L3:3, e.g., sequences similar to that defined by FIG. 15 and SEQ ID NO: 14 can be found in published sequences. Strain variations occur between base coordinates 990 and 1049, specifically at positions: 995-6, 1001-5, 1007, 1012, 1014, 1016-18 and 1035 as shown in FIG. 2.

In addition to strain L3:3, there are six *Shewanella* 16S rDNA-like sequences, which were found in sequence databases, that contain the diagnostic signature sequences within variable regions 3 and 6 that are similar to those defined by SEQ ID NO: 13 and SEQ ID NO: 14. This *Shewanella* group includes: uncultured bacterium clone D004024H07 (NCBI GenBank accession No. gb|EU721813|), *Shewanella* sp C16-M (gb|EU563338.1|), *Shewanella* sp. L-10 (gb|DQ164801.1|), *Shewanella* sp. C31 (gb|EU563345.1|) and *Shewanella* Sp. JC5T (sp.=*chilikensis*) (gb|FM210033.2|). *Shewanella* sp. C13-M (gb|EU563337.1|) does not have the position 471 nucleotide of the L3:3 diagnostic signature.

All strains were isolated from marine environment, oil fields or the bottom of a lagoon. None of these strains at the time of this invention were available from the ATCC or DSMZ public depositories to allow for ribotyping comparisons.

Example 12

Riboprint Analysis of Strain L3:3

To further characterize *Shewanella* strain L3:3, preparations of this strain were analyzed by Riboprinter® and compared to 7525 patterns contained within DuPont Environmental Services and Qualicon libraries compiled from samples taken all over DuPont as well as another 6950 patterns that DuPont Qualicon has supplied from standard identified organisms. Based on the analyses of Riboprint batch 052009 (FIG. 16), which provides a chromosomal fingerprint of the tested strains, it is clear that the riboprint pattern for strain L3:3 (sample 1) constitutes a riboprint which is unique when compared against the available DuPont Riboprint Libraries and is designated as ribogroup identifier 212-824-S-4. It is probable for various strains to share single similar riboprint bands generated by hybridizing the labeled *E. coli* rDNA operon probe to each strain's genomic Eco RI fragments, but it is the overall riboprint banding pattern that constitutes identification of a given strain in a specific riboprint or ribogroup identifier.

Example 13

Enhanced Oil Release by Strain L3:3

The purified strain L3:3 was tested in a LOOS test designed to identify the strains' efficacy in altering the surface tension of oil coated silica particles. Strain L3:3 clearly contributed to oil release from sand as compared to the efficiency of oil release by *Shewanella* strain LH4:18 (ATCC No. PTA-8822) as shown in Table 4. Both strains exhibited release of oil/sand from oil coated particles. The ability to release oil/sand was similar when fumarate was the electron acceptor for both *Shewanella* strains tested (LH4:18 and L3:3), but L3:3 appeared to have greater release as compared to LH4:18 when nitrate was used as the electron acceptor.

TABLE 4

LOOS test: Oil/sand Release Response for Purified Cultures of *Shewanella* strains L3:3 and LH4:18

| | | | Time in Days | | | | | | |
|---|---|---|---|---|---|---|---|---|---|
| | | | 0 | 2 | 5 | 7 | 9 | 12 | 14 |
| Test | Strain | Electron receptor | Response as diameter of sand released (mm) | | | | | | |
| 1 | L3:3 | none | 0 | 4 | 6 | 7 | 7 | 8 | 8 |
| 2 | L3:3 | L/N[1] | 0 | 2 | 5 | 5 | 7 | 7 | 8 |
| 3 | L3:3 | L/F[2] | 0 | 3 | 7 | 7 | 7 | 8 | 8 |
| 4 | LH4:18 | none | 0 | 2 | 6 | 7 | 7 | 7 | 7 |
| 5 | LH4:18 | L/N | 0 | 0 | 3 | 3 | 3 | 4 | 4 |
| L6 | LH4:18 | L/F | 0 | 3 | 6 | 7 | 7 | 7 | 7 |

[1]lactate plus nitrate
[2]lactate plus fumarate

Example 14

Prophetic

Anaerobic Growth of Strain L3:3 on Oil as the Sole Carbon Source

To study growth of strain L3:3 as compared to *Shewanella* LH4:18, purified isolates are inoculated into 20 mL serum vials containing ~10 mL minimal salts medium (Table 5), 1.6 g/l sodium nitrate and 5.0 mL of autoclaved crude oil. The medium is deoxygenated by sparging the filled vials with a mixture of nitrogen and carbon dioxide followed by autoclaving. All manipulations of bacteria are done in an anaerobic chamber (Coy Laboratories Products, Inc., Grass Lake, Mich.). The cultures are incubated at ambient temperatures with moderate shaking (100 rpm) for several weeks to several months and monitored for nitrate, nitrite, visible turbidity and visible oil modifications. When the nitrate is depleted in any culture, sodium nitrate at 50 g/l is added to bring its concentration in the medium up to 0.4 g/l sodium nitrate.

TABLE 5

Minimal salts medium

| Growth component | Final concentration | Chemical Source |
|---|---|---|
| Nitrogen | 18.7 μM | $NH_4Cl$ |
| Phosphorus | 3.7 μM | $KH_2PO_4$ |
| Magnesium | 984 μM | $MgCl_2 \cdot 6H_2O$ |
| Calcium | 680 μM | $CaCl_2 \cdot 2H_2O$ |
| Sodium chloride | 172 μM | NaCl |
| Trace metals | | |
| | 670 μM | nitrilotriacetic acid |
| | 15.1 μM | $FeCl \cdot 4H_2O$ |
| | 1.2 μM | $CuCl \cdot 2H_2O$ |
| | 5.1 μM | $MnCL_2 \cdot 4H_2O$ |
| | 12.6 μM | $CoCl_2 \cdot 6H_2O$ |
| | 7.3 μM | $ZnCl_2$ |
| | 1.6 μM | $H_3BO_3$ |
| | 0.4 μM | $Na_2MoO_4 \cdot 2H_2O$ |
| | 7.6 μM | $NiCl_2 \cdot 6H_2O$ |
| pH buffer (7.5 final) | 10 mM | Hepes |
| Selenium-tungstate | 22.8 nM | $Na_2SeO_3 \cdot 5H_2O$ |
| | 24.3 nM | $Na_2WO_4 \cdot 2H_2O$ |
| Bicarbonate | 23.8 nM | $NaHCO_3$ |
| vitamins | 100 μg/L | vitamin B12 |
| | 80 μg/L | p-aminobenzoic acid |
| | 20 μg/L | nicotinic acid |
| | 100 μg/L | calcium pantothenate |
| | 300 μg/L | pyridoxine hydrochloride |
| | 200 μg/L | thiamine-HCl $\cdot 2H_2O$ |
| | 50 μg/L | alpha-lipoic acid |
| Electron acceptor | 1.0 g/L | $NaNO_3$, $Na_2$ fumarate or Fe(III) Na EDTA |

The pH of the medium is adjusted to 7.5.

Strain L3:3 is expected to show growth via nitrate reduction and turbidity increase under denitrifying conditions as does LH4:18.

Example 15

Anaerobic Growth of Strain L3:3 on Oil as the Sole Carbon Source

Strain L3:3 and *Shewanella* strain LH4:18 were studied and compared in their abilities for anaerobic growth on oil as the sole carbon source using different electron acceptors. *Shewanella* strain LH4:18 has been show to grow using nitrate as the electron acceptor in commonly owned and co-pending US 2009-0260803 A1. *Shewanella* strains L3:3 and LH4:18 were inoculated into 20 mL serum vials containing ~10 mL SL10 minimal salts medium (Table 2), supplemented with one of the following electron acceptors: $NaNO_3$ (2000 ppm), $Na_2$ fumarate (3500 ppm), or Fe(III) Na EDTA (5000 ppm), and overlayed with 5.0 mL of autoclaved crude oil. LH4-18 samples were excluded from $NaNO_3$ test vials. The medium and crude oil had been deoxygenated by sparging these reagents with a mixture of carbon dioxide and nitrogen (20% and 80%, respectively) followed by autoclaving. All manipulations of bacteria were done in an anaerobic chamber (Coy Laboratories Products, Inc., Grass Lake, Mich.) (gas mixture: 5% hydrogen, 10% carbon dioxide and 85% nitrogen). Replicate test vials were set up per electron acceptor treatment by L3-3 inoculum. The cultures were incubated at ambient temperature for two weeks. Cell growth/titer of the test cultures were analyzed by MPNs.

L3:3 grew anaerobically in oil enrichments where crude oil was provided as the sole carbon source when either $NaNO_3$, $Na_2$ fumarate, or Fe (III) Na EDTA was provided as the electron acceptor. A table of growth results as analyzed by cell titers recorded as MPN log 10 is listed below in Table. 6. Strain L3:3 grew anaerobically 3 logs to cell titers of ~$10^5$-$10^7$ cells per mL from starting titers of ~$10^3$ cells per mL after two weeks incubation time. The change in cell numbers as a result of anaerobic growth on oil are listed as the $\log_{10}$ of the MPN recorded for growth ±0.5 log. The growth of *Shewanella* strain L3:3 on the different electron acceptors was comparable to that of *Shewanella* strain LH4:18. Strain L3:3 grew anaerobically on oil using either $NaNO_3$, $Na_2$ fumarate, or Fe (III) Na EDTA as the electron acceptor. Cell titers are presented as the average of replicate test vials. *Shewanella* strain LH4:18 also grew on oil using fumarate or Fe (III) Na EDTA as electron acceptor. Its growth on oil using nitrate as an electron acceptor had been previously demonstrated in commonly owned and co-pending US 2009-0260803 A1. Both L3:3 and *Shewanella* strain LH4:18 grew ~3 logs to titers of ~$10^5$-$10^7$ cells per mL from starting titers of $10^3$ cells per mL anaerobically after two weeks incubation time.

TABLE 6

Anaerobic Growth on oil

| | Delta MPN log10 Electron Acceptor | | |
|---|---|---|---|
| Strain | $NaNO_3$ | $Na_2$ fumarate | Fe(III) Na EDTA |
| *Shewanella* strain L3:3 | 3.0 | 3.2 | 2.7 |
| *Shewanella* strain LH4:18 | n.t. | 4.7 | 2.2 | n.t. = not tested

Example 16

Determining the Temperature Limits for Growth of Strain L3:3

To determine the optimal temperature range as well as tolerances for *Shewanella putrefaciens* LH4:18 and *Shewanella* sp L3:3, these strains were grown at different test temperatures as given in Table 7.

Inoculums of *Shewanella* strains LH4:18 and L3:3 were grown overnight (16 to 18 hours) aerobically in LB medium with shaking at 30-35° C. These overnight cultures were grown to visible turbidity and relatively high levels of cell counts as measured by optical density. Aliquots from these starter cultures were then used to seed flasks of 10 mL sterile LB media that had been pre-incubated at a specific test temperature over night. Temperature test cultures were seeded at an optical density of approximately 0.1 as measured using a spectrophotometer and visible light, wavelength of 600 nm. This constituted a dilution of starter cultures approximating between a 1:50 and 1:100 dilution. Growth was then measured by tracking the turbidity or optical density of cultures over time. The resulting growth rates determined for strains LH4:18 and L3:3 obtained for the different test temperatures is expressed as doubling time, the time to double cell number, in units of hours; the smaller the number the faster the growth rate. At doubling times of <2 h these strains are presumed to compete successfully with background microbial populations in situ. Table 7 shows the results for growth rates at the recorded temperatures. Both *Shewanella* strains were shown to grow at a rate that would allow them to compete with microbial populations in situ for a relatively broad range of environmental temperatures.

TABLE 7

Average Recorded Doubling Time for selected temperatures ° C.

| strain | Doubling times (in hours) Temperature | | | | | | | | |
|---|---|---|---|---|---|---|---|---|---|
| | 10° C. | 16° C. | 22° C. | 27° C. | 30° C. | 32° C. | 35° C. | 37° C. | 41° C. |
| LH4:18 | 3.18 | 1.71 | 1.02 | 0.95 | 0.87 | 0.79* | 0.97 | 1.45 | No growth |
| L3:3 | n.t. | n.t. | n.t. | n.t. | n.t. | n.t. | n.t. | 0.98 | 0.63 | n.t. = not tested

Example 17

Anaerobic Growth of Strain L3:3 in the Presence of Oil Under Denitrifying Conditions To demonstrate the ability to grow anaerobically in the presence of oil under denitrifying conditions, an aliquot ($10^4$-$10^5$ cells) of each of *Shewanella* strains LH4:18 and L3:3 was inoculated under anaerobic conditions into 20 mL serum vials containing a 1:2 ratio of minimal salts medium supplemented with sodium lactate. The media formulation used was designed to promote growth and propagation of *Shewanella* strain L3:3 as well as the oil release mechanism within a reservoir environment. The medium composition for anaerobic growth was as follows: 10 mL minimal salts medium (Table 4 minimal salts medium), 1000 ppm sodium lactate and ~2000 ppm sodium nitrate with 5.0 mL of autoclaved crude oil. Strain LH4:18 acted as a positive control for anaerobic growth under denitrifying conditions containing surface active agent(s). Both the medium and crude oil were deoxygenated by sparging the filled vials with a mixture of nitrogen and carbon dioxide followed by autoclaving. All manipulations of bacteria were done in an anaerobic chamber (Coy Laboratories Products, Inc., Grass Lake, Mich.). These cultures were incubated at ambient temperatures for several days and monitored for nitrate and nitrite levels, for visible turbidity, and for visible changes to the integrity of the oil phase.

Table 8 shows the results of this growth study in the presence of oil. A pure culture of strain L3:3 showed growth through a reduction in lactate and nitrate levels when grown in the presence of oil. These strains also showed ~two to three logs growth as indicated by MPN data (Table 8).

TABLE 8

Nitrate Reduction as a Measure of Anaerobic Growth In the presence of Oil with lactate as the primary carbon source

| Bacteria isolate | 16S Genus ID | % nitrate reduction in oil | % Lactate reduction in oil | MPN log10 | time (days) |
|---|---|---|---|---|---|
| NIC[1] | n.a. | 8% | 0% | n.t.[2] | 14 |
| L3:3 | *Shewanella chilikensis*, JC5T | 58% | 44% | 7.0 | 14 |
| LH4:18 | *Shewanella putrefaciens* | 51% | 35% | 6.4 | 14 |

[1]NIC: Non inoculated control
[2]n.t.: not tested

Example 18

Identification of Electron Acceptors which Promote Oil Release by Strain L3:3

Different terminal electron acceptors (shown in Table 9) were tested in anaerobic growth of strain L3:3 to determine its ability to grow on a range of terminal electron acceptors including fumarate as well as various metal oxides. A mixed culture of LH4:18 and L3:3 was also tested with nitrate and fumarate. Anaerobic test growths were set up using minimal salts media (Table 4). 20 mL of minimal salts medium was supplemented with 1000 ppm sodium lactate, where 2000 ppm sodium nitrate was used as the electron acceptor control. The milli-equivalents of the following electron acceptors were each applied in their respective electron assay sample: fumarate, pyruvate, Fe (III) sodium EDTA, manganese dioxide, and vanadium dioxide. The minimal salts base medium, lactate, and terminal electron acceptor preparations were all deoxygenated by sparging with a mixture of nitrogen and carbon dioxide followed by autoclaving. All manipulations of bacteria were done in an anaerobic chamber (Coy Laboratories Products, Inc., Grass Lake, Mich.). These cultures were incubated at ambient temperature for several days and monitored for growth by increases in visible turbidity as measured by OD/MPN or by lactate depletion as measured by IC. Results are shown in Table 9.

TABLE 9

Relative Growth obtained for Strains L3:3 and LH4:18 on different electron acceptors using Lactate as supplemental Carbon Source

| | Nitrate | Fumarate | Iron (Fe(III)) EDTA | Manganese Dioxide | Vanadium Dioxide | Pyruvate |
|---|---|---|---|---|---|---|
| L3:3 | + | ++ | ++ | ++ | + | ++ |
| L3:3 + LH4:18 | + | ++ | n.t.[1] | n.t. | n.t. | n.t. |

[1]n.t. not tested

Example 19

Strain L3:3 Increases the Contact Angle of Oil on Deep Sediment Sand

Strain L3:3 was grown aerobically overnight in SIB (Synthetic Injection Brine; Table 10) plus 1% peptone. Samples were then added into an anaerobic LOOS test, described above, and were supplemented with 1000 ppm sodium lactate and 2000 ppm sodium nitrate. After approximately one week, an aliquot of the sand was removed from the bottom of the strain L3:3 well and was visualized microscopically. FIG. 17(A) is a typical image of untreated oil coated sand. As indicated, the contact angle (qCA) between the hydrocarbon and sand is low—the surface energy encourages the hydrocarbon to coat the entire mineral grain. FIG. 17(B) shows the effect of exposure of oil coated sand to strain L3:3. The contact angle (qCB) is increased dramatically indicating a significant change in the surface energy between the hydrocarbon and the mineral

TABLE 10

Components of SIB1 Minimal Medium (per Liter) and added electron acceptor and electron donor

| | |
|---|---|
| NaHCO3 | 0.138 g |
| CaCl2*6H$_2$O | 0.39 g |
| MgCl2*6H$_2$O | 0.220 g |
| KCl | 0.090 g |
| NaCl | 11.60 g |
| Trace metals (Table 4) | 1 mL |
| Vitamins (Table 4) | 1 mL |
| Na$_2$HPO$_4$ | 0.015 g (10 ppm PO$_4$) |
| NH$_4$Cl | 0.029 g (10 ppm NH$_4$) |
| Electron donor added | |
| Na-Lactate | 0.124 g (124 ppm Na-Lactate) |
| Electron acceptor added | |
| Na$_2$nitrate Adjust pH with HCl or NaOH Filter sterilize | 0.4 g/400ppm |

Example 20

Demonstration of Strain L3:3 Oil Release Sandpack or Core Flood Assay

To test the amount of residual oil left in a sandpack after the oil soaked sandpack was flooded with a water solution that simulated the injection brine used in flooding an underground oil reservoir, the sandpack was fabricated as per standard methods described by Petroleum Reservoir Rock and Fluid Properties, Abhijit Y. Dandehar, CRC Press (2006). A similar core flood/sandpack apparatus and techniques used to operate it are also described by Berry et al. (SPE paper number 200056, SPE Reservoir Engineering, November 1991, p 429). The use of a similar apparatus and techniques for testing microbial treatments in a sandpack is described by Saikrishna et al. (SPE paper number 89473, (2004)).

To demonstrate that strain L3:3 is capable of oil release, a L3:3 culture was applied to a sandpack saturated with oil in an in-house developed Teflon® shrink-wrapped sandpack apparatus that simulates packed sand of sandstone. The process described herein was used for making two column sets, a "control" set and a "test" set, which was inoculated with L3:3 to test its efficacy to release oil from the sand column. Using a 1.1 inches (2.8 cm) thick, and 7 inches (17.8 cm) long Teflon heat shrink tube, an aluminum inlet fitting with Viton® O-ring was attached to one end of the tube using a heat gun. Alaskan North Slope sand was added to the column which was vibrated with an engraver to pack down the sand and release trapped air. A second aluminum inlet fitting with Viton® O-ring was attached to the other end of the tube and sealed with heat a gun. The sandpack was then put in an oven at 275° C. for 7 min to evenly heat and shrink the wrap. The sandpack was removed and allowed to cool to room temperature. A second Teflon® heat shrink tube was installed over the original pack and heated in the oven as described above. After the column had cooled, a hose clamp was attached on the pack on the outer wrap over the O-ring and then tightened. For this demonstration there were four sandpack columns assembled.

The four sandpack columns were flooded horizontally with three pore volumes of SIB1 Synthetic Injection Brine (Table 10) at 10 mL/min via a syringe pump and a 60 mL (BD) sterile plastic polypropylene syringe. All four sandpacks were then flooded with two pore volumes of anaerobic autoclaved crude oil at 0.5 mL/min to achieve irreducible water saturation. The crude oil was aged on the sand for three weeks prior to being inoculated with strain L3:3.

For inoculation, the culture was grown aerobically overnight in PPGAS media (Table 11). The culture was then placed in an anaerobic environment where sodium lactate was added to SIB1 minimal brine solution to a concentration of 1000 ppm and sodium nitrate was added to a concentration of 2000 ppm. The inoculation sample was then anaerobically aged in an anaerobic chamber (Coy Laboratories Products, Inc., Grass Lake, Mich.) for 5 days before inoculating the sandpacks. After the aging period, two columns were anaerobically inoculated with a sample of *Shewanella* sp L3:3 for one pore volume at 0.4 mL/hr. Two control sandpacks were flooded using anaerobic SIB1, using the same inoculation procedure. The four sandpacks were then shut-in for incubation with the oil for five days. After the shut-in, the columns were then produced for three pore volumes with anaerobic sterile SIB1 low bicarbonate at 0.4 mL/hr.

TABLE 11

Components for PPGAS Growth Medium (per Liter)

| | |
|---|---|
| Peptone | 10 g |
| Mg SO$_4$ | 0.2 g |
| KCl | 1.5 g |
| NH$_4$ CL | 1.07 g |
| Tris HCL Buffer, pH 7.5 | 120 mL |

At the conclusion of the production flood, the 7 inches long slim tubes were sacrificed into three 1.9-inch sections labeled A-C. One inch was skipped at the beginning and at the exit of the slim tube to avoid edge effects during analysis. Section "A" came from the front end of the column. Sections A, B and C were analyzed for residual oil saturation on the sand. The amount of oil on the wet sand from the sacrificed slim tubes for residual oil was measured by GC as described above. This value was multiplied by the total amount of toluene used to extract the oil resulting in the total amount of oil on the sand. The value obtained was then divided by the total sample weight to yield the percent of oil with respect to the total sample weight. The weight percent of oil of the sample was then multiplied by the ratio of the empirically derived characteristic of packed North Slope sand (total weight of sample after being flooded with brine divided by total sand weight, 1.27). This relationship is equal to the amount of oil on dry sand. This value was then multiplied by the ratio of the weight of the North Slope sand to the weight of the fluid trapped in the pore space of the sand, 3.75. The resulting value reflected the residual oil left on the sand in units of g of oil/g of total fluid in the pore space. As shown in Table 12, residual oil left on the column, in fractions A and C of the test column, were less than the controls confirming that the columns inoculated with the *Shewanella* sp. L3:3 released more oil than uninoculated control columns, with an average of 4.1% decrease in residual oil remaining on the columns when L3:3 was inoculated on the columns.

TABLE 12

Residual oil left on sand along the tube length after flooding with anaerobic sterile "Brine"

| Column Fraction Assay Column | Average Percent Residual Oil on Sand | | |
|---|---|---|---|
|  | A | C | Average. |
| Test columns | 12.6% | 15.3% | 13.9% |
| Control columns | 18.9% | 17.1% | 18.0% |

What is claimed is:

1. A composition for enhanced oil recovery comprising:
   a) an isolated *Shewanella* sp. having a 16S rDNA that has at least 99% identity to the 16S rDNA sequence as set forth in SEQ ID NO: 3 and a 16S rDNA sequence comprising signature sequences SEQ ID NOs: 13 and 14 and a riboprint pattern identifier of 212-824-S-4 as illustrated in FIG. 16; and
   b) an electron acceptor selected from the group consisting of nitrate, fumarate, ferric ion, manganese (MnIV) ion and mixtures thereof.

2. The composition of claim 1 comprising at least one carbon source.

3. The composition of claim 2 wherein the carbon source comprises oil or an oil component.

4. The composition of claim 2 wherein the carbon source is lactate.

5. The composition of claim 1 comprising one or more additional microorganisms.

6. The composition of claim 5 wherein the one or more additional microorganisms grow on oil under denitrifying conditions.

7. The composition of claim 5 wherein the one or more additional microorganisms are selected from the group consisting of bacterial isolate *Pseudomonas stutzeri* LH4:15 (ATCC No. PTA-8823), *Thauera* sp AL9:8, (ATCC No. PTA-9497), and mixtures thereof.

8. An isolated *Shewanella* sp. having the following characteristics:
   a) a 16S rDNA comprising signature sequences SEQ ID NOs: 13 and 14; and
   b) riboprint pattern identifier of 212-824-S-4 as illustrated in FIG. 16;
   wherein 16S rDNA of (a) has at least about 99% identity to the 16S rDNA sequence as set forth in SEQ ID NO: 3.

* * * * *